US008037449B2

(12) United States Patent (10) Patent No.: US 8,037,449 B2
Iborra et al. (45) Date of Patent: Oct. 11, 2011

(54) AUTOMATIC SOFTWARE PRODUCTION SYSTEM

(75) Inventors: Jose Iborra, Denia Alicante (ES); Oscar Pastor, Valencia (ES)

(73) Assignee: Sosy, Inc., San Francisco, CA (US)

( * ) Notice: Subject to any disclaimer, the term of this patent is extended or adjusted under 35 U.S.C. 154(b) by 1368 days.

(21) Appl. No.: 11/545,438

(22) Filed: Oct. 10, 2006

(65) Prior Publication Data

US 2008/0209391 A1 Aug. 28, 2008

Related U.S. Application Data

(60) Division of application No. 09/872,413, filed on Jun. 1, 2001, now Pat. No. 7,278,130, which is a continuation-in-part of application No. 09/543,085, filed on Apr. 4, 2000, now Pat. No. 6,681,383.

(51) Int. Cl.
    *G06F 9/45* (2006.01)
(52) U.S. Cl. .................................................. 717/105
(58) Field of Classification Search ............. 717/105
    See application file for complete search history.

(56) References Cited

U.S. PATENT DOCUMENTS

| 4,734,854 A | 3/1988 | Afshar ............... 717/107 |
| 4,841,441 A | 6/1989 | Nixon et al. ........... 706/45 |
| 5,027,305 A | 6/1991 | Tanaka et al. .......... 706/48 |
| 5,159,687 A | 10/1992 | Richburg ............. 717/106 |
| 5,185,867 A | 2/1993 | Ito ..................... 717/143 |
| 5,204,939 A | 4/1993 | Yamazaki et al. ....... 706/50 |
| 5,371,895 A | 12/1994 | Bristol ................ 717/136 |
| 5,459,866 A | 10/1995 | Akiba et al. .......... 717/144 |
| 5,481,718 A | 1/1996 | Ryu et al. ............. 719/316 |
| 5,485,601 A | 1/1996 | Ching ................. 717/106 |
| 5,495,567 A | 2/1996 | Iizawa et al. |
| 5,499,371 A | 3/1996 | Henninger et al. ..... 717/108 |
| 5,561,802 A | 10/1996 | Orimo et al. .......... 717/136 |
| 5,581,670 A | 12/1996 | Bier et al. ............ 715/856 |
| 5,586,329 A | 12/1996 | Knudsen et al. ....... 717/108 |
| 5,603,018 A | 2/1997 | Terada et al. ......... 712/220 |
| 5,617,114 A | 4/1997 | Bier et al. ............ 345/634 |
| 5,640,576 A | 6/1997 | Kobayashi et al. ....... 704/9 |
| 5,742,754 A | 4/1998 | Tse .................... 714/38 |
| 5,742,827 A | 4/1998 | Ohkubo et al. ........ 717/143 |
| 5,758,160 A | 5/1998 | McInerney et al. ..... 717/104 |
| 5,790,760 A | 8/1998 | Arima ................. 706/45 |
| 5,798,752 A | 8/1998 | Buxton et al. ......... 715/863 |
| 5,805,891 A | 9/1998 | Bizuneh et al. ........ 717/121 |
| 5,842,205 A | 11/1998 | Brann ................. 707/4 |
| 5,875,331 A | 2/1999 | Lindsey |
| 5,878,262 A | 3/1999 | Shoumura et al. ....... 717/164 |

(Continued)

OTHER PUBLICATIONS

Letelier, P., et al., "*OASIS Version 3.0: Un Enfoque Formal Para el Modelado Conceptual Orientado a Objectos*" (in Spanish), ISBN: 84-7721-663-0, Legal Diposit: V-3484-1998, Servicio de Publicaciones de la UPV, SP-UPV 98-4011, Valencia, Spain, 1998.

(Continued)

*Primary Examiner* — John Chavis

(74) *Attorney, Agent, or Firm* — Ron Fish

(57) ABSTRACT

An automated software production system is provided, in which system requirements are captured, converted into a formal specification, and validated for correctness and completeness. In addition, a translator is provided to automatically generate a complete, robust software application based on the validated formal specification, including user-interface code and error handling code.

19 Claims, 25 Drawing Sheets

U.S. PATENT DOCUMENTS

| | | | | |
|---|---|---|---|---|
| 5,956,725 | A | 9/1999 | Burroughs et al. | 707/101 |
| 5,960,200 | A | 9/1999 | Eager et al. | 395/705 |
| 5,966,534 | A | 10/1999 | Cooke et al. | 717/155 |
| 5,995,736 | A | 11/1999 | Aleksic et al. | 716/18 |
| 6,058,493 | A | 5/2000 | Talley | 714/38 |
| 6,199,195 | B1 | 3/2001 | Goodwin et al. | 717/104 |
| 6,275,976 | B1 | 8/2001 | Scandura | 717/1 |
| 6,289,502 | B1 | 9/2001 | Garland et al. | 717/104 |
| 6,385,765 | B1 | 5/2002 | Cleaveland et al. | 717/100 |
| 6,393,456 | B1 | 5/2002 | Ambler et al. | 709/200 |
| 6,571,232 | B1 | 5/2003 | Goldberg et al. | 707/2 |
| 6,618,852 | B1 | 9/2003 | Van Eikeren et al. | |
| 6,681,383 | B1 * | 1/2004 | Pastor et al. | 717/126 |
| 6,850,922 | B1 | 2/2005 | Wason | 706/47 |
| 7,032,210 | B2 * | 4/2006 | Alloing et al. | 717/106 |
| 7,137,100 | B2 | 11/2006 | Iborra et al. | |
| 7,278,130 | B2 * | 10/2007 | Iborra et al. | 717/101 |
| 7,334,216 | B2 | 2/2008 | Molina-Moreno et al. | |
| 2002/0120859 | A1 | 8/2002 | Lipkin et al. | 726/26 |
| 2003/0079180 | A1 | 4/2003 | Cope | 715/511 |

OTHER PUBLICATIONS

Pelechano, V., "*OO-Method: Implementación de un Entomo Gráfico para el Análisis y Diseño de Sistemas De Información OO*" (in Spanish), Master Thesis, 1994.

Pelechano. V., et al., "*CASE OO-Method: Un Entomo de Producción Automática de Software*" (in Spanish) Actas de la Convenció Informática Latina CIL-95, Barcelona, Jun. 1995.

Romero, J., "*Diserño de un Entomo de Producción de Software basado en el Lenguaje de Especificación OASIS y en la utilización de PowerBuilder como Herramienta de Desarrollo Gráfica y C/S*" (in Spanish), Master Thesis, Valencia, Mar. 1996.

Pastor, O., et al., "*An Object Oriented Methodological Approach for Making Automated Prototyping Feasible*", Database and Expert Systems Applications. Lecture Notes in Computer Science (1134) pp. 29-39 Springer-Verlag. 1996, ISBN: 3-540-61656-x, ISSN: 0302 9743, Zurich (Suisse).

Pelechano, V., et al., "*Implementación y comprobación de restricciones de integridad dinámicas en entomos de programación orientados a objectos*" (in Spanish), Il Jornadas Nacionales de Ingenieria de Software, Universidad el Pais Vasco, San Sebastián, Sep. 3-5, 1997, pp. 101-117.

Pastor, O., et al., "*Linking Object-Oriented Conceptual Modeling with Object-Oriented Implementation in Java*", VIII Conference on Database and Expert Systems Applications, (DEXA'1997). ISGN: 3-540-63478-9, LNCS (1308). Toulouse, France, 1997.

Pastor, O., et al., "*OO-METHOD: An OO Software Production Environment Combining Conventional and Formal Methods*", 9th International Conference on Advanced Information Systems Engineering, (CaiSE'1997) ISGN: 3-540-63107-0, LNCS (1250), Barcelona, Spain, 1997.

Pastor, O., et al., "*Object Oriented Conceptual Modeling Techniques to Design and Implement a Sound and Robust Oracle Environment*" Actas de Oracle OpenWorld 97, Viena (Austria) 7-11 Abstract publicado en Oracle OpenWorld Review p. 36, Apr. 1997.

Romero, J., et al., "*Una Herramienta de Generación Automática de Software*" (in Spanish) In Procs of Ideas-98—I Workshop Iberoamericano en Ingenieria de Requisitos y Ambientes Software, Porto Alegre, Brasil, Apr. 1998.

Gomez, J., et al., "*The Execution Model: A Component-Based Arquitecture to Generate Software Components from Conceptual Models*" In Procs of International Workshop on Component-based Information Systems Engineering, 10th International Conference on Advanced Information Systems Engineering, CAiSE-98 Pisa (Italia), pp. 87-94, ISSN 1170-487X.

Pastor, O., et al., "*From Object Oriented Conceptual Modeling to Automated Programming in Java*", Conceptual Modeling—ER'98. Lecture Notes in Comptuer Science (1507), pp. 183 197, Springer-Verlag, 1998, ISBN: 3-540-65189-6, ISSN: 0302-9743, Singapur.

Pastor, O., et al., "*Mapping Aggregation from Object-Oriented Conceptual Modeling to Object Oriented Programming*", In Procs of Third International Conference on Object-Oriented Technology, WOON-98, pp. 59-70, San Petersburgo, Russia, Jul. 1998.

Romero, J., et al., "*Automatic Object-Oriented Visual Programming with OO-METHOD*", Software and Hardware Engineering for the 21th Century, pp. 345-354, World Scientific and Engineering Society Press. ISBN: 960-8052-06-8.

Gomez, J., et al., "*From Object-Oriented Conceptual Modeling to Component-Based Development*" Database and Expert Systems Applications. Lecture Notes in Computer Science (1677) pp. 332-341 Springer-Verlag, 1999, ISBN: 3-540-66448-3; ISSN: 0302-9743, Florencia (Italia).

Torres, I., "Disseny i Implementació d'un Diccionari de Dades per a un Model Conceptual" (In Valenciano), Master Thesis, 2000.

Pelechano, V., et al., "An Automatic Code Generation Process for Dynamic Specialization Based on Design Patterns and Formal Techniques", Actas de la IFIP International Conference on Software: Theory and Practice (ICS-2000), 16th IFIP World Computer Congress, pp. 526 539, Pekin (China), Agosto 2000, ISBN-7-5053-6100-4, Publishing House of Electronics Industry.

Pastor, O., "*The OO Method Approach for Information Systems Modeling: From Object Oriented Conceptual Modeling to Automatic Programming*", Information Systems Journal, Elsevier Science, Oct. 2001, vol. 26/7, pp. 507-534.

Molina, P., "*Especificación, de Interfaz de Usuario en OO-METHOD*" (in Spanish) Master Thesis, Sep. 1998, DSIC/UPV, Valencia, Spain.

Insfrán, E., et al., "*Ingenieria de Requisitos aplicada al modelado conceptual de interfax de usuario*" (in Spanish), In Procs. Of IDEAS'2001, Santo Domingo, Heredia, Costa Rica, CIT, pp. 181-192, Apr. 2001.

Molina, P., et al., "*Specifying Conceptual Interface Patterns in an Object-Oriented Method with Code Generation*", In Proceedings of User Interfaces for Data Intensive Systems, UIDIS'2001, Zurich, Switzerland, IEEE Computer Society, pp. 72-79, Mary, 2001.

Molina, P., et al., "*Prototipado rápido de interfaces de usuario*", (in Spanish), In Procs. Of IDEAS'2002, La Habana, Cuba, pp. 78-90, Apr. 2002.

Molina, P., et al., "*JUST-UI: A User Interface Specification Model*" In Computer-Aided Design of User Interfaces III, Proceedings of the 4th International Conference on Computer-Aided Design of User Interfaces CADUI'2002, Kluwer Academics Publisher, Dordrecht, pp. 63-74, Valenciennes, France, May 2002.

Molina, P., et al.,"*User Interface Conceptual Patterns*", In Proceedings of the 4th International Workshop on Design Specification & Verification of Information Systems DSV-IS'2002, Rostock, Germany, pp. 201-214, Jun. 2002.

*Ingenieria de requisitos aplicada al modelado conceptual de interfacz de usuario*, Apr. 3, 2001 [Insfran01mp].

Pedro J. Molina, Oscar Pastor, Sofia Marti, Juan J. Fons and, Emilio Insfrán. "Specifying Conceptual Interface Patterns in an Object-Oriented Method with Code Generation" In Proceedings of 2nd IEEE Workshop on User Interfaces for Data Intensive Systems UIDIS'01. IEEE Computer Society, IEEE Press, ISBN 0-7695-0834-0, pp. 72-79, May 2001.

Pedro J. Molina, Santiago Meliá and Oscar Pastor, "Just-UI: A User Interface Specification Model", Computer-Aided Design of User Interfaces III, In Proceedings of the 4th International Conference on Computer-Aided Design of User Interfaces CADUI'2002, Valenciennes, France, Kluwer Academics Publisher, Dordrecht, chapter 5, pp. 63-74, ISBN 1-4020-0643-8, 2002.

Pedro J. Molina, Santiago Meliá and Oscar Pastor, "User Interface Conceptual Patterns", Design, Specification, and Verification of Interactive Systems, In Proceedings of the 4th International Workshop on Design Specification & Verification of Information Systems, DSV-IS'2002, Louvain-La-Neuve, Belgium and Germany, pp. 201-214, 2002. Also in Lecture Notes in Computer Sciences, Springer Verlag, vol. 2545.

Angel R. Puerta and David Maulsby, "Management of interface design knowledge with MOBI-D" In Proceedings of the 2nd international conference on Intelligent user interfaces, IUI'1997 (Orlando, Florida, EE.UU.), pp. 249-252, New York, USA, ACM Press, ISBN 0-89791-839-8, 1997.

François Bodart and Jean Vanderdonckt, "Towards a Systematic Building of Software Architectures: the Trident Methodological Guide", In Proceedings of Design, Specification and Verification of Interactive Systems, DSV-IS'95, pp. 262-278, Springer-Verlag, 1995.
Object Management Group, "UML Notation. Version 1.1, document OMG ad/97-08-05", 1997.
James Rumbaugh, Michael Blaha, William Premerlani, Frederick Eddy, William Lorenson, "Object-Oriented Modeling and Design". Prentice Hall, ISBN 0136298419, 1990.
Genera, "Genova 7.0", Available at http://www.genera.no/2052/tilkunde/09.04/default.asp.
Paulo Pinheiro da Silva and Norman W. Paton, "A UML-Based Design Environment for Interactive Applications", In Proceedings of 2nd IEEE Workshop on User Interfaces for Data Intensive Systems UIDIS'01, pp. 60-71, IEEE Computer Society, 2001.
Nuno Jardim Nunes, "Object Modeling for User-Centered.Development and User-Interface Design", PhD Thesis, Universidad de Madeira, Madeira, Portugal, 2001.
Fabio Paternó, "Model-Based Design and Evaluation of Interactive Applications", Springer-Verlag, 2000.
Dave Roberts, D. Berry, S. Isensee and J. Mullaly, "Designing for the User with OVID: Bridging User Interface Design and Software Engineering", New Riders Publishing, 1998.
Jean Vanderdonckt and François Bodart, "Encapsulating Knowledge for Intelligent Automatic Interaction Objects Selection", ACM Proc. of the Conf. on Human Factors in Computing Systems INTERCHI'93, Amsterdam, Holland, ACM Press, pp. 424-429,1993.
P.J. Barclay, T. Griffiths, J. McKirdy, N.W. Paton, R. Cooper, and J. Kennedy (1999). "The Teallach Tool: Using Models for Flexible User Interface Design" In Proceedings of CADUI'99. pp. 139-158, Kluwer Academic Publishers, 1999.
OMG. UML Notation. Version 1.1, OMG document ad/97-08-05, Sep. 1997.
OMG. UML Semantics. Version 1.1, OMG document ad/97-08-04, Sep. 1997.
Tim Bray, Jean Paoli, C. M. Sperberg-McQueen, Eve Maler. Extensible Markup Language (XML) 1.0 (Second Edition) W3C Recommendation, World Wide Web Consortium Oct. 6, 2000. http://www.w3.org/TR/REC-xml.
CHG-001 office actions dated May 25, 2001, Apr. 4, 2003, Oct. 23, 2002.
PCT and foreign counterparts of CHG-001 IPER dated Jul. 3, 2003 and intenrnational search report dated Jun. 13, 2002.
CHG-001.1P office actions dated Oct. 7, 2004; Jun. 7, 2005, Feb. 26, 2004 and Feb. 2, 2005.
CHG-001.2P office actions dated Apr. 25, 2005, Aug. 16, 2004 and Apr. 22, 2004.
CHG-001.3P office action dated Jul. 9, 2004, Jan. 26, 2005 and Jul. 14, 2005.
Pastor, O., et al., "From Object Oriented Conceptual Modeling to Automated Programming in Java", Conceputal Modeling—ER '98. Lecture Notes in Computer Science, pp. 183-197.
Molina, P., "Especificacacion, de Interfaz de Usuario en OO-Method", Masters Thesis in Spanish, Sep. 1998, DSIC/UPV, Valencia, Spain.
Molina, P., et al., "Specifying Conceptual Interface Patterns in an Object-Oriented Method with Code Generation", Proceedings of User Interfaces . . . UIDIS '2001, Zurich.
Insfrans, E. "Ingenieria de Requistos aplicada al modelado conceptual de interfac de usuario", Proc of IDEAS'2001, Santo Domingo, Her Costa Rica, CIT, pp. 181-192, Apr. 2001.
Nunes, "Object Modeling for User-Centered Development and User Interface Design: the Wisdom Approach" PhD Thesis, Apr. 2001.
Anonymous, "Features of VDMTools", IFAD VDMTools Product Description, Publisher unknown (Sep. 23, 1998) p. 1-8 XP002200823 and VDMTools VDM++Toolbox User Manual.
Hsia, "Your Guide to Rational Rose Add-Ins" Rose Architect Magazine-Summer Edition [online] Jun. 1999 pp. 1-9, XP002200824, Retrieved from Internet.
Brugge, "Rose Tutorial," School of Computer Science, Carnegie Mellon University, Pittsburgh, Pa (Sep. 22, 1997).

Anonymous, "Rational Rose 98i: Using RoseJ" http://www.se.fh-heilbronn.de/usefulstuff/rational%20Rose%2098i%20Documentation/Rational%20Rose/Documentation/Rose98i Java pdf 1998.
Griffith, et al., "Tealach: A Model-Based User Interface Development Environment For Object Databases" Department of Computer Science, Univ of Manchester, UK Citeseer 1999.
DaSilva et al., "Generating User Interface Code From Declarative Models: The Teallach Approach" Dept of Computer Science, Univ of Manchester, UK Aug. 13, 1999.
DaSilva et al., "Generating User Interface Code in a Model Based User Interface Development Environment" Dept of Computer Science, Univ of Manchester, UK Copr 2000 ACM.
Koob et al, "Industrial Usage of Formal Development Methods-the VSE Tool Applied in Pilot Projects" Bundesant fur Sicherhait in der Informationstechnik, Copr. 1996 IEEE.
Jaquot et al., "Early Specification of User-Interface: Toward a Formal Approach", Proceedings of the 1997 International Conference on Software Engineering, Boston, May 17-23.
Pastor, O et al. "Specifying Interface Properties in Object Oriented Conceptual Models", Working Conf on Advanced Visual Interfaces AVI2000 Palermo, Italy ACM Press, pp. 302-304.
Koob, F, "The VSE development method-A way to engineer high-assurance software systems" Jun. 22-23, 1995 xp002200825 [koob95].
Romero, J. Diseno de un Entorno de Produccion de Software basado en el Lenguage de Especificacion OASIS . . . Masters Thesis in Spanish, Univ of Valencia, Mar. 1996.
Romero, J. "Una Herramienta de Genaracion Automatica de Software" Proc of IDEAS-98-1 Workshop Iberoamericano en Ingenieria de . . . , Porto Alegre, Brasil, Apr. 1, 1998.
Torres, I. "Disseny i implementacio d un Diccionari de Dades per a un Model Conceptual" Masters Thesis in Spanish, Univ of Valencia, Spain, Jun. 2002.
Letelier, P. et al. "Oasis Version 3.0: Un Enfoque Formal Para el Modelado Conceptual Orientado a Objectos" ISBN 84-7721-663-0, Legal Deposit: V-3484-1998, Servicio de Publica.
Pelechano, V. "OO-Method: Implementacion de un Entorno Grafico para el Analisis y Diseno de Sistemas De Informacion OO" Masters Thesis, Univ of Valencia, Spain 1994.
Pelechano, V. "CASE OO-Method: Un Entorno de Produccion Automatica de Software" Actas de la Convencio Informatica Latina CIL-95, Barcelona, Spain Jun. 1995.
Pastor, O. et al. "An Object Oriented Methodological . . . Automated Prototyping Feasible", Database and Expert Systems Applic, Lecture Notes in Computer Sc, pp. 29-39, Sep. 9, 1996.
Pelechano, V. et at "Implementacion y comprobacion de restricciones . . . a objectos" Il Jornadas Nacionales de Ingenierade Software, Univ el Pais Vasco Sep. 3-5, 1997, pp. 101-117.
Pastor, O. et al. "Linking Object-Oriented Conceptual modeling . . . In Java" VIII Conf on Database and Expert Systems Appl, DEXA 1997, ISBN 3-540-63478-9.
Pastor, O. et al. "OO-Method: An OO software Production Environment . . . Formal Methods" 9th Intnl Conf on Advanced Info Systems Eng., CAiSE 1997, Barcelona, Jun. 16, 1997.
Pastor, O. et at "Object Oriented Conceptual Modeling Techniques to Design and Implement . . . Oracle Environment" Actas de Oracle OpenWorld '07, Vienna, Apr. 1997.
Gomez, J. et al. "The Execution Model: A Component-based Architecture to Generate Software Components from Conceptual Models" CAiSE-98 Pisa, Italia, pp. 87-94, Jun. 8, 1999.
Pastor, O. et al "Mapping Aggregation from Object-Oriented Conceptual Modeling to Object-Oriented Programming" Proc 3rd Intnl Conf on OO Technology, WOON-98, pp. 59-70, Jul. 2, 1998.
Romero, J. et al "Automatic Object-Oriented Visual Programming with OO-Mehtod" Software and Hardware Engineering . . . , World Scientific & Eng Soc. Press, pp. 345-354, Jul. 1999.
Gomez, J. et al. "From Object-Oriented Conceptual Modeling to Component-based Development" Lecture Notes Comp Sc pp. 332-341, Springer Verlag 1999 ISBN 3-540-66448-3, Aug. 1999.
Pelechano, V et al "An Automatic Code Generation Process . . . Based on Design Patterns and Formal Techniques" 16th IFIP World Computer Congress, pp. 526-539, Peking Aug. 2000.

IPER report dated Jul. 3, 2003 on PCT application PCT/US01/06790, filed Mar. 2, 2001.

Office actions dated Oct. 7, 2004, Jun. 7, 2005, Feb. 26, 2004 and Feb. 2, 2005 in related case CHG-001.1P, now US patent 7,278,130.

Office actions dated Apr. 25, 2005, Aug. 16, 2004 and Apr. 22, 2004 in related case CHG-001.2P (now abandoned).

Office actions dated Jul. 9, 2004, Jan. 26, 2005 and Jul. 14, 2005 in related case CHG-001.3P, now US patent 7,137,100.

Prior art cited in U.S. patent 7,334,216 (related case CHG-001.4P).

Pelechano, V. et al. "OO-Method: Una apuesta por la integracion de technicas formales y semi-formales en la ingenieria de requistos" Nov. 14-15, 1996.

Pastor, O. et al "Generacion Automatica de Prototipos en Entornos Internet/Intranet a partir . . . ", Computacion y Sistemas, No. 1, vol. 3 ISSN 1405-5546, pp. 38-49, 1999.

Eva Campos "El Patron Conceptual de Herencia en OASIS 3.0/OO-Method: analisis e Identificacion de Patrones para Generacion Automatica de Codigo", Masters Thesis, Sep. 1999.

Manoli, A "El Patron Conceptual de Herencia en OASIS 3.0/OO-Method: analisis y Generacion de Codigo en Java utilizando Patrones de Diseno" Masters Thesis Sep. 1999.

Felip Miguel, "Cataleg de Patrons d'Agregacio per a OO-Method: Especificacio i Implementacio" Masters Thesis, Univ of Valencia, Spain, 2000.

Roberto Mencia, "Catalogo de Patrones de Herencia para OO-Method: Especificacion e Implementacion" Masters Thesis, Univ of Valencia 2000.

Pelechano, V. "Tratamiento de las relaciones taxonomicas en entornos de produccion automatica de software: Una Aprox . . . en patrones", Masters Thesis, Univ of Valencia, 2001.

Morales, R. Generacion Automatica de Modelos Conceptuales a partir de Especificaciones de Requistos, Masters Thesis, Univ of Valencia 2000.

Infran, E. et al. "Ingenieria de Requisitos aplicadda . . . conceptual de interfaz de usuario" Proc. of IDEAS'2001, Santo Domingo, Heredia, Costa Rica, CIT pp. 181-192, Apr. 2001.

Sanchez, J. et al "From User Requirements to User Interfaces: A Methodological Approach", Advanced Information Systems Engineering CAISE 2001 LNCS 2068, pp. 60-75, 2001.

Jordi, J. "Modelos Organizacionales e Ingenieria de Requistos", Masters Thesis, Univ of Valencia 2001.

Jean Vanderdonckt et al, "Encapsulating Knowledge . . . ", ACM Proc. of the Conf. on Human Factors in Computing Systems IINTERCHI'93, Amsterdam, Holland, ACM Press, pp. 424-429,1.

P.J. Barclay et al (1999). "The Teallach Tool: Using Models for Flexible User Interface Design"In Proceedings of CADUI'99. pp 139-158, Kluwer Academic Publishers, 1999.

OMG. UML Notation. Version 1.1, OMG document ad/97-08-05, Sep. 1997.

OMG. UML Semantics. Version 1.1, OMG document ad/97-08-04, Sep. 1997.

Tim Bray, Jean Paoli, C. M. Sperberg-McQueen, Eve Maier. Extensible Markup Language (XML) 1.0 (Second Edition) W3C Recommendation, World Wide Web Consortium Oct. 6, 2000.

Ranville, et al. all of Ford Motor Company, "Automating Software specification, Design and Synthesis for Computer Aided Control System Design Tools", IEEE 2000.

Liburdy et al, "Formal Specification Languages in Conformance Testing" presented at the 11th International Software Quality Week, May 26-29, 1998 pp. 1-15.

Angel R. Puerta et al, "Management of interface design . . . " In Proc of the 2nd intnl conf on Intelligent user interfaces, IUI'1997 (Orlando, Florida, EE.UU.), pp. 249-252, New.

François Bodart et al ". . . Trident Methodological Guide", In Proceedings of Design, Specification and Verification of Interactive Systems, DSV-IS'95, pp. 262-278, Springer-Ver.

Object Management Group, "UML Notation. Version 1.1, document OMG ad/97-08-05", 1997.

James Rumbaugh et al, "Object-Oriented Modeling and Design". Prentice Hall, ISBN 0136298419, 1990.

Genera, "Genova 7.0", Available at http://www.genera.no/2052/tilkunde/09.04/default.asp.

Paulo Pinheiro da Silva et al, "A UML-Based Design Environment . . . ", In Proc of 2nd IEEE Workshop on User Interfaces . . . UIDIS'01, pp. 60-71, IEEE Computer Society, 2001.

Nuno Jardim Nunes, "Object Modeling for User-Centered Development and User-Interface Design", PhD Thesis, Universidad de Madeira, Madeira, Portugal, 2001.

Fabio Paternó, "Model-Based Design and Evaluation of Interactive Applications", Springer-Verlag, 2000.

Dave Roberts, D. Berry, S. Isensee and J. Mullaly, "Designing for the User with OVID: Bridging User Interface Design and Software Engineering", New Riders Publishing, 1998.

* cited by examiner

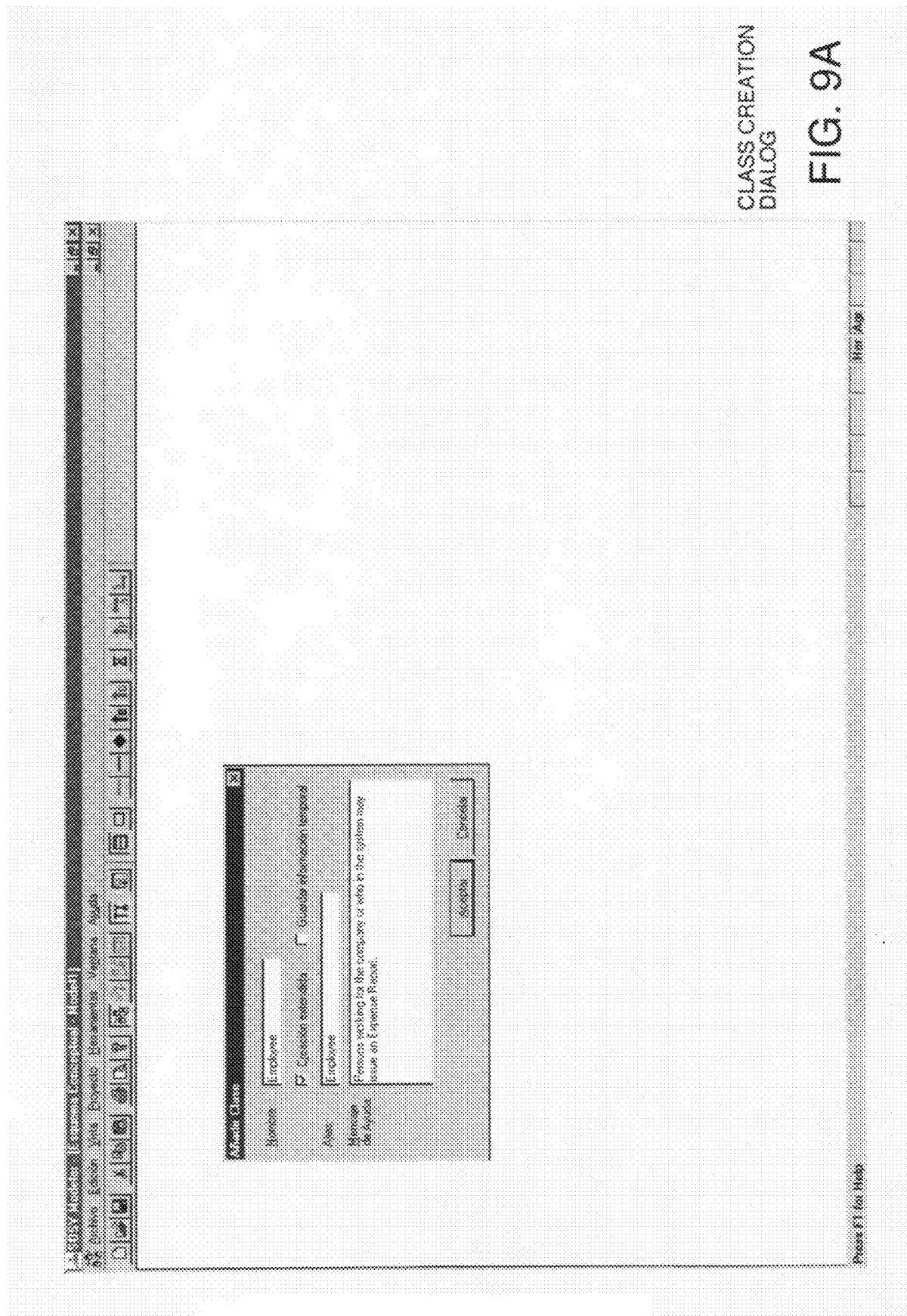

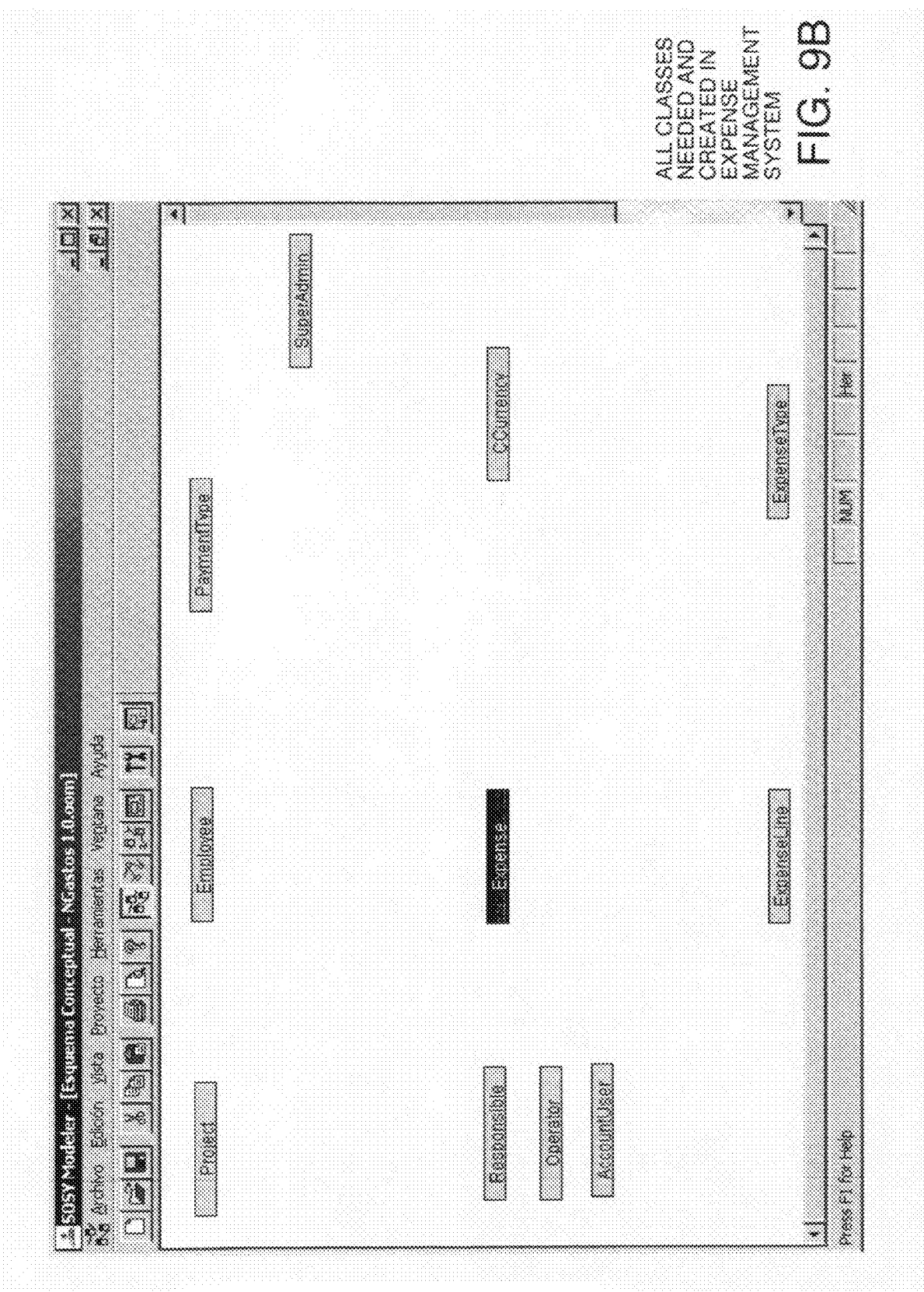
FIG. 9B ALL CLASSES NEEDED AND CREATED IN EXPENSE MANAGEMENT SYSTEM

DIALOG TO CREATE AND MODIFY RELATIONSHIPS BETWEEN CLASSES

GRAPHIC DIALOG TO CREATE RELATIONSHIPS BETWEEN CLASSES AND GRAPHICALLY SHOW THE RELATIONSHIPS SO CREATED

SERVICES OF CLASS "EXPENSE"

DIALOG TO DEFINE FORMULA FOR "DELETEALL" TRANSACTION

INTEGRITY CONSTRAINTS OF EXPENSE CLASS

DIALOG BOX TO CREATE EVALUATION OF "CAUSE" ATTRIBUTE WITH THE "MODIFY" EVENT TO FORM PART OF FUNCTIONAL MODEL

AGENT RELATIONSHIP DIALOG THAT CAN BE USED TO SET WHICH SERVICES "ACCOUNT USE" CAN ACCESS AND VISIBILITY OF CLASS ATTRIBUTES FOR THIS USER

FIG. 17 STATE TRANSITION DIAGRAM FOR CLASS "EXPENSE"

DIALOG BOX USED BY SOSY MODELER TO ESTABLISH A SET OF ATTRIBUTES TO BE DISPLAYED FOR THE "EXPENSE" CLASS

DIALOG BOX USED BY SOSY MODELER TO ESTABLISH THE SEARCHING CRITERIA FOR THE EXPENSE CLASS AND TO ESTABLISH THE FILTER FORMULA TO USE AND THE VARIABLES TO REQUEST THE USER TO ENTER

AUTOMATIC SOFTWARE PRODUCTION SYSTEM

CROSS-REFERENCE TO RELATED APPLICATIONS

The parent case of this divisional application was a continuation-in-part application (Ser. No. 09/872,413, filed Jun. 1, 2001, now U.S. Pat. No. 7,278,130) of a prior U.S. patent application filed 4 Apr. 2000, Ser. No. 09/543,085 (now U.S. Pat. No. 6,681,383). This application is also related to the subject matter of the following divisional applications having Ser. No. 11/542,827 which was filed on Oct. 4, 2006, now U.S. Pat. No. 7,555,742; having Ser. No. 11/543,426 which was filed on Oct. 5, 2006, now U.S. Pat. No. 7,584,451. This divisional application is also related to the subject matter claimed in another continuation-in-part applications entitled "Automatic Software Production System", filed which was filed on Jun. 1, 2001 and having Ser. No. 09/872,087 (now abandoned) and is related to a divisional thereof filed on Jun. 24, 2004 having Ser. No. 10/877,492 which is still pending, and is also related to another divisional thereof filed on Sep. 26, 2008 having Ser. No. 12/284,947, pending. This application is also related to a third Continuation in Part application of prior U.S. patent application filed 4 Apr. 2000, Ser. No. 09/543,085 (now U.S. Pat. No. 6,681,383), said third CIP being filed Jun. 1, 2001 and having Ser. No. 09/872,333 (now U.S. Pat. No. 7,137,100). This application is also related to a fourth Continuation in Part application of prior U.S. patent application filed 4 Apr. 2000, Ser. No. 09/543,085, said fourth CIP being filed Jan. 31, 2003 and having Ser. No. 10/356,250 (now U.S. Pat. No. 7,334,216) and a divisional application thereof having Ser. No. 11/977,218 filed Oct. 23, 2007, now allowed.

FIELD OF THE INVENTION

The present invention relates to computer systems and more particularly to an automatic software production system and methodology.

COMPUTER PROGRAM LISTING APPENDIX

The assembly code computer program listing having file name TOTAL.ASM size 39,107,073 bytes, created on May 23, 2001 which was submitted in duplicate with this patent application on a single CD-ROM is hereby incorporated by reference. The file is in TXT format on a disc compatible with IBM-PCs and the Windows 98 operating system, and can be opened by any word processor.

BACKGROUND OF THE INVENTION

Software engineering is the application of a systematic and disciplined approach to the development and maintenance of computer programs, applications, and other software systems. Due to the increasing computerization of the world's economy, the need for effective software engineering methodologies is more important than ever.

The traditional software development process involves a number of phases. First, the requirements of the program are specified, typically in the form of a written specification document based on customer needs. Then, a software developer writes source code to implement the requirements, for example, by designing data structures and coding the system logic. Finally, the software developer undergoes an extensive testing and debugging phase in which mistakes and ambiguities in the requirements are identified and errors in the software code are fixed. Having to refine the system requirements is one of the most serious problems that might occur, because any modification to the requirements necessitates a redevelopment of the source code, starting the process all over again. Thus, the testing and debugging phase is the longest phase in the software engineering process and the most difficult to estimate completion times.

For the past forty years, there have been many attempts to improve isolated portions of the software engineering process. For example, the creation of first higher-level languages such as FORTRAN and then of structured programming languages such as ALGOL has helped ease the burden of implementing the system logic. As another example, the introduction of object-oriented methodologies has helped in the design and implementation of data structures. These improvements in the software engineering process have lessened the mismatch between the problem space, which is the Conceptual Model for the application, and the solution space, which is the actual software code. Nevertheless, some mismatch between the problem space and the solution space remains, which gives rise to an opportunity for programming errors. Because of the programming errors, it is necessary to undergo an extensive testing and debugging phase to isolate and fix the software faults.

Lately, there has been some interest in the use of "requirements analysis" and Computer Aided Software Engineering (CASE) to facilitate the first phase of the software engineering process, which is the identification and specification of the requirements. In particular, these approaches attempt to allow for software engineers to formally specify the requirements and build a prototype to validate and test the requirements. After the requirements are tested, the prototype is discarded and the software engineer develops the complete software application based on the requirements.

One example is known as "OMTROLL", whose objective is to assist software designers by means of an Object Modeling Technique (OMT)-compliant graphical notation to build the formal specification of the system. This specification is based on the TROLL specification language and has to be refined to a complete system specification. In addition, OMTROLL has a CASE support called TrollWorkbench, which provides a prototyping function by generating an independently executable prototype from a graphical conceptual specification. The prototype generated is a C++ program that includes the static/dynamic aspects of the system and uses an Ingress database as a repository of the specification.

OBLOG is another object-oriented approach for software development that falls within the scope of the European ESPRIT project IS-CORE (Information Systems-Correctness and Reusability). The OBLOG semantics is formalized in the context of the theory of categories. OBLOG also employs a CASE tool for introducing specifications and enables a developer to build a prototype by supplying rewrite rules to convert the specifications into code for the prototype. The rewrite rules must be written using a specific language provided by OBLOG.

Another approach that focuses more on levels of formalism is the Object System Analysis model (OSA). The aim of OSA is to develop a method that enables system designers to work with different levels of formalism, ranging from informal to mathematically rigorous. In this context, this kind of tunable formalism encourages both theoreticians and practitioners to work with the same model allowing them to explore the difficulties encountered in making model and languages equivalent and resolve these difficulties in the context of OSA for a particular language. OSA also has a CASE support tool called IPOST, which can generate a prototype from an OSA model to validate the requirements.

A different approach has been proposed by SOFL (Structured-Object-based-Formal Language), whose aim is to address the integration of formal methods into established industrial software processes using an integration of formal methods, structured analysis and specifications, and an object-based method. SOFL facilitates the transformation from requirements specifications in a structured style to a design in an object-based style and facilitates the transformation from designs to programs in the appropriate style. In accordance with the previous arguments, the SOFL proposal attempts to overcome the fact that formal methods have not been largely used in industry, by finding mechanisms to link object-oriented methodology and structured techniques with formal methods, e.g. VDM (Vienna Development Method) style semantics for its specification modules. Combining structured and objected-oriented techniques in a single method, however, makes it difficult to clarify the method semantics; thus, effective tool support is necessary for checking consistency.

Still another approach is known as TRADE (Toolkit for Requirements and Design Engineering), whose conceptual framework distinguishes external system interactions from internal components. TRADE contains techniques from structured and object-oriented specification and design methods. A graphical editor called TCM (Toolkit for Conceptual Modeling) is provided to support the TRADE framework.

Although these approaches are of some help for the first phase, i.e. in refining the requirements before the computer application is coded, they do not address the main source for the lack of productivity during later phases of the software engineering process, namely the programming and testing/debugging phases. For example, once the requirements are identified, the software engineer typically discards the prototype generated by most of these approaches and then designs and implements the requirements in a standard programming language such as C++. The newly developed code, due to the mismatch between the problem space and the solution space, will commonly contain coding errors and will need to be extensively tested and debugged.

Even if the prototype is not discarded and used as skeleton for the final application, the software developer must still develop additional code, especially to implement the user interface and error processing. In this case, there still remains the need for testing and debugging the code the programmer has written. The rule-rewriting approach of OBLOG, moreover, fails to address this need, because the difficulties associated with programming are merely shifted one level back, to the development of the rewriting rules in an unfamiliar, proprietary language.

Other approaches include those of Rational and Sterling, but these are not based on a formal language.

Therefore, there exists a long-felt need for improving the software engineering process, especially for reducing the amount of time spent in the programming and testing phases. In addition, a need exists for a way to reducing programming errors during the course of developing a robust software application. Furthermore, there is also a need for facilitating the maintenance of software applications when their requirements have changed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9A is a screenshot of the dialog box to create the class which simply involves giving it a name.

FIG. 9B is screenshot of a graphic interface box showing the classes that have been defined to store the pertinent information and provide the pertinent services to implement a computer program that meets the above defined requirements. Defining these classes starts the process of building the Formal Specification in the high level repository.

DETAILED DESCRIPTION OF THE PREFERRED EMBODIMENT

An automatic software production system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
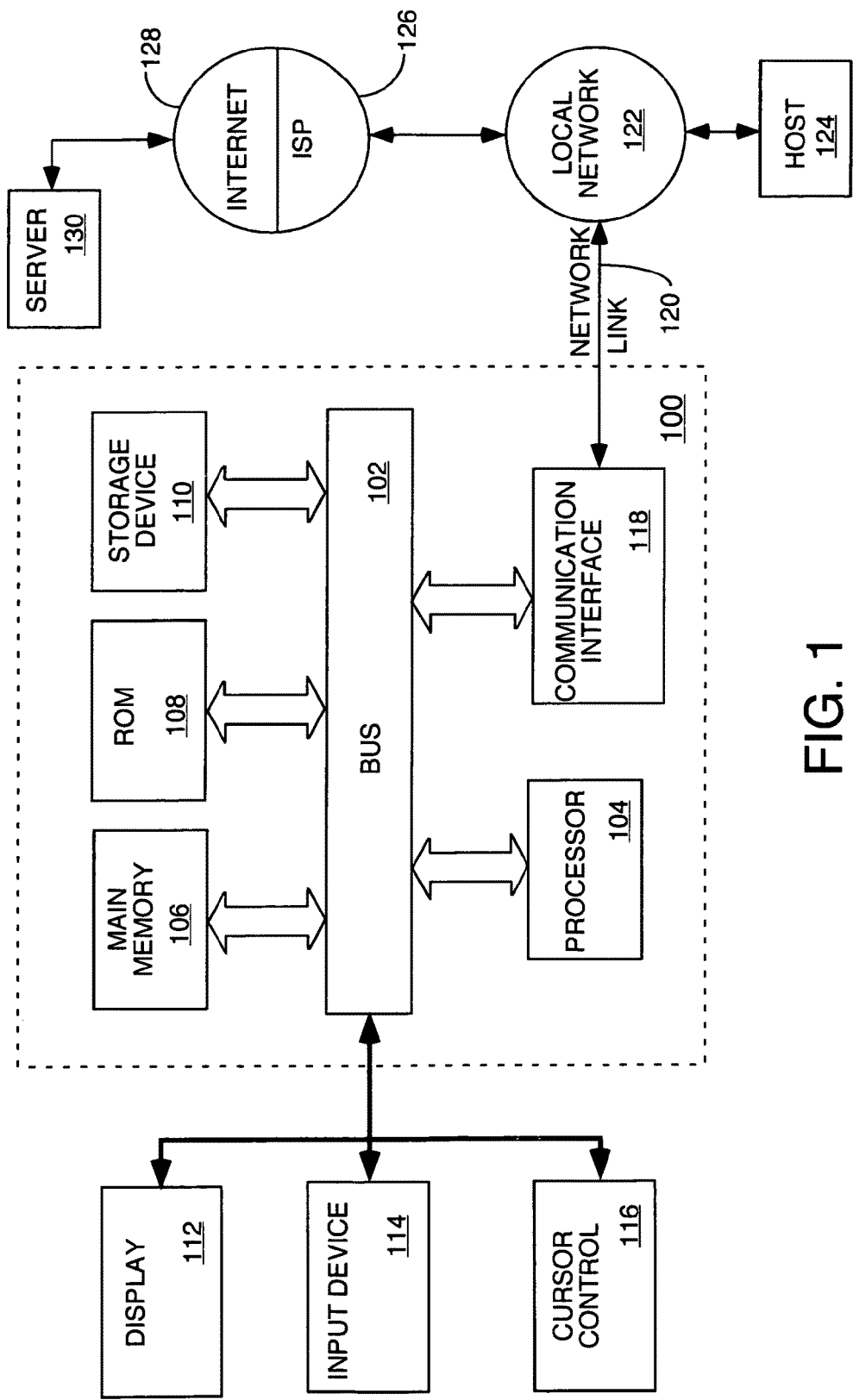
FIG. 1 depicts a computer system that can be used to implement an embodiment of the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for automatic software production. According to one embodiment of the invention, automatic software production is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for automatic software production as described herein. The received code may be executed by processor 104 as it is received, and/or stored in storage device 110, or other non-volatile storage for later execution. In this manner, computer system 100 may obtain application code in the form of a carrier wave.

Conceptual Overview

Figure 2:
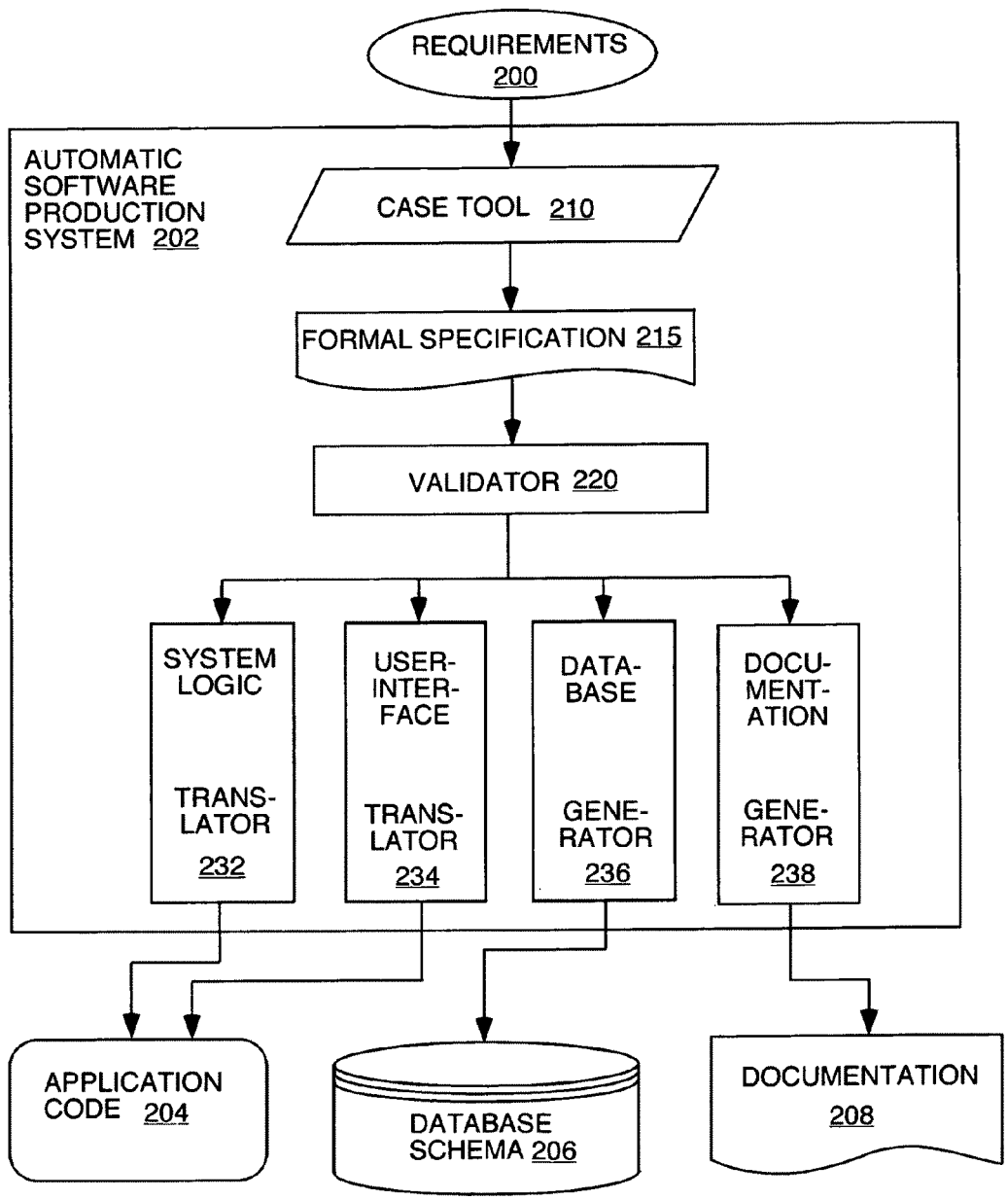
FIG. 2 is a schematic block diagram illustrating the high-level architecture and data flows of an automatic software production system in accordance with one embodiment of the present invention.

FIG. 2 is a schematic block diagram illustrating the high-level architecture and data flows of an automatic software production system 202 in accordance with one embodiment of the present invention. The automatic software production system 202 is configured to accept requirements 200 as input, and produce a complete, robust application 204 (including both system logic and user-interface code), a database schema 206, and documentation 208. In one implementation, the automatic software production system 202 includes a Computer Aided Software Engineering (CASE) tool 210 front end to allow a user to input the requirements, a validator 220 for validating the input requirements 200, and several translators to convert the validated input requirements 200 into a complete, robust application 204. These translators may include a system logic translator 232, a user-interface translator 234, a database generator 236, and a documentation generator 238.

During operation of one embodiment, requirements 200 specifying a Conceptual Model for the application are gathered using diagrams and textual interactive dialogs presented by the CASE tool 210. Preferably, the CASE tool 210 employs object-oriented modeling techniques to avoid the complexity typically associated with the use of purely textual formal methods. In one implementation, the Conceptual Model is subdivided into four complementary models: an object model, a dynamic model, a functional model, and a presentation model. These models are described in greater detail hereinafter. After gathering the requirements 200, the CASE tool 210 stores the input requirements as a formal specification 215 in accordance with a formal specification language, for example, the OASIS language, which is an object-oriented language for information systems developed at developed at the Technical University of Valencia, Spain. Using extended grammar defined by the formal language, the validator 220 syntactically and semantically validates the formal specification 215 to be correct and complete. If the formal specification 215 does not pass validation, no application is allowed to be generated; therefore, only correct and complete applications are allowed be generated.

If, on the other hand, the formal specification 215 does indeed pass validation, automatic software production processes, some of the referred to as "translators" (system logic and user interface ones) are employed to implement a precise execution model that corresponds to the validated formal specification 215. In particular, translators 232 and 234 produce application source code 204 in a high-order language such as C++, Visual Basic or JAVA for the application's system-logic and user-interface, respectively. In one implementation, a database generator 236 also produces instructions in, for example, a Structure Query Language (SQL) scripting language to create the data model for the application in an industry-standard ANSI-92 SQL Relational Database Management System (RDBMS). However, in other embodiments, the database translator 236 just outputs a file having a file structure that is known to the system logic created by the system logic translator 232. Basically, the structure of the database or table or other data structure that database generator 236 creates is defined by the objects and classes defined in the Conceptual Model. The only thing that is necessary is that translator 236 provide at least a place to store the states of the objects in the system as defined by their attribute values and that the attribute values be stored in some format known to the system logic translator such that the values of attributes can be retrieved from whatever data structure is created by translator 236. In other species, the database generator creates a data structure defined by the Conceptual Model as well as for storing other data from other sources or entered by remote client computers for use by the code created by the system logic translator 232.

In addition, one implementation also employs a document generator 238 to automatically generate serviceable system documentation from the information introduced in the Conceptual Model.

Case Modeler

As mentioned herein above, the CASE tool 210 preferably employs object-oriented modeling techniques to avoid the complexity typically associated with the use of purely textual formal methods. Rather, four complementary models, that of the object model, the dynamic model, the functional model and the presentation model, are employed to allow a designer to specify the system requirements. In contrast with conventional techniques, however, the CASE tool 210 actually captures a formal specification of the designer's system "on the fly" according to a formal specification language, while the designer is specifying the system with the CASE tool 210.

This feature enables the introduction of well-defined expressions in the specification, which is often lacking in the conventional methodologies. In particular, the CASE tool 210 enforces the restriction that only the information relevant for filling a class definition in the formal specification language can be introduced. The use of a formal specification, input by means of the CASE tool 210, therefore provides the environment to validate and verify the system in the solution space, thereby obtaining a software product that is functionally equivalent to the specification as explained hereinafter. Nevertheless this is always done preserving this external view which is compliant with the most extended modeling techniques, as stated before. In this way, the arid formalism characteristic of many conventional approaches is hidden from the designer, who is made to feel comfortable using a graphical modelling notation.

With respect to the notation, conceptual modelling in one embodiment employs diagrams that are compliant with the Unified Modelling Language (UML); thus, system designers need not learn another graphical notation in order to model an information system. In accordance with the widely accepted object oriented conceptual modeling principles, the Conceptual Model is subdivided into an object model, a dynamic model, and a functional model. These three models, however, are insufficient by themselves to specific a complete application, because a complete application also requires a user interface. Therefore, the CASE tool 210 also collects information about user-interface patterns, in a fourth model referred to as "Presentation Model", which will be translated into the code for the application. In one embodiment, the CASE tool 210 collects information organized around projects which correspond to different applications. Each project built by the CASE tool 210 can include information about classes, relationships between classes, global transactions, global functions, and views.

Each class contains attributes, services, derivations, constraints, transaction formulas, triggers, display sets, filters, population selection patterns, a state transition diagram and formal interfaces. In addition to the information in these lists, a class can also store a name, alias and a default population selection interface pattern. Extra information is stored as remarks that the designer can input information about why a class does exist in a model.

Each attribute can have the following characteristics: name, formal data type (e.g. constant, variable, derived), data type (real, string, . . . ), default value, whether the attribute is an identifier for distinguishing the objects of the class, length, whether the attribute is required when the object is created, whether the attribute can be assigned a NULL value, and a field to introduce some remarks about why the attribute has been created. Each attribute can also include a list of valuations, which are formulas that declare how the object's state is changed by means of events. Valuation formulas are structured in the following parts: condition (that must be satisfied to apply the effect), event and effect of the event to the particular attribute. An attribute may also include user interface patterns belonging to the presentation model to be applied in the corresponding services arguments related to the attribute.

Services can be of two types: events and transactions. Events are atomic operations while transactions are composed of services which can be in turn events or transactions. Every service can have the following characteristics: name, type of service (event or transaction), service alias, remarks and a help message. Events can be of three types: new, destroy or none of them. Events can also be shared by several classes of the project. Shared events belong to all classes sharing them. Transactions have a formula that expresses the composing of services. In addition to this information, services store a list of arguments whose characteristics are: name, data type, whether nulls are allowed as a valid value, whether the argument represents a set of objects (collection), default value, alias and remarks. Additionally, for each argument user-interface patterns related to arguments are: introduction pattern, population selection pattern, defined selection pattern and dependency pattern. The class can also store a list of derivations, and constraints. Each derivation specifies a list of pairs condition-formula, specifying which formula will be applied under every condition. Each constraint is a well formed formula plus the error message that will be displayed when the constraint was violated. For the dynamic constraints, the formula will be internally translated into a graph which constitutes the guide for its evaluation.

A class can also store triggers. Each trigger may be composed of trigger target specified in terms of self, class or object, trigger condition, triggered action (service plus a list of possible agents) to be activated and a list of default values associated with the arguments of the related service. A class can also have display sets, filters and population selection patterns as user-interface patterns of the presentation model affecting the class. Each display set can store elements of visualization (attributes to be displayed to the user). Each filter is composed of a well formed formula and a list of auxiliary variables that are useful to define the formula. The population selection pattern is related to a display set and a filter. Classes also have a State Transition Diagram which is a set of states and transitions between them. Each state transition is related to an action (service plus list of possible agents) that can change the state of the object. Actions may have preconditions and the corresponding error message (to be displayed if the precondition does not hold). Preconditions are formulas that need to be satisfied in order to execute the corresponding action. In case of non-deterministic transitions, determinism is achieved by means of labelling each transition with a control condition. A control condition is a formula that specifies which state transition will take effect. Finally, a class can store a list of interfaces. Each interface stores the list of services that an actor can execute (agents) and the list of attributes that can be observed.

The model also maintains information on relationships between classes, which can be of two types: aggregation and inheritance. Each aggregation relationship captures the information about cardinalities, whether the aggregation is static or dynamic, whether the aggregation is inclusive or referential, whether the aggregation has an identification dependence, and a grouping clause when the aggregation is multi-valued. Each inheritance relationship stores the name of the parent class, the name of the child class and whether the specialization is temporary or permanent. Finally, if the specialization is permanent it stores a well formed formula on constant attributes as specialization condition. If the specialization is temporary it stores either condition or the list of events that activate/deactivate the child role.

Finally, the project can also capture a list of global transactions in which the relevant characteristics to be stored include the name of the global interaction, the formula, and the list of arguments. A list of global functions can also be captured, in which each function stores a name, a data type of the returned value, a set of arguments (similar to services), and comments about the function.

A project may have a set of views, that constitute the particular vision that a set of selected agent classes has of the system. That is, the set of formal interfaces (attributes and services) allowed per agent class. Each agent class has a list of interfaces.

Object Model

The object model is a graphical model that allows the system designer to specify the entities employed in the application in an object-oriented manner, in particular, by defining classes for the entities. Thus, the class definitions include, for example, attributes, services and class relationships (aggregation and inheritance). Additionally, agent relationships are specified to state which services that objects of a class are allowed to activate.

Figure 3:
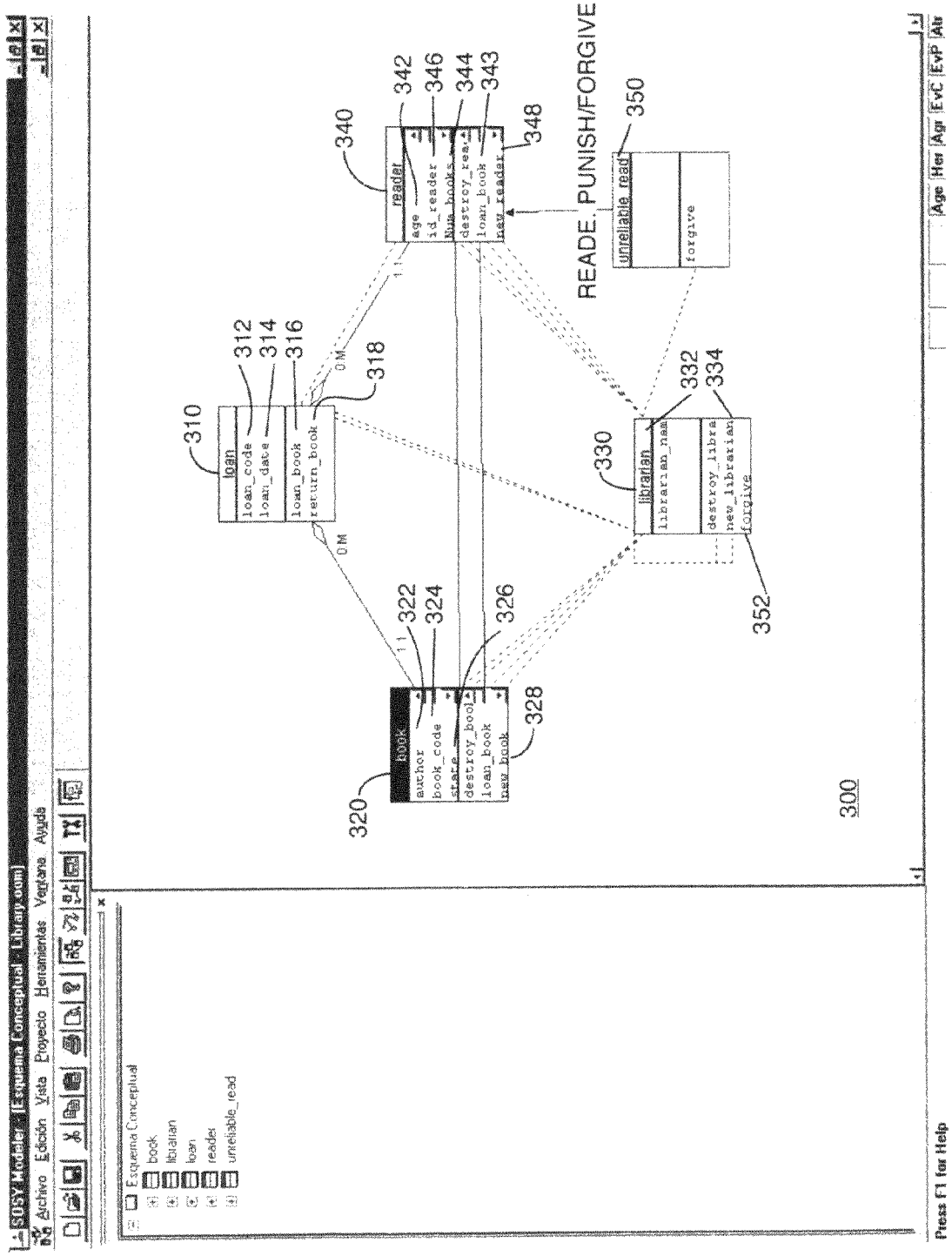
FIG. 3 illustrates an example of an object model for a library system with readers, books, and loans.

FIG. 3 illustrates an example of an object model diagram 300 for the library system example with readers, books, and loans which shows the agent relationships between classes. An agent relationship between classes means one class can invoke the services of another class. FIG. 3 is included here to show that classes have attributes and services and they have relationships to other classes. Classes, in the object model 300, are represented as rectangles with three areas: the class name, the attributes and the services. In the example, the object model 300 includes a loan class 310 with attributes to indicate a loan code 312 and a loan date 314 for when the loan was made. The loan class 310 also includes two services (methods) including one for loaning a book 316 and another for returning the book 318.

The object model 300 also includes a book class 320 having attributes that specify the author 322 of the book, a book code 324, and a state 326 (e.g. reserved, in circulation, checked out, etc.) and services such as new_book 328 for creating a new book. Another class is a librarian class 330, whose name 332 is specified by an attribute and whose creation is done by a new_librarian service 334.

Each reader belonging to the library is described with the reader class 340, whose attributes include the age 342, the number of books 344 checked out by the reader, and the name 346 of the reader. Readers may be created with a new_reader service 348. An unreliable reader class 350 is also part of the object model to indicate for those readers 340 who cannot be trusted (e.g. due to unpaid fees for overdue books). An unreliable reader 350 may be forgiven 352 by a librarian 330.

In an object model 300, inheritance relationships are represented by using arrows to link classes. For example, the unreliable reader class 350 is connected to the reader class 340 with an arrow; thus, the unreliable reader class 350 is specified to inherit from, or in other terms is a subclass of, the reader class 340. The arrow linking the subclass and the base class can be leveled with a specialization condition or an event that activates or cancels the child role. In the exemplary object model 300, the arrow between the unreliable reader class 350 and the reader class 340 is labeled with a "reader.punish/forgive" service. Thus, if a reader 340 is punished, that person becomes an unreliable reader 350. Conversely, if an unreliable reader 350 is forgiven 352, that person becomes a normal reader 340.

Aggregation relationships are represented in the object model 300 by using a line with a diamond.

The class which has a diamond closest to it is called the composite class and the other class is the component class. The aggregation determines how many components can be attached to a given composite and vice versa (cardinality is the minimum and maximum numbers of components and composites that can participate in the relationship). In the example, a book 320 and a reader 340 are aggregated in a loan 310, because a loan 310 involves lending a book 320 to a reader 340 of the library. The representation of aggregation also includes its cardinalities in both directions (i.e. minimum and maximum numbers), role names, and relationship name. In the example, the cardinality of the loan:book relationship from loan to book is 1:1 because exactly one book is the subject of a loan in this Conceptual Model, and from book to loan is 0:1 because a book can be lent or not in a certain moment.

Furthermore, agent relationships are represented by using dotted lines that connect the associated client class and services of the server class.

In the example, a librarian 330 is an agent of a forgive service 352 of the unreliable reader class 350; thus, there is a dotted line between the forgive service 352 and the librarian class 330. As another example, readers 340 are agents of the loan book 316 and return book 318 services.

Finally, shared events are represented by using solid lines that connect the associated events between two classes. In the example, the loan_book event is a shared event due to the solid line connecting said events in the book class 320 and the reader class 340.

Additional information in the object model is specified to complete the formal description of the class. Specifically, for every class in the object model, the following information is captured as shown in TABLE 1.

TABLE 1

| ITEM | DESCRIPTION |
|---|---|
| Attributes | All the aforementioned properties and/or characteristics |
| Services | All the aforementioned properties and/or characteristics |
| Derivations | derivation expressions for the derived attributes (those whose value is dependent on other attributes) |

TABLE 1-continued

| ITEM | DESCRIPTION |
|---|---|
| Constraints | well-formed formulas stating conditions that objects of a class must satisfy |
| Complex Relationships | specific information associated to aggregation and inheritance hierarchies |
| Agents | services that can be activated by this class |

Additional information associated with aggregation and inheritance is also collected. For aggregated classes, the additional information can specify if the aggregation is an association or a composition in accordance with the UML characterization, or if the aggregation is static or dynamic. For inheritance hierarchies, the additional information can specify if a specialization produced by the inheritance is permanent or temporal. If the specialization is permanent, then the corresponding conditions on the constant attributes must characterize the specialization relationship. On the other hand, if the specialization is temporary, then the condition based on variable attributes or the events that activate/deactivate the child role must be specified.

Some applications may require a large number of classes to fully specify. In this case, classes may be gathered into clusters. Clusters make it easier for the designer or system analyst to understand the application, one cluster at a time. Thus, clusters help reduce the complexity of the view of the object model.

Dynamic Model

The system class architecture is specified with the object model. Additional features, however, such as which object life cycles can be considered valid, and which interobject communication can be established, also have to be input in the system specification. For this purpose, a dynamic model is provided.

The dynamic model specifies the behavior of an object in response to services, triggers and global transactions. In one embodiment, the dynamic model is represented by two diagrams, a state transition diagram and an object interaction diagram.

Figure 4A:
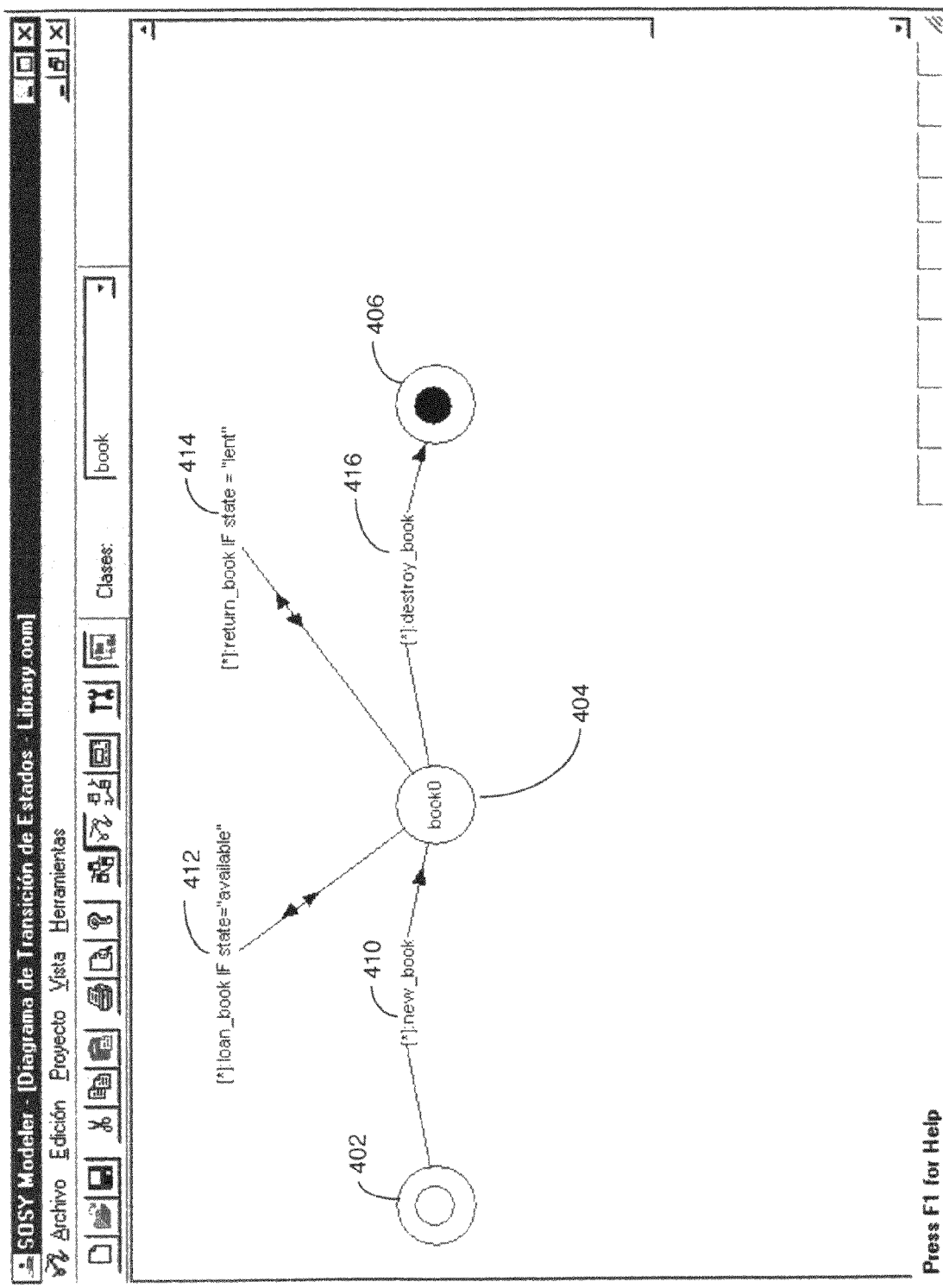
FIG. 4A illustrates an exemplary state transition diagram in accordance with one embodiment of the present invention.

The state transition diagram (STD) is used to describe correct behavior by establishing valid object life cycles for every class. A valid life refers to an appropriate sequence of states that characterizes the correct behavior of the objects that belong to a specific class. Transitions represent valid changes of state. A transition has an action and, optionally, a control condition or guard. An action is composed of a service plus a subset of its valid agents defined in the Object Model. If all of them are marked, the transition is labeled with an asterisk (*). Control conditions are well formed formulas defined on object attributes and/or service arguments to avoid the possible non-determinism for a given action. Actions might have one precondition that must be satisfied in order to accept its execution. A blank circle represents the state previous to existence of the object. Transitions that have this state as source must be composed of creation actions. Similarly, a bull's eye represents the state after destruction of the object. Transitions having this state as destination must be composed of destruction actions. Intermediate states are represented by circles labeled with an state name. Accordingly, the state transition diagram shows a graphical representation of the various states of an object and transitions between the states. FIG. 4A illustrates an exemplary state transition diagram 400 in accordance with one embodiment of the present invention. States are depicted in the exemplary state transition diagram 400 by means of a circle labeled with the state name. Referring to FIG. 4A, the "book0" state 404 is indicated by a circle with the name "book0." Before an object comes into existence, a blank circle 402 is used to represent this "state" of nonexistence, which is the source of the initial transition 410 labeled by a corresponding creation action. A bull's eye 406 is used to represent the state after which an object has been destroyed, as by a transition 416 occasioned by the [*]: destroy_book action.

Transitions are represented by solid arrows from a source state to a destination state. The middle of the transition arrow is labeled with a text displaying the action, precondition and guards (if any). In the example, transition 412 is labeled with a loan_book action associated with the transition 412 and a precondition 'if state="available"'. Thus, the system will only accept the execution of the action if the state attribute of the book is "available." In other words, the Conceptual Model requires that a book can only be loaned if the book is available. As another example, transition 414 is labeled with a return_book action associated with the transition 414 and a precondition 'if state="lent"'. In other words, the Conceptual Model requires that a book can only be returned if the book has been lent.

The object interaction diagram specifies interobject communication. Two basic interactions are defined: triggers, which are object services that are automatically activated when a pre-specified condition is satisfied, and global transactions, which are themselves services involving services of different objects and or other global transactions. There is one state transition diagram for every class, but only one object interaction diagram for the whole Conceptual Model, where the previous interactions will be graphically specified.

In one embodiment, boxes labeled with an underlined name represent class objects. Trigger specifications follow this syntax: destination::action if trigger-condition. The first component of the trigger is the destination, i.e., the object(s) to which the triggered service is addressed. The trigger destination can be the same object where the condition is satisfied (i.e. self), a specific object, or an entire class population if broadcasting the service. Finally, the triggered service and its corresponding triggering relationship are declared. Global Transactions are graphically specified by connecting the actions involved in the declared interaction. These actions are represented as solid lines linking the objects (boxes) that provide them.

Figure 4B:
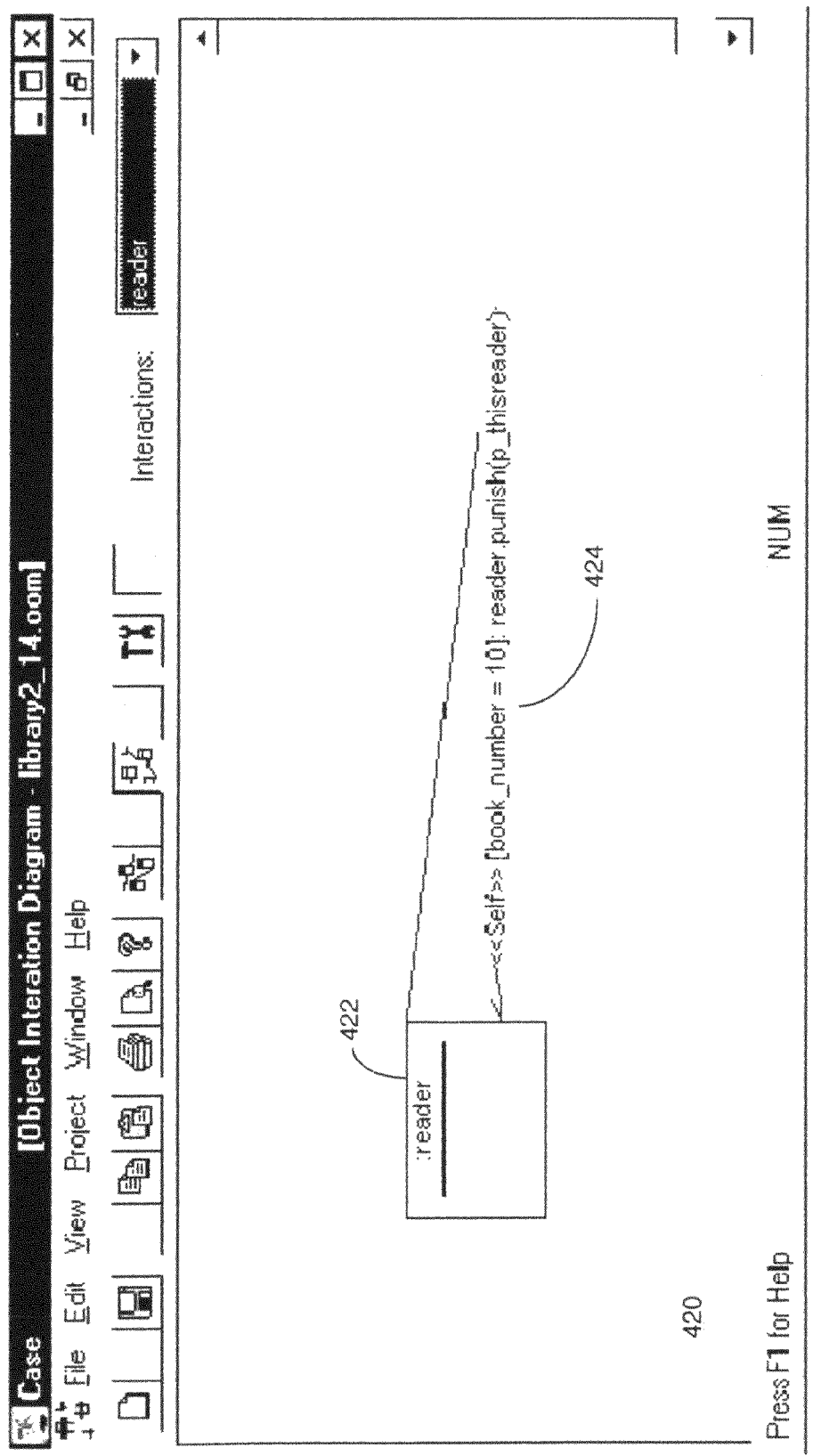
FIG. 4B illustrates an exemplary object interaction diagram in accordance with one embodiment of the present invention.

Accordingly, communication between objects and activity rules are described in the object interaction diagram, which presents graphical boxes, graphical triggers, and graphical interactions. FIG. 4B illustrates an exemplary object interaction diagram 420 in accordance with one embodiment of the present invention.

In the object interaction diagram 420, the graphical interactions is represented by lines for the components of a graphical interaction. Graphical boxes, such as reader box 422, are declared, in this case, as special boxes that can reference objects (particular or generic) such as a reader. Graphical triggers are depicted using solid lines that have a text displaying the service to execute and the triggering condition. Components of graphical interactions also use solid lines. Each one has a text displaying a number of the interaction, and the action that will be executed. In the example, trigger 424 indicates that the reader punish action is to be invoked when the number of books that a reader is currently borrowing reaches 10.

Functional Model

Many conventional systems take a shortcut when providing a functional model, which limits the correctness of a functional specification. Sometimes, the model used breaks the homogeneity of the object-oriented models, as happened with the initial versions of OMT, which proposed using the structured DFDs as a functional model. The use of DFD techniques in an object modeling context has been criticized for being imprecise, mainly because it offers a perspective of the system (the functional perspective), which differs from the other models (the object perspective). Other methods leave the free-specification of the system operations in the hands of the designer, which leads to inconsistencies.

One embodiment of the present invention, however, employs a functional model that is quite different with respect to these conventional approaches. In this functional model, the semantics associated with any change of an object state is captured as a consequence of an event occurrence. Basically, the functional model allows a SOSY modeler to specify a class, an attribute of that class and an event of that class and then define a mathematical or logical formula that defines how the attribute's value will be changed when this event happens. An "event" as used in the claims means a single service and not a transaction which is defined as a composed or complex service (which means more than one service executes). In the preferred embodiment, condition-action pair is specified for each valuation. The condition is a single math or logic formula which specifies a condition which results in a value or logical value which can be mapped to only one of two possible values: true or false. The action is a single math or logical formula which specifies how the value of the attribute is changed if the service is executed and the condition is true. In other embodiments, only a single formula that specifies the change to the attribute if the service is executed is required.

The functional model is built in the preferred embodiment by presenting a dialog box that allows the user to choose a class, an attribute of that class and a service of that class and then fill in one or more formula or logical expressions (condition-action or only action) which controls how the value of that attribute will be changed when the service is executed. The important thing about this is that the user be allowed to specify the mathematical or logical operation which will be performed to change the value of the attribute when the service is executed, and it is not critical how the user interface is implemented. Any means to allow a user to specify the class, the attribute of that class and the service of that class and then fill in a mathematical or logical expression which controls what happens to the specified attribute when the service is executed will suffice to practice the invention. Every one of these mathematical expressions is referred to as a valuation. Every valuation has to have a condition and action pair in the preferred embodiment, but in other species, only an action need be specified. The condition can be any well formed formula resulting in a Boolean value which can be mapped to only one of two possible conditions: true or false. The action specified in the pair is any other well-formed mathematical and/or logical formula resulting in a new value for the variable attribute, said new value being of the attribute's same data type (type of data of action must be compatible with the type of data of the attribute). This valuation formula can be only mathematical or only a Boolean logical expression or a combination of both mathematical operators and Boolean logical expressions.

Regardless of the user interface used to gather data from the user to define the valuations in the functional model, all species within the genus of the invention of generating functional models will generate a data structure having the following content: data defining the valuation formula which affects the value of each variable attribute (the data that defines the valuation formula identifies the service and the attribute affected and the mathematical and/or logical operations to be performed and any operands needed). This data structure can be any format, but it must contain at least the above identified content.

To define the functional model, the following information is decoratively specified by the SOSY modeler: how every event changes the object state depending on the arguments of the involved event, and the object's current state. This is called "valuation".

In particular, the functional model employs the concept of the categorization of valuations. Three types of valuations are defined: push-pop, state-independent and discrete-domain based. Each type fixes the pattern of information required to define its functionality.

Push-pop valuations are those whose relevant events increase or decrease the value of the attribute by a given quantity, or reset the attribute to a certain value.

State-independent valuations give a new value to the attribute involved independently of the previous attribute's value.

Discrete-domain valuations give a value to the attributes from a limited domain based on the attribute's previous value. The different values of this domain model the valid situations that are possible for the attribute.

To illustrate these features, TABLE 2 shows a functional model for a "book number" attribute 344 of the reader class 340, in a Conceptual Model representing a typical library.

TABLE 2

| CLASS: Reader ATTRIBUTE: book_number CATEGORY: push-pop | | |
|---|---|---|
| Event | Quantity | Effect |
| loan( ) | 1 | Increase |
| Return( ) | 1 | Decrease |

These valuations are categorized as a push-pop because their relevant events increase or decrease the value of the book_number attribute 344 by a given quantity (1). In the example, its related event loan ( ) has the increasing effect and return ( ) has the decreasing effect.

Figure 5:
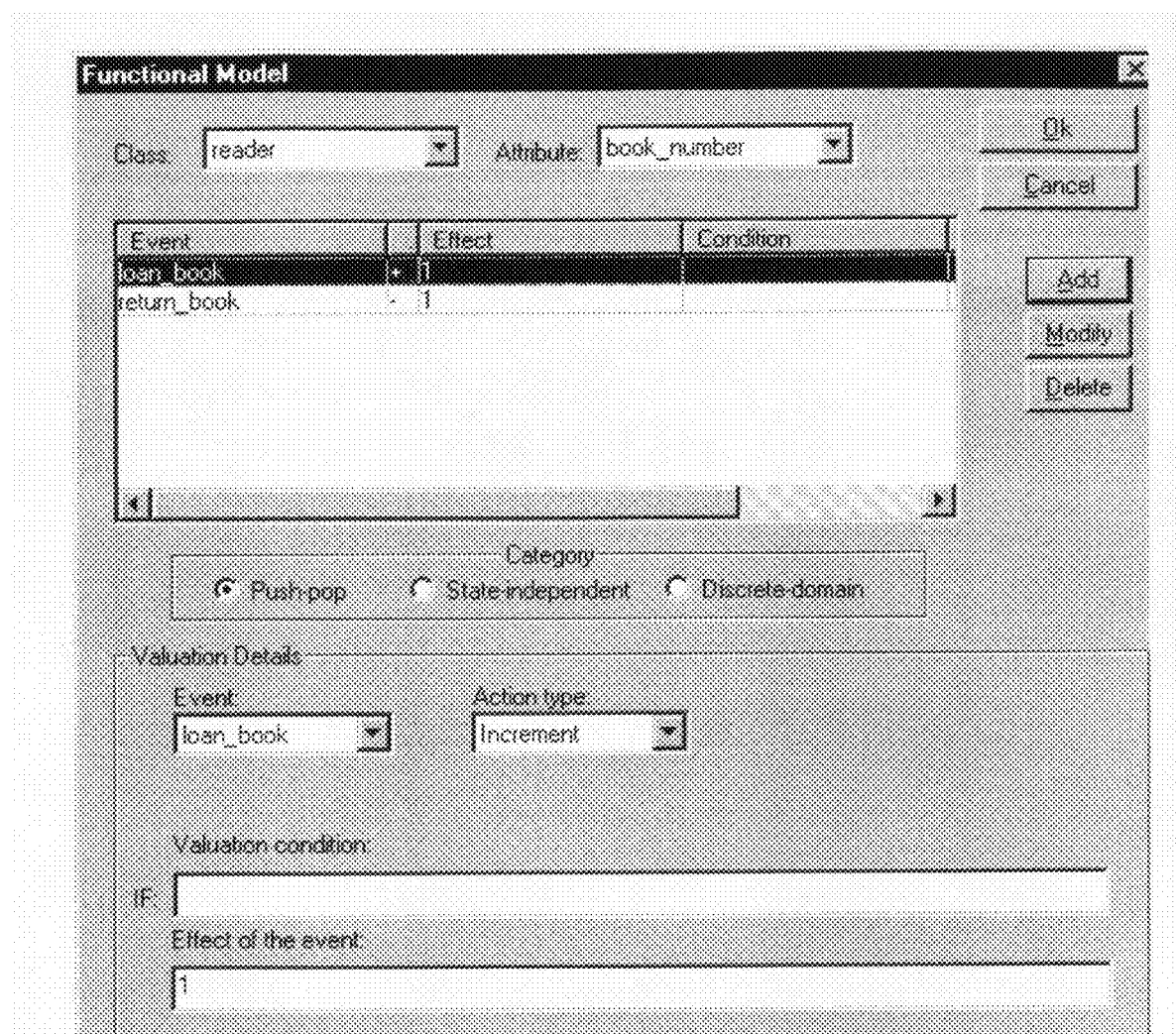
FIG. 5 illustrates an exemplary dialog for receiving input for the functional model.

This categorization of the valuations is a contribution of one aspect of the present invention that allows a complete formal specification to be generated in an automated way, completely capturing a event's functionality Accordingly, the functional model is responsible for capturing the semantics of every change of state for the attributes of a class. It has no graphical diagram. Textual information is collected through an interactive dialog that fills the corresponding part of the Information Structures explained before. FIG. 5 illustrates an exemplary dialog for receiving input for the functional model.

Presentation Model

The presentation model is a set of pre-defined concepts that can be used to describe user interface requisites. These concepts arise from distilling and abstracting repetitive scenarios in developing the user interfaces. These abstractions of the repetitive scenarios are called patterns. A set of patterns is called a pattern language.

In this sense, the presentation model is a collection of patterns designed to reflect user interfaces requirements. A pattern is a clear description of a recurrent problem with a recurrent solution in a given restricted domain and giving an initial context. The documented patterns abstract the essence of the problem and the essence of the solution and therefore can be applied several times to resolve problems that match with the initial context and domain. The pattern language is composed of a plurality of patterns. The present invention is not limited to any particular list of patterns, but the following is a brief description of some user interface patterns that have been found to be useful: Service Presentation pattern, Instance Presentation pattern, Class Population Presentation pattern, Master-Detail Presentation pattern and Action Selection Presentation pattern.

A Service Presentation pattern captures how a service will obtain data from the final user. This patterns controls the filling out of service arguments and contains actions to launch the service or to exit performing no action. It is based on other lower level patterns that refer to more specific interface tasks like:

An Introduction pattern that handles with restrictions to input data that must be provided to the system by the final user (i.e., the user who employs the final application). In particular, edit-masks and range-values are introduced, constraining the values that can validly be input in the interface. In this manner, the user-entry errors are reduced. This pattern can be applied to arguments in services or to attributes in classes to improve data input process through validating input arguments.

A Defined Selection pattern that specifies a set of valid pre-specified values for an argument. When the input data items are static, are a few, and are well known, the designer can declare by enumeration a set containing such valid values. This pattern is similar to those that define an enumerated type and an optional default value. Accordingly, the final user can only select an entry from the pre-specified set of valid values, thereby reducing error prone input. For example, one representation of this pattern could be a Combo-Box. This pattern can be applied to arguments in services or to attributes in classes to improve data input process.

A Population Selection pattern that handles the situation of observing and selecting objects in a multiple objects society. Specifically, this pattern contains a filter, a display set, and an order criterion, which respectively determine how objects are filtered (Filter Expression), what data is displayed (Display Set), and how objects are ordered (Order Criteria). This pattern may be thought of as an SQL Select statement with columns, where ??? and order by clauses ???, and can be applied to object-valuated arguments in services whenever it is possible to select an object from a given population of living objects.

A Dependency Pattern, that is a set of Event-Condition-Action (ECA) rules allowing the specification of dependency rules between arguments in services. When arguments are dependent on others, these constraints use this kind of rule.

A Status Recovery pattern is an implicit pattern that recovers data from object attributes to initialize service arguments. This can be modeled as an implicit set of dependency patterns. For example, to change the data associated of a Customer object, a form to launch the change service appears. If the user provides the Customer OID (Object Identifier), the interfaces can use this OID to search the object and recover the data associated to the Customer, such as name, telephone, address, etc.

A Supplementary Information pattern handles feedback data that must be provided to final users in order to assure they choose or input the correct OID (object identified) for an existent object. For example, to select a Customer, an OID must be provided. If the name of the Customer is automatically displayed as an answer to an OID input, the user receives a valuable feedback data that assures him in selection or corrects the input data. The supplementary information pattern is applicable to object-valuated arguments.

An Argument Grouping Presentation pattern captures how to group the requested service arguments according to the user wishes.

An Instance Presentation pattern captures how the properties of an object will be presented to the final user. In this context, the user will be able to launch services or to navigate to other related objects. The Instance Presentation pattern is a detailed view of an instance.

A Class Population Presentation pattern captures how the properties of multiple objects of one class will be presented to the final user. In this context, once an object is selected, the final user will be able to launch a service or to navigate to other related objects. The objects can also be filtered.

A Master-Detail Presentation pattern captures how to present a certain object of a class including other related objects that may complete the full detail of the object. To build this pattern the following patterns are used: Instance Presentation, Class Population Presentation and, recursively, Master-Detail presentation. In this manner, multi-detail (multiples details) and multi-level master-detail (multiples levels recursively) can be modeled. For example, one scenario involves an invoice header followed by a set of invoice lines related to the invoice.

An Action Selection pattern captures how the services are going to be offered to final users following the principle of gradual approach. This pattern allows, for example, generating menus of application using a tree structure. The final tree structure will be obtained from the set of services specified in the classes of the Conceptual Model. The user could launch services or queries (observations) defined in the Conceptual Model.

A Filter Expression is a well-formed formula that evaluates to a Boolean type. This formula is interpreted as follows: the objects that satisfy the formula pass the filter; the ones that do not fulfill the condition do not pass the filter. Consequently, the filter acts like a sift that only allows objects that fulfill the formula to pass. These formulas can contain parameters that are resolved at execution time, providing values for the variables or asking them directly to the final user. A filter pattern may be thought of as an abstraction of a SQL where clause; and is applied in a population selection pattern.

A Display Set is an ordered set of attributes that is shown to reflect the status of an object. A Display Set may be thought of as an abstraction of the columns in a SQL clause, and is applied in a Population Selection pattern.

The Order Criterion is an ordered set of tuples that contain: an attribute and an order (ascending/descending). This set of tuples fixes an order criterion over the filtered objects. An order criterion pattern may be thought of as an abstraction of an order by SQL clause, and is applied in a Population Selection pattern.

Formal Specification

The CASE tool 210, after presenting a user interface for capturing system requirements 200, converts the system requirements into a formal specification 215 in a formal language having a syntax and semantics that are known to the validator 220. Although the formal specification 215 must be in a formal language, it need not be in a known formal language, and any formal language including newly invented formal languages will suffice. The only thing that is necessary to practice the invention is that the syntax and semantics of whatever formal language in which formal specification 215 is written be known to the validator 220 so that it may validate the formal specification for completeness, mathematical and semantic and syntactical correctness and lack of ambiguity. In particular the CASE tool 210 builds upon the previously described models as a starting point and automatically generates a corresponding formal and object-oriented specification 215, which acts as a high-level system repository. In a preferred embodiment, the formal language being employed is OASIS, in its version 2.2, published in October 1995 by the "Servicio de Publicaciones de la Universidad Politecnica de Valencia" (legal deposit number: V-1285-1995).

Conversion of captured system requirements 200 into a formal language specification 215 is performed in the preferred embodiment: each piece of information introduced in the conceptual modeling step has a corresponding formal language counterpart, which is represented as formal language statements having syntax and semantics known to the validator. The graphical modeling environment associated with one embodiment of the invention may be thus viewed as an advanced graphical editor and composition tool to allow a SOSY modeler to graphically generate images and data structures through a graphical user interface which are then converted (on a real time basis) into a formal language specification which may be validated.

As an example of syntax and semantics of formal languages and how the validator 220 can validate such a formal language specification, consider Table 3 below. Table 3 is a formal specification in the OASIS formal language of the reader class of the hypothetical library management application detailed above. TABLE 3 shows a formal specification 215 for the reader class that was automatically obtained from the Conceptual Model:

TABLE 3

CONCEPTUAL SCHEMA library
domains nat,bool,int,date,string
class reader
identification
by_reader_code: (reader_code);
constant_attributes
age : String ;
reader_code : String ;
name : String ;
variable_attributes
book_count : Int ;
private_events
new_reader( ) new;
destroy_reader( ) destroy;
punish( );
shared_events
loan( ) with book;
return( ) with book;
constraints
static book_count < 10;
valuation
[loan( )] book_count= book_count + 1;
[return( )] book_count= book_count − 1;
preconditions
librarian:destroy_reader ( ) if
book_number = 0 ;
triggers
Self :: punish( ) if book_count = 10;
process
reader = librarian:new_reader( ) reader0;
reader0= librarian:destroy_reader( ) +
loan ( ) reader1;
reader1= if book_count=1 return( ) reader0
+ (if book_count > 1 return( )
+ if book_count < 10 loan( )) reader1;
end_class
END CONCEPTUAL SCHEMA Consider the following statement from the high level repository formal specification of Table 3:

[loan( )]book_count=book_count+1;

The semantics of this formal language statement indicate by the ( ) that loan is a service which performs the mathematical computation represented by the equation outside the square brackets. This mathematical formula means that the value of the attribute book_count will be incremented by 1 when this service is executed. The formula could be any other formula where one attribute is set equal to the value of another attribute plus the value of some other attribute or user input value. However, to be semantically correct, an integer or floating point number cannot be added to an alphanumeric string or any other type of attribute which has no meaning when attempting to add it to an integer or floating point number.

As another example of validation of the semantics of the formal language specification, when an integer is added to a floating point number, the result must be a floating point number and not an integer.

Another example of validation of the semantics involves verifying that for every attribute that has been defined as a variable, there is a service which changes the value of that attribute. Another example of semantic validation is verifying that for every constant attribute, there is no service which attempts to change its value. Another example of semantic validation is if a service "destroy" erases or eliminates an attribute, it makes no sense to modify the attribute after it no longer exists. The validator would flag as an error any formal specification statement which attempted to do so.

One of the functions of the validator is to check the semantics of every statement to make sure that no mathematical formulas attempt to combine entities that are not mathematically combinable, that combining different types of numbers results in the correct type of output number, that nothing gets divided by zero, and that other operations that are mathematically undefined are not required by the formal specification. Stated another way, one function of the validator is to make sure that every formula is well formed, complete and consistent.

The validator has a number of rules stored in it that are dependent upon the semantics and syntax of the formal language in use. These rules are used to accomplish the purpose of the validator 220. That purpose is to semantically and syntactically validate every statement of every class definition in the formal specification as well as verifying that the interclass actions between any of the classes are semantically meaningful and syntactically correct. Any process which checks all the formal language statements in the formal specification against at least the pertinent rules to accomplish the above stated purpose will suffice. This can be accomplished after iterative passes or all on one pass. As long as this purpose is accomplished, the details of how it is accomplished are not critical.

The meaning of the different sections that integrate the formal description of the exemplary reader class specification is as follows. A class in OASIS is made up of a class name "reader", an identification function for instances (objects) of the class, and a type or template that all the instances share.

The identification function by_reader_code, characterizes the naming mechanism used by objects and yields a set of surrogates belonging to a predefined sort or to a sort defined by the user (the so-called domains in OASIS). These domains are imported in the class definition. The most usual are predefined as int, nat, real, bool, char, string and date. They represent numbers, boolean values, characters, strings and dates in a particular format. New domains can be introduced in a specification by defining the corresponding abstract data type.

A type is the template that collects all the properties (structure and behavior) which are shared by all the potential objects of the class being considered. Syntactically, the type can be formalized as a signature, which contains sorts, functions, attributes and events to be used, a set of axioms, which are formulas in a dynamic logic, a process query as a set of equations with variables of a sort process that are solved in a given process algebra. When these variables are instantiated, we have the ground terms that represent possible lives of instances (objects).

A class signature contains a set of sorts with a partial order relation. Among this set of sorts is the sort of interest (the class name) associated with the class being defined. A class signature also contains a set of functions including those functions included in the definition of the (predefined) sorts and the identification function whose sort is the ADT (Abstract Data Type) for identities implicitly provided with a class specification. The identification function provides values of a given sort to identify objects in order to assure that any object of a given class has a unique identity. For specification purposes, an identification is an introduced mechanism comprising a declaration of one or more key maps used as aliases for identifying objects. The key maps are similar to the candidate key notion of the relational model. From a given key value, these maps return an associated object identity. Key maps will be declared as (tuples of) constant attributes.

A class signature also contains a set of (constant, variable, and derived) attributes, see constant_attributes and variable_attributes sections in TABLE 3. These attributes all have the sort of the class as domain, and the given sort associated to the attribute being considered as codomain.

A set of events is also contained in the class signature (see private events and shared events in TABLE 3), with the sort of the class as the domain, plus any additional sort representing event information, and with the sort of the class (sort of interest) as the codomain. This so-called sort of interest can be seen as a subsort of a general sort process when objects are viewed as processes.

Each event occurrence is labeled by the agent that is allowed to activate it. When dealing with this actor notion, if the agent x initiates event a is written x:a and called an action; x could be the environment or any object of a system class. In one embodiment, an event always is associated with an agent. When defining an event, the designer is therefore forced to state which agent will be able to activate it. Consequently, a set A of actions may be defined and obtained from and attached to the initial set of events.

In this way, the notion of the set of object services can be represented as an interface that allows other objects to access the state. The object services can be events (server view) or actions (client view) depending on whether these services are offered or requested. Actions become services requested by an object, by which the object can consult or modify states of other objects (or its own state).

In OASIS, there are the following kinds of dynamic formulas (set of class axioms):

Evaluations are formulas whose semantics is given by defining a function that, from a ground action [a] returns a function between possible worlds. In other words, being a possible world for an object any valid state, the function determines which transitions between object states are valid after the execution of an action [a]. In the example, there are the following evaluations:

[loan( )] book_count=book_count+1;

[return( )] book_count=book_count−1;

Derivations are formulas that define derived attributes in terms of the given derivation condition. Derivations basically differ from the evaluation formulas in that this derived evaluation is done in a unique state.

Integrity constraints are formulas that must be satisfied in every world. Static and dynamic integrity constraints may be distinguished. Static integrity constraints are those defined for every possible world. They must always hold. On the other hand, dynamic integrity constraints are those that relate different worlds. They require the use of a temporal logic, with the corresponding temporal logic operators.

Preconditions are formulas where the formula is one that must hold in the world previous to the execution of action [a]. Only in the worlds where the precondition holds, is [a] allowed to occur. If the precondition holds, the occurrence of [a] gives no state as successor. We have the following precondition in the reader specification:

book_number=0 [librarian:destroy_reader( )] false;

or, in a more convenient way for specification purposes, we can write librarian:destroy_reader ( ) if book_number=0

Triggers are formulas of the form $\beta[-[a]]$false, where $[-[a]]$ is the action negation. This formula means that [a] does not occur, and what does occur is not specified. If $\beta$ holds and an action other than [a] occurs, then there is no successor state. This forces [a] to occur or the system remains in a blocked state. For instance, using the appropriate dynamic formula where we include in the triggered service information about the destination (according to the trigger expressiveness presented when the object interaction diagram 420 was introduced), we will declare:

book_count=10 [Self::punish( )] false

This trigger may be written in an equivalent but more conventional way for specification purposes as:

Self::punish( ) if book_count=10;

Thus, triggers are actions activated when the condition stated holds. The main difference between preconditions and triggers comes from the fact that in triggers there is an obligation to activate an action as soon as the given condition is satisfied. In this way triggers allow us to introduce internal activity in the Object Society that is being modeled.

In OASIS, an object is defined as an observable process. The process specification in a class allows us to specify object dynamics and determines the access relationship between the states of instances. Processes are constructed by using events as atomic actions. However, the designer also has the choice of grouping events in execution units, which are called transactions.

The molecular units that are the transactions have two main properties. First, they follow an all-or-nothing policy with respect to the execution of the involved events: when a failure happens during a transaction execution, the resultant state will be the initial one. Second, they exhibit the non-observability of intermediate states.

We will finish this section introducing the process specification of the reader class in TABLE 4:

TABLE 4

```
reader =    librarian:new_reader( ) •_reader_0;
reader_0 = librarian:destroy_reader( ) + loan( )
           •_reader_1;
reader_1 = if book_count=1 return( ) • reader_0
           + (if book_count > 1 return( )
           + if book_count < 10 loan( )) •_reader_1;
```

The execution of processes are represented by terms in a well-defined algebra of processes. Thus, possible object lives can be declared as terms whose elements are transactions and events. Every process can be rewritten to a term in a basic process algebra BPA_$\square\square$, with the $\square$ (sequence) and + (alternative) process operations. This provides an implementation of concurrence based on arbitrary interleaving.

After having presented the Conceptual Model and the OASIS formal concepts associated with them in accordance with one embodiment of the present invention, the mappings will now be discussed that generate a textual system representation 215 (that is a specification in OASIS) taking as input the graphical information introduced in the Conceptual Model. This formal specification 215 has in fact been obtained using CASE tool 210, and constitutes a solid system documentation to obtain a final software product which is compliant with the initial requirements, as represented in the source Conceptual Model.

According to the class template introduced in the previous section, the set of conceptual patterns and their corresponding OASIS representation.

The system classes are obtained from the object model. For each class, there are a set of constant, variable or derived attributes; a set of services, including private and shared events and local transactions; integrity constraints specified for the class; and derivation expressions corresponding to the derived attributes. For a complex class (those defined by using the provided aggregation and inheritance class operators), the object model also provides the particular characteristics specified for the corresponding complex aggregated or specialized class.

The information given by the object model basically specifies the system class framework, where the class signature is precisely declared. The dynamic model uses two kind of diagrams, the state transition diagram and the object interaction diagram. From the state transition diagram, the following are obtained: event preconditions, which are those formulas labeling the event transitions; the process definition of a class, where the template for valid object lives is fixed. From the object interaction diagram, two other features of an OASIS class specification are completed: trigger relationships and global transactions, which are those involving different objects.

Finally, the functional model yields the dynamic formulas related to evaluations, where the effect of events on attributes is specified. Having thus clearly defined the set of relevant information that can be introduced in a Conceptual Model in accordance with an embodiment of the present invention, the formal specification 215 corresponding to the requirements 200 provides a precise system repository where the system description is completely captured, according to the OASIS object-oriented model. This enables the implementation process (execution model) to be undertaken from a well-defined starting point, where the pieces of information involved are meaningful because they come from a finite catalogue of conceptual modeling patterns, which, furthermore, have a formal counterpart in OASIS.

Model Validation

Automatic software production of a complete, robust application from a Conceptual Model to an implementation language (such as a third generation languages like C, C++, or Java) requires the Conceptual Model to be both correct and complete. In this section, the terms "correct" and "complete" have the following meanings dependent on the specific needs for the automated software production process system as:

A Conceptual Model is "complete" when there is no missing information in the requirements specification. In other words, all the required properties of the Conceptual Model are defined and have a value. This means that every concept introduced during the modeling process will be fully specified in all its properties or the validator will reject it.

A Conceptual Model is "correct" when the information introduced in the Conceptual Model is syntactically and semantically consistent and not ambiguous. In other words, all the properties defined in the Conceptual Model have a value and that value is valid.

There is a partial validation process each time an element is added, modified or deleted to the Conceptual Model and is converted to a portion of the formal specification. During the partial validations that occur as elements are added, modified and deleted, no error messages are generated (because that would driver the modeler crazy), but portions of the Formal Specification are marked as rendered invalid by changes that have been made. When the Conceptual Model is completed, the SOSY modeler requests full validation. At this point, every statement and formula in the Formal Specification is revalidated, and error messages and warnings are generated for any element which is syntactically or semantically incomplete or incorrect or ambiguous.

Referring back to FIG. 2, the validator 220 receives as input the formal specification 215 of the Conceptual Model using an Object-Oriented Formal Specification Language (such as OASIS) as high level data repository. From a formal point of view, a validated OASIS specification 215 is correct and complete because the specification 215 is formally equivalent to a dynamic logic theory, using a well-defined declarative and operational semantics.

Formal specification languages benefit from the ability of formal environments to ensure that formal specifications 215 are valid or can be checked to be valid. Formal languages define a grammar that rules language expressiveness.

Two procedures are used for Conceptual Model validation. For completeness, validation rules are implemented by directly checking the gathered data for the Conceptual Model, e.g., a class must have name, one attribute being its identifier and one service. Completeness of the formal language specification of the Conceptual model, as checked by the validation process, means that: 1) there is no missing information in the formal specification detailing the requirements the code must meet; 2) stated in another way, all the required properties of the Conceptual Model encoded in the formal language specification are defined and they have a value. Correctness of the formal language specification of the Conceptual model, as checked by the validation process, means that: 1) when the statements in the formal language specification of the Conceptual model are both syntactically and semantically consistent and not ambiguous; 2) stated in another way, all the properties introduced in the conceptual model have a valid value. For correctness, an extended formal specification language grammar (syntax plus semantics) is implemented in order to validate the syntax and meaning of all the formulas in the Conceptual Model.

Correctness

More specifically, for completeness, the validator functions to ensure that all the elements in a formal specification language have a set of properties that both exist and have a valid value. Most of the properties are strictly implemented to have a full definition and valid values. However, the CASE tool 210 allows, for easy of use during a model inputting, to leave some properties incomplete or with invalid values. These properties will be checked by the validator 220 to be complete (and correct) prior to any automatic software production process.

The elements which are used to validate a Conceptual Model are described next. For each element it is stated if validation will be strict (e.g. when all his properties have to exist and must have a valid value at creation time) or flexible (e.g. validation will be accomplished at a later time). Some properties are optional, (e.g. that may not exist) but if they are defined, they must be validated. These elements are given in TABLE 5:

TABLE 5

| | |
|---|---|
| Class | |
|   Name. | Strict |
|   ID function | Flexible |
|   Attributes (at least one) | Flexible |
|   Services (at least Create service). | Flexible |
|   Static and Dynamic Integrity Constraints (optional) | |
|     Their formula | Strict |
| Attribute | |
|   Name. | Strict |
|   Type (Constant, Variable, Derived). | Strict |
|   Data-type (Real, integer, etc). | Strict |
|   Default Value. | Strict |
|   Size (if proceeds) | Strict |
|   Request in Creation service. | Strict |
|   Null value allowed. | Strict |
|   Evaluations (variable attributes). | Flexible |
|   Derivation formula (derived attributes). | Flexible |
| Evaluation | |
|   One variable attribute of a class | Strict |
|   One service of the same class | Strict |
|   Condition (optional). | Strict |
|   Formula of evaluation. | Strict |
| Derivation | |
|   Formula. | Strict |
|   Condition (optional). | Strict |
| Service | |
|   Name. | Strict |
|   Arguments. | |
|     argument's name | Strict |
|     data-type | Strict |
|     default value (optional) | Strict |
|     null value | Strict |
|     size (if proceeds) | Strict |
|   For a transaction, its formula. | Flexible |
| Preconditions of an action | |
|   Formula. | Strict |
|   Agents affected by condition | Strict |
| Relationship: Aggregation | |
|   Related classes (component &composite) | Strict |
|   Relationship name. | Strict |
|   Both directions Role names. | Strict |
|   Cardinality. | Strict |
|   Inclusive or referential. | Strict |
|   Dynamic. | Strict |
|   Clause "Group By" (Optional). | Strict |
|   Insertion and deletion events (if proceed) | Strict |
| Relationship: Inheritance | |
|   Related classes (parent & child) | Strict |
|   Temporal (versus permanent) | Strict |
|   Specialization condition or events | Strict |
| Relationship: Agent | |
|   Agent class and service allowed to activate. | Strict |
| State Transition Diagram (STD) | |
|   All states of class (3 at least). | Flexible |
| State in STD | |
|   Name. | Strict |
| Transition in STD | |
|   Estate of origin. | Strict |
|   Estate of destination. | Strict |
|   Service of class. | Strict |
|     Control condition (optional). | Strict |
| Trigger | |
|   Condition. | Strict |
|   Class or instance of destination. | Strict |
|   Target (self, object, class) | Strict |
|   Activated service. | Strict |
|   Service arguments' initialization (Optional) | |
|     Arguments' values | Strict |
| Global Interactions | |
|   Name. | Strict |
|   Formula. | Strict |
| User exit functions | |
|   Name. | Strict |
|   Return data-type | Strict |
|   Arguments, (Optional) | |

TABLE 5-continued

| Argument's name | Strict |
| Argument's data-type | Strict |

Completeness

Some properties of components in formal specification languages are "well formed formulas" that follow a well defined syntax. It is therefore, a requirement to ensure that all introduced formulas in the Conceptual Model were both syntactical and semantically correct.

Not all formulas used in the Conceptual Model have the same purpose. Therefore, there will be several types of formulas. Depending of formula's type, the use of certain operators and terms (operands, like: constants, class attributes, user-functions, etc.) are allowed. A process and a set of rules in grammar to validate every type of formula in the Conceptual Model also exists.

More specifically, the Conceptual Model includes formulas of the following types as shown in TABLE 6:

TABLE 6

Default Value Calculation of
    Class Attributes (Constant and Variable)
    Service and Transaction Arguments
Inheritance: Specialization condition
Static and Dynamic Integrity Constraints
Derivations and Valuations:
    Calculation formula (Derived or Variable attributes respectively)
    Conditions (optional)
Preconditions for actions (Services or Transactions)
Control Conditions for transitions in State Transitions Diagram
Triggering conditions
Local and Global Transactions formulas These formulas are validated at the time they are introduced, by preventing the designer from leaving an interactive textual dialog if formula is not syntactically and semantically correct.

In general, every formula must be syntactically correct; every class must have an identification function; every class must have a creation event; every triggering formula must be semantically correct (e.g. self triggers to an unrelated class are forbidden); and every name of an aggregation must be unique in the conceptual schema. If these conditions are not satisfied, then an error is raised.

A warning may be raised, on the other hand, if any of the following do not hold: every class should have a destroy event; every derived attribute should have at least a derivation formula; every service should have an agent declared to execute it; and every argument declared in a service should be used.

Validation process will also be invoked every time the designer performs a change into the model that may invalidate one or more formulas. As mentioned earlier, for ease of use, certain type of formulas are allowed to be incorrect, which the designer will have to review at a later time. The automatic software production process in accordance with one embodiment of the present invention, however, will not continue to code generation, if not all the formulas are correct. Each time the designer introduces a modification in the Conceptual Model specification, all affected formulas will be checked. As a result, the following cases may happen:

1. If any of the affected formulas makes reference to a "Strict" property, the change will be rejected. An error will be raised to inform the designer.

2. If none of the affected formulas references a "Strict" property, modification to Conceptual Model will be accepted. An action-confirmation dialog is showed before any action is taken.

3. If there is no affected formula, modification is performed straightaway. In order to validate the user interface information, the validator 220 checks the following for errors: the patterns defined must be well constructed with no essential information lacking; the attributes used in filters must be visible from the definition class; the attributes used in order criteria must be visible from the definition class; the formula in a filter must be a well-formed formula using the terms defined in the model; the action selection pattern must use as final actions objects defined in the Conceptual Model; and the set of dependency patterns must be terminal and have confluence. Warnings may be generated under the following conditions: if a pattern is defined but not used (applied), if an instance pattern is duplicated.

Automatic software production from Conceptual Models requires these Conceptual Models to be correct and complete. Applying the characteristics and properties of formal specification languages makes it possible to effectively validate a Conceptual Model. The validation process is based on the grammar defined by the formal specification language, and partial validation is to be invoked any time the designer introduces modifications to the Conceptual Model specification. Prior to any automatic software production process, Conceptual Model will be validated in a full validation as a prerequisite.

Working Example of how to Use the Invention to Create a Conceptual Model for a Software Program to Manage Expense Reporting by Employees, Expense Report Approvals and Payments Requirements: The Problem to be Managed by the Computer Program to be Automatically Generated The system will manage the expense reporting of employees, expense approvals and payments.

Expenses will reflect both: pattern currency and its equivalent to other currency. Expense line for user input of an expense will only allow input in the pattern currency.

Employees may present an expense report when they have supported expenses on behalf of the company. Typically, the expenses are associated to a certain project or specific task.

At presenting the expense report, supporting tickets and receipts will be attached and prior expense advances will be reflected. Advances must be discounted out from the expense report balance.

The expense report, once presented, must be authorized by a manager responsible for payment of expenses. The authorization process will allow rejection of the expenses if there is the appearance of impropriety.

Once authorized, the expense report will be approved for payment by a person in accounting responsible for writing checks. Once paid, it will be marked as so.

The Procedure will be as follows:

Prior to any expense, the employee may request money in advance. This will not be reflected in the Expenses Management System program to be written.

The employee will provide receipts for all expenses and advances to the system operator (may be himself). It will include explanations for expenses when required.

Once all the expenses are entered, the employee will issue the expense report thereby closing the expenses report. Then the expense report will be in a status of pending approval.

A person responsible for expenses will authorise the expense report if the expenses appear legitimate, and the expense report will transition to a state pending payment. If the report is not approved, it will be rejected with a comment indicating why it has been rejected. The expenses report will be then put back in an open status to be modified.

Accounts payable will approve the payment. Once approved, the expense report will be marked as paid and locked. Only accounts payable will be able to unlock the expense reports in case of error.

Once the payment has been done, the Expenses Report is marked as paid indicating date and payment media. If balance was debit, i.e., advances were bigger than expenses, a warning message will require confirmation of payment.

Detailed Information to be Captured

Expense:

Header and footer: General information of the Expense.
  Employee: Code and Name.
  Trip cause, visit to or general expense cause.
  Project to charge expenses to.
  Total advanced amount. Both currencies
  Total expenses. Both currencies
  Balance. Both currencies
  Date of Expenses Report issuing.
  Expenses approval date.
  Payment date and media.
  Payment comments, if paid.
  Rejection cause, if rejected.

Expense Line:

Each line details a certain expense.
  Including:
  Expense date.
  Expense Type: (Car usage in Km, allowance, etc.) Some expense types will have a fixed price, some will perform a calculation, other will let operator to include the amount from figures on ticket or receipt.
  Units. The meaning will depend on expense type. Some types will not allow operator to use this.
  Prize to apply. Prize per unit in pattern currency. Depends on expense type.
  Expense description.
  Expense Line total. Both currencies Employee:
  Employee code. This must be unique in the system.
  Name and First name
  Site, phone numbers, email.

Querying and Reporting Facilities:

The results of any search in the application may be considered as a report so it must be possible to be printed as well as exported to Office tools like Word, Excel. It would be desirable to be ordered by any column while it is in the screen and exported or printed in that order.

The Expense Reports will be selected under any of the following criteria or a combination of them: by project, employee, issuing date, authorization date and payment date. Dates searching facilities will be better introduced as a period.

The Expense Report will show the following information:
  Project
  Employee name
  Status
  Approval Date
  Paid
  Payment Date
  Total expenses
  Balance The Expense Report will be printed under specific format including the Expense lines.

Employees will allow to be searched by a combination of any data contained in Employee definition.

Modelling with SOSY Modeller

Phase 1: Classes identification. The process of class identification is a process of finding relevant entities that will hold the System information. These will be obtained from Requirements definition above defining what the program to be written must be able to do.

The following chart has class identifications underscored:
  The system will manage the expense reporting of employees, expense approvals and payments.
  Expenses will reflect both: pattern currency and its equivalent to other currency. Expense line will only allow input in pattern currency.
  Employees may present an expense report when they have supported expenses on behalf of the company. Typically, the expenses are associated to a certain project or specific task.
  At presenting the expense report, associated tickets or receipts will be attached and advances will be reflected. Advances must be discounted out from the expense report balance.
  The expense report, once presented, must be authorized by a person responsible for the expenses. The authorization process will allow rejection of the expenses if necessary.
  Once authorized, the expense report will be approved for payment by a person responsible for accounting. Once paid, it will be marked as paid.

The Procedure will be as follows:
  Prior to any expense, the employee may request money in advance. This will not be reflected in the Expenses Management System program.
  The employee will provide all expenses and advances tickets to the system operator (may be himself). It will include explanations for expenses when required.
  After entering expenses in the system, the employee will issue the expense report closing the expenses report. Then it will be pending approval status.
  A responsible of expenses (employee's manager) will authorise the expense report if the expenses appear legitimate, and it will thereafter be in a pending payment status. If no approval is granted, the expense report will be rejected with a comment indicating why it has been rejected. The expenses report will then be set back to an open status to be modified.
  Payments responsible (an accounts payable person) will approve the payment. Once approved, the expense report will be marked as paid and locked. Only the person responsible for payments will be able to unlock the expenses reports in case of error.
  Once the payment has been done, the Expenses Report is marked as paid indicating date and payment media. If balance was debit, advances were bigger that expenses, a warning message will require confirmation of payment.

Detailed Information to be Captured
  Expense:
  Header and footer: General information of the Expense.
  Employee: Code and Name.
  Trip cause, visit to or general expense cause.
  Project to charge expenses to.
  Total advanced amount. Both currencies
  Total expenses. Both currencies
  Balance. Both currencies
  Date of Expenses Report issuing.

Figure 9C:
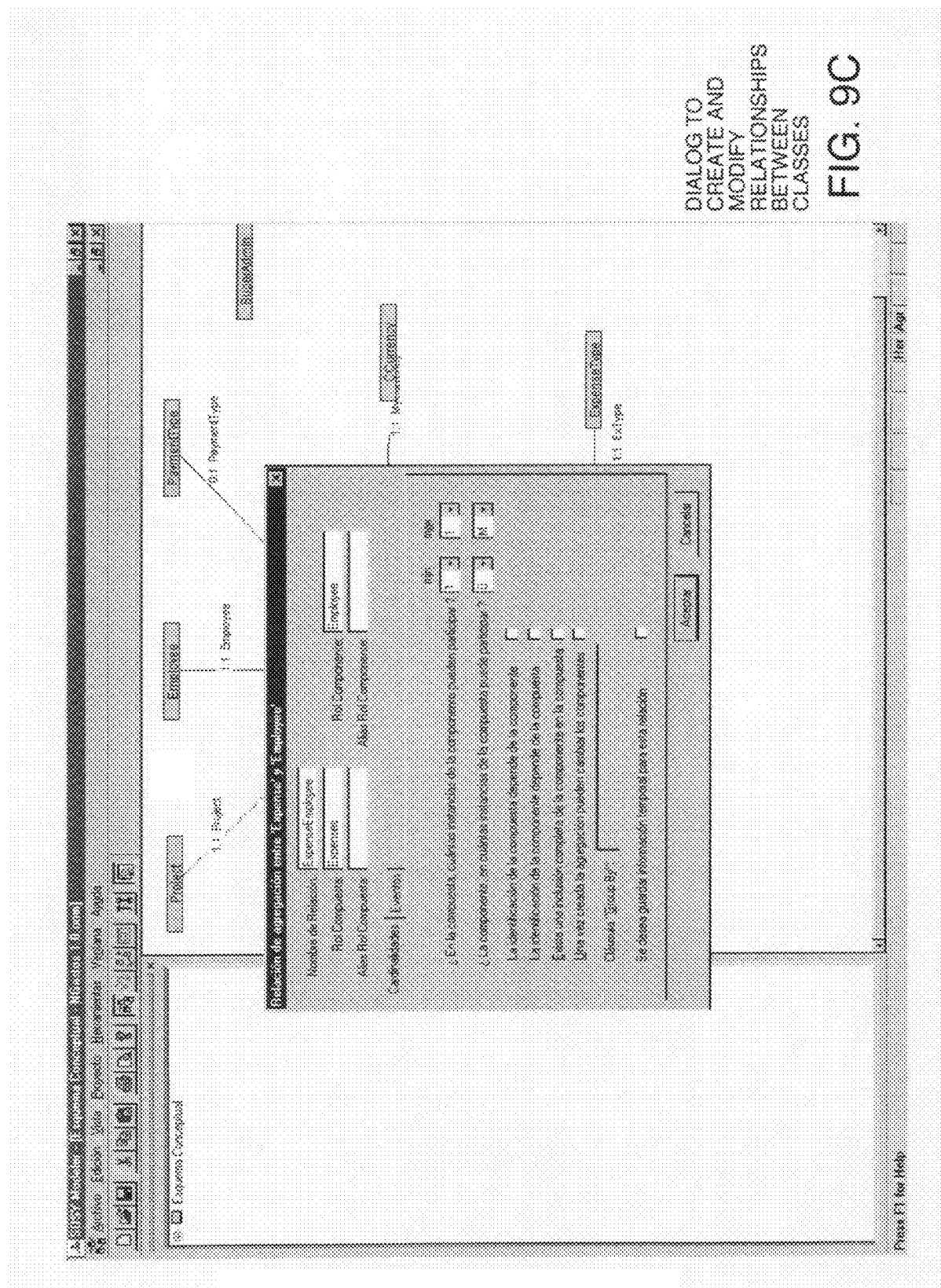
FIG. 9C is a screenshot of the dialog box to modify the properties of an aggregation relationship between any two classes specified in the dialog box.

Expenses approval date.
Payment date and media.
Payment comments, if proceeds.
Rejection cause, if proceeds.
Expense Line:
Each line details a certain expense.
Including:
Expense date.
Expense Type: (Car usage in Km, allowance, etc.) Some expense types will have a fixed price, some will perform a calculation, other will let operator to include the amount as figures in ticket.
Units. The meaning will depend on expense type. Some types will not allow operator to use this.
Prize to apply. Prize per unit in pattern currency. Depends on expense type.
Expense description.
Expense Line total. Both currencies
Employee:
Employee code. This must be unique in the system.
Name and First name
Site, phone numbers, email.
Querying and Reporting Facilities:
The results of any search in the application may be considered as a report so it must be possible to be printed as well as exported to Office tools like Word, Excel. It would be desirable to be ordered by any column while it is in the screen and exported or printed in that order.
The Expense Reports will be selected under the following criteria or a combination of them: by project, employee, issuing date, authorization date and payment date. Dates searching facilities will be better introduced as a period.
The Expense Report Will Show the Following Information:
Project
Employee name
Status
Approval Date
Paid
Payment Date
Total expenses
Balance
The Expense Report will be printed under specific format including the Expense lines.
Employees will allow to be searched by a combination of any data contained in Employee definition.
FIG. 9A is a screenshot of the dialog box to create the class which simply involves giving it a name.
FIG. 9B is screenshot of a graphic interface box showing the classes that have been defined to store the pertinent information and provide the pertinent services to implement a computer program that meets the above defined requirements. Defining these classes starts the process of building the Formal Specification in the high level repository.
FIG. 9C is a screenshot of the dialog box to modify the properties of an aggregation relationship between any two classes specified in the dialog box. Both inheritance and aggregation relationships have to have been previously created using a dialog box similar to FIG. 9A.
Phase 2: Relationships between classes. This process involves finding Aggregations and Inheritances including their properties.
The Following Chart Will Underscore these Relationships:
The system will manage the expense reporting of employees, expense approvals and payments.
Expenses will reflect both: pattern currency and its equivalent to other currency. Expense line will only allow input in pattern currency.
Employees may present an expense report when they have supported expenses on behalf of the company. Typically, the expenses are associated to a certain project or specific task. At presenting the expense report, associated tickets or receipts will be attached and advances will be reflected. Advances must be discounted out from the expense report balance.
The expense report, once presented, must be authorized by a person responsible for payment of the expenses (employees manager typically). The authorization process will allow rejection of the expenses if necessary.
Once authorized, the expense report will be approved for payment by a person responsible for accounting. Once paid, it will be marked as paid.
The Procedure Will be as Follows:
Prior to any expense, the employee may request money in advance. This will not be reflected in the Expenses Management System.
The employee will provide all expenses and advances tickets to the system operator (may be himself). It will include explanations for expenses when required.
Once the information has been introduced into the system, the employee will issue it closing the expenses report. Then it will be in a status of pending approval.
A person responsible for payment of expenses will authorise the expenses if the expenses appear legitimate, and the expense report will have its status changed from pending to payment approved. If the expenses are not approved, the expense report will be put in rejected status with a comment indicating why it has been rejected. The expenses report will be then be put back into an open to be modified status.
The person responsible for payment will approve the payment. Once approved, it will lock the expense report in a status marked as paid. Only the person responsible for payments will be able to unlock the expenses reports back to an open to be modified status in case of error.
Once the payment has been done, the Expenses Report is marked as paid indicating date and payment media. If balance was debit, advances were bigger that expenses, a warning message will require confirmation of payment.
Detailed Information to be Captured
Expense:
Header and footer: General information of the Expense.
Employee: Code and Name.
Trip cause, visit to or general expense cause.
Project to charge expenses to.
Total advanced amount. Both currencies
Total expenses. Both currencies
Balance. Both currencies
Date of Expenses Report issuing.
Expenses approval date.
Payment date and media.
Payment comments, if proceeds.
Rejection cause, if proceeds.
Expense Line:
Each line details a certain expense.
Including:
Expense date.
Expense Type: (Car usage in Km, allowance, etc.) Some expense types will have a fixed price, some will perform a calculation, others will let operator include the amount on the receipt.

Units. The meaning will depend on expense type. Some types will not allow the operator to use this.

Prize to apply. Prize per unit in pattern currency. Depends on expense type.

Expense description.

Expense Line total. Both currencies

Employee:

Employee code. This must be unique in the system.

Name and First name

Site, phone numbers, email.

Querying and Reporting facilities:

The results of any search in the application may be considered as a report so it must be possible to print the report as well as export it to Office tools like Word or Excel. It would be desirable to allow the report to be ordered by any column while it is in the screen and exported or printed in that order.

The Expense Reports will be selected under the following criteria or a combination of them: by project, employee, issuing date, authorization date and payment date. Dates searching facilities will be better introduced as a period.

The Expense Report will show the following information:
Project
Employee name
Status
Approval Date
Paid
Payment Date
Total expenses
Balance The Expense Report will be printed under specific format including the Expense lines.

Employees will allow to be searched by a combination of any data contained in Employee definition.

No inheritance relationship used in this model.

Figure 10:
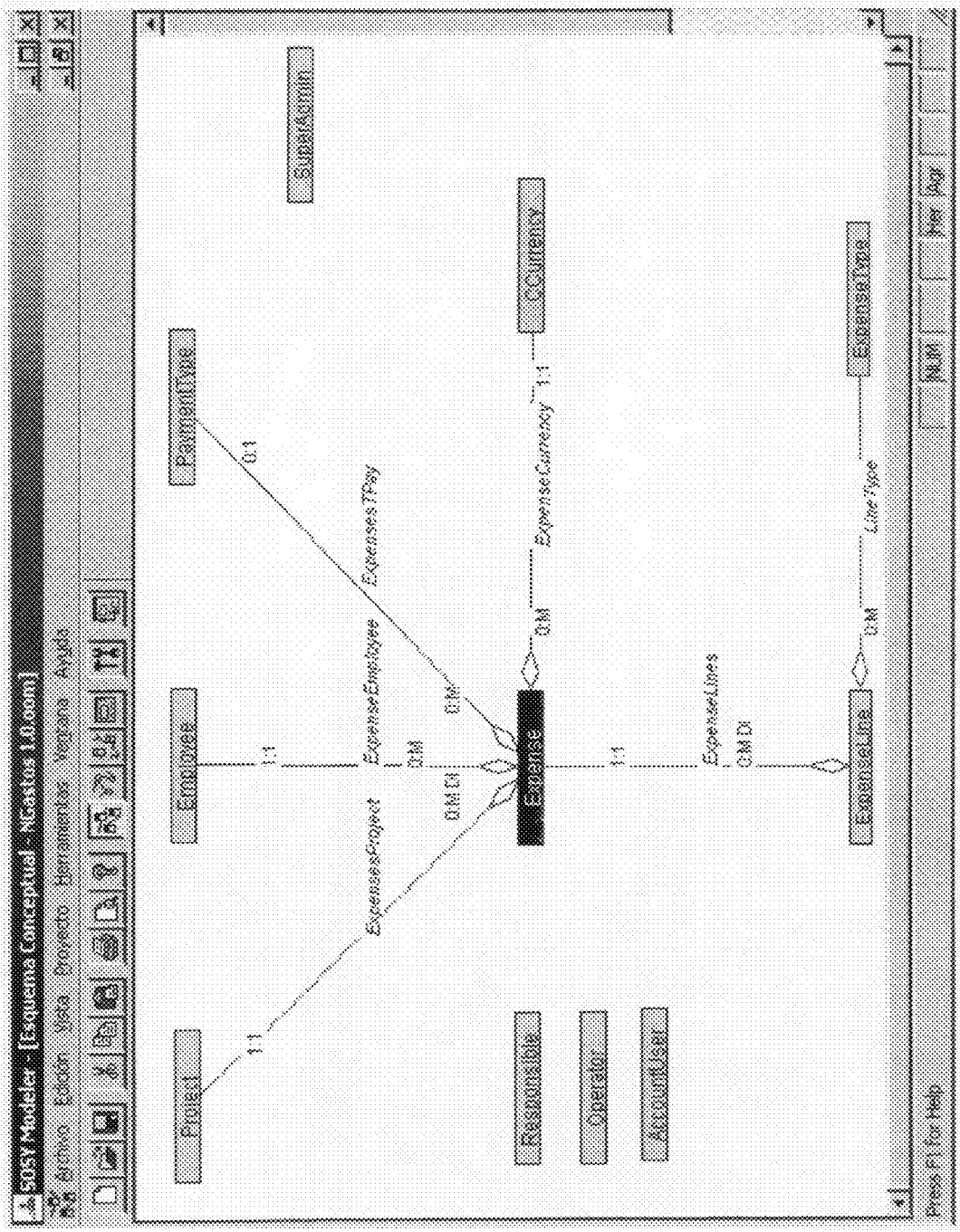
FIG. 10 is a dialog box to create the relationships between specified classes and which graphically shows the relationships so created and all the properties of those relationships.

FIG. 10 is a dialog box to create the relationships between specified classes and which graphically shows the relationships so created and all the properties of those relationships.

Phase 3: Filling in all classes' details. This process involves identifying attributes, services and integrity constraints for each class. We will focus in Expense class, mark attributes by underscore and mark services in italics.

The system will manage the expense reporting of employees, expense approvals and payments.

Expenses will reflect both: pattern currency and its equivalent to other currency. Expense line will only allow input in pattern currency.

Employees may present an expense report when they have supported expenses on behalf of the company. Typically, the expenses are associated to a certain project or specific task.

At presenting the expense report, associated tickets will be attached and advances will be reflected. Advances must be discounted out from the expense report balance.

The expense report, once presented, must be authorized by a person responsible for payment of the expenses. The authorization process will allow rejection of the expenses if necessary.

Once authorized, the expense report will be approved for payment by a person responsible for payment of expenses, Once paid, it will be marked as paid.

The Procedure will be as follows:
Prior to any expense, the employee may request money in advance. This will not be reflected in the Expenses Management System.

The employee will provide all expenses and advances tickets to the system operator (may be himself). It will include explanations for expenses when required.

Once introduced the information in the system, the employee will issue it thereby closing the expense report. Then it will be pending to be approved.

A person responsible for payment of expenses will authorize the expenses if they appear to be legitimate and the expense report will be pending to be payment approved. If not, it will be rejected with a comment indicating why it has been rejected. The expenses report will be then be moved back to an open to be modified status.

The person responsible to make payment will then approve the payment. Once approved, it will lock to be marked as paid. Only the person responsible to make payments will be able to unlock the expenses reports in case of error.

Once the payment has been done, the Expenses Report is marked as paid indicating date and payment media. If balance was debit, advances were bigger that expenses, a warning message will require confirmation of payment.

Detailed Information to be captured

Expense:

Header and footer: General information of the Expense.

Employee: Code and Name.

Trip cause, visit to or general expense cause.

Project to charge expenses to.

Total advanced amount. Both currencies

Total expenses. Both currencies

Balance. Both currencies

Date of expenses report issuing.

Expenses approval date.

Payment date and media.

Payment comments, if comments are present.

Rejection cause, if payment was rejected.

Expense Line:

Each line details a certain expense.

Including:

Expense date.

Expense Type: (Car usage in Km, allowance, etc.) Some expense types will have a fixed price, some will perform a calculation, other will let operator to include the amount as figures in ticket.

Units. The meaning will depend on expense type. Some types will not allow operator to use this. Prize to apply. Prize per unit in pattern currency. Depends on expense type.

Expense description.

Expense Line total. Both currencies

Employee:

Employee code. This must be unique in the system.

Name and First name

Site, phone numbers, email.

Querying and Reporting Facilities:

The results of any search in the application may be considered as a report so it must be possible to be printed as well as exported to Office tools like Word or Excel. It would be desirable to be ordered by any column while it is in the screen and exported or printed in that order.

The Expense Reports will be selected under the following criteria or a combination of them: by project, employee, issuing date, authorization date and payment date. Dates searching facilities will be better introduced as a period.

The Expense Report will show the following information:
Project

Employee name
Status
Approval Date
Paid
Payment Date
Total expenses
Balance

The Expense Report will be printed under a specific format including the Expense lines.

Employees will allow to be searched by a combination of any data contained in Employee definition.

Figure 11A:
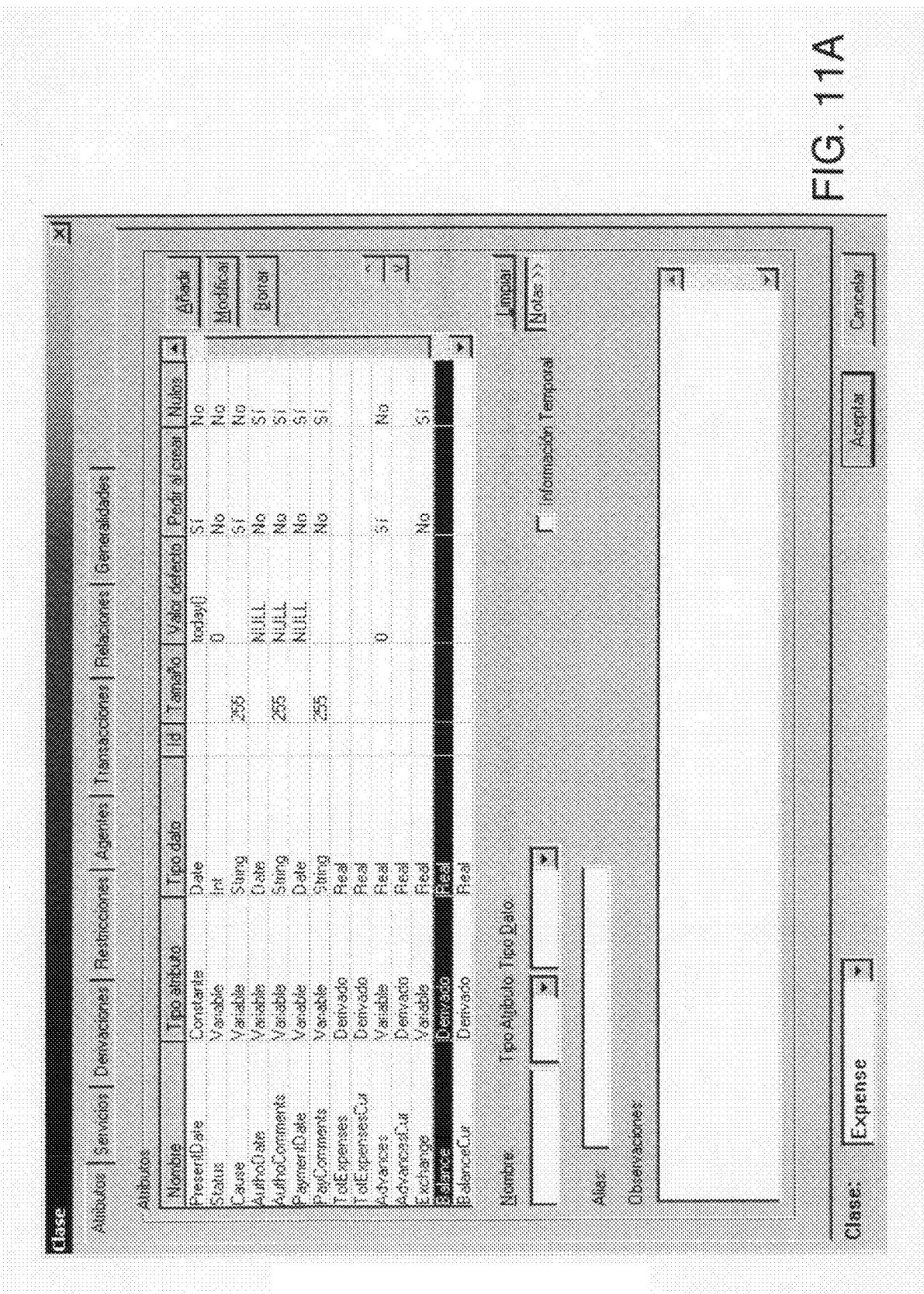
FIG. 11(A) shows the dialog box used to define the attributes for the Expense class with their properties. This dialog box is used to define whether each attribute is constant, variable or derived, the type of data it contains and other things.
Figure 11B:
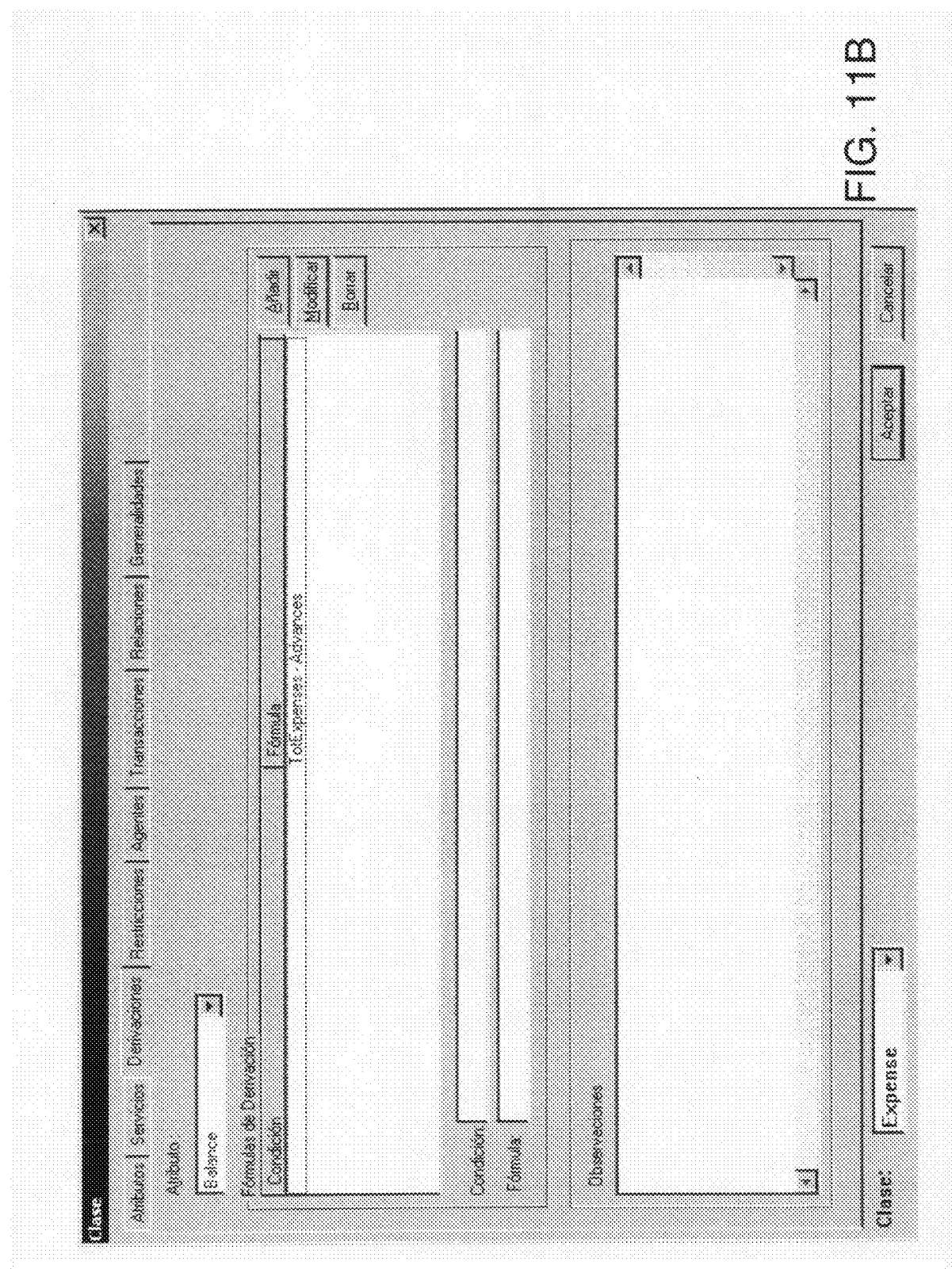
FIG. 11(B) is the dialog box used to fill in the formulas used for derivation of the values of attributes of classes from the values of other attributes.

FIG. 11 is comprised of FIG. 11A and FIG. 11B. FIG. 11A shows the dialog box used to define the attributes for the Expense class with their properties. This dialog box is used to define whether each attribute is constant, variable or derived, the type of data it contains and other things. FIG. 11B is the dialog box used to fill in the formulas used for derivation of the values of attributes of classes from the values of other attributes. The difference between the derivation formulas and the formulas defined in the functional model dialog box is that the formulas defined using the functional model dialog box change the values of attributes when services are performed while derivation formulas change the value of attributes only when the values of the other attributes used in the derivation formula change. That is, the formulas defined using the functional model relate services to the values of attributes they operate upon. Formulas defined by the derivation dialog box relate the value of one or more attributes to the values of other attributes.

Note that some services force the existence of an attribute. Note also that items above that seem to the reader to be attributes probably are attributes but not for the expense class and therefore were not marked.

The value of some attributes depends on the value of other attributes of the class Expense. These attributes are called Derived. For example the attribute Balance is derived from the attributes Total Expenses and Total Advances and has the formula: Balance=Total expenses−Total Advances, as illustratrated in FIG. 11B which is a dialog box in which the formula to derive this attribute is defined by the modeller.

We will model the status of an expense report according to the marked situations with one attribute called "Status" which has arbitrarily decided possible values of: 0=Open (modifying the expense report), 1=Closed (pending to be authorized), 2=Authorized (pending to be approved), 3=Rejected (not authorized), 4=Payment pending (payment approved but not paid), 5=Payment Rejected (not allowed to be paid) and 6=Paid (the expense has been paid)

Figure 12:
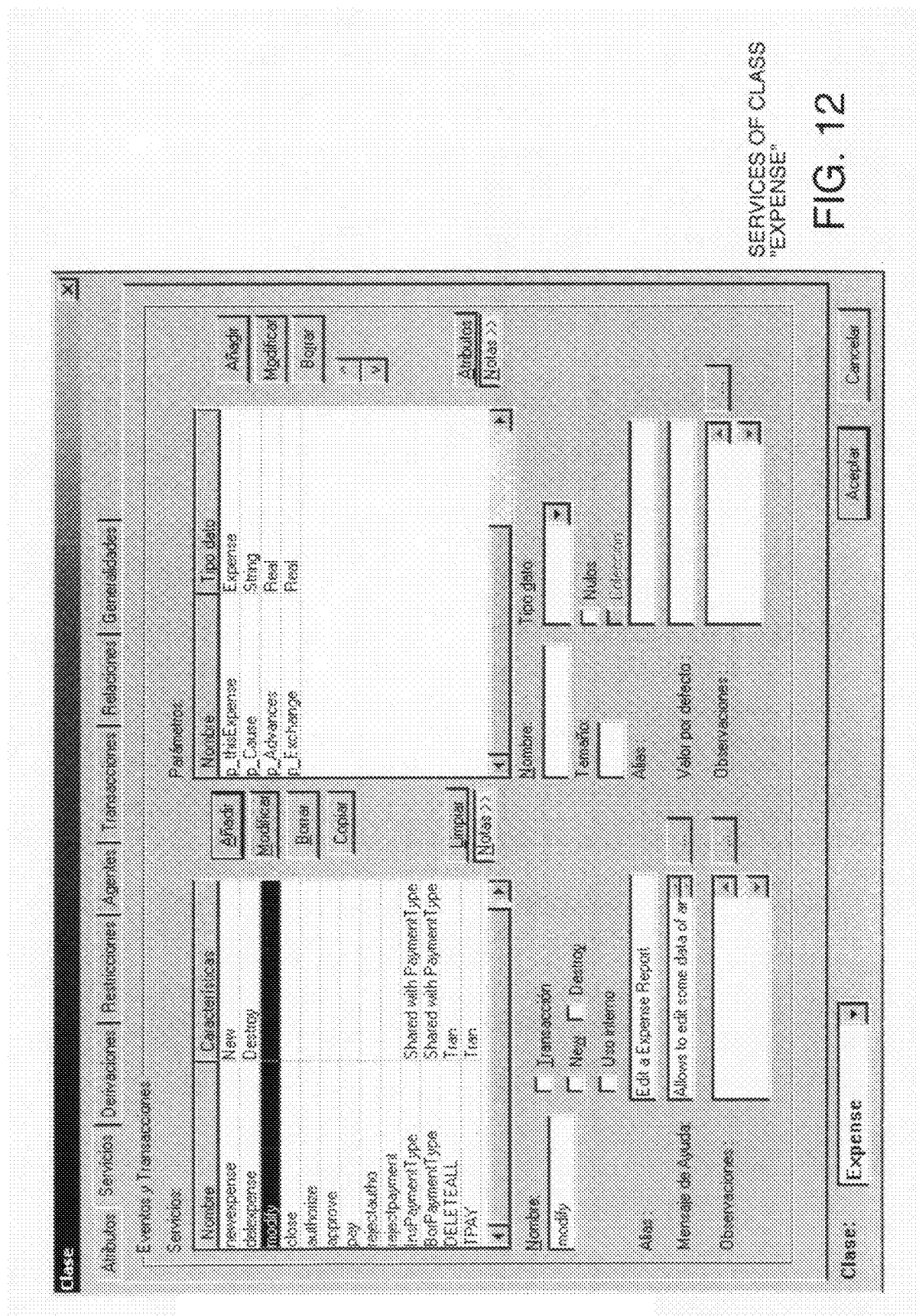
FIG. 12 shows a dialog box which a SOSY modeler uses to define the services of the Expense class with their arguments.

FIG. 12 shows a dialog box which a SOSY modeler uses to define the services of the Expense class with their arguments. Single services needed for this example, known as events:

newexpense: Allows to create a new Expense Report. It's a special service marked as "New" event.

delexpense: Allows to delete an existing Expense Report. It's a special service marked as "Destroy" event.

modify: Allows to change some data of an existing Expense Report. It will change the value of the attributes Cause, Advances and Exchange.

close: Mark an existing Expense Report as ready to authorize.

authorize: Mark an existing Expense Report as authorized and ready to be approved.

approve: Mark an existing Expense Report as approved for payment.

pay: Mark an existing Expense Report as paid indicating the date and optional comments.

rejectautho: Reject the authorization for an existing Expense Report marking it as "Rejected" with optional comments.

rejectpayment: Reject the payment for an existing Expense Report with optional comments cancelapprove: Unlocks the expenses report Complex services needed for this example, marked as local transactions:

TNEW: Creates a new Expense Report. It will use the "newexpense" event, that will be marked as internal (the interface will not offer the service marked as "internal"). This service has not been expressed in the system requirements but it's necessary according to the aggregation relationship with the "PaymentType" class. The properties of this relationship allows the "New" event to set the relationship with "PaymentType", since it has no sense until it has been paid. Encapsulating the "New" event we can set the value of this relationship to Null.

DELETEALL: Delete an existing Expense Report and all its lines. It will use the "delexpense" event, that will be marked as internal (the interface will not offer the service marked as "internal"). This service has not been expressed in the system requirements, but it's necessary according to the aggregation relationship with the "ExpenseLine" class. The properties of this relationship express that an existing Expense Report can not be deleted while having lines.

TPAY: According to the system requirement "Once the payment has been done, the Expenses Report is marked as paid indicating date and payment media". To implement this requirement, we need to encapsulate several services in a transaction.

Figure 13:
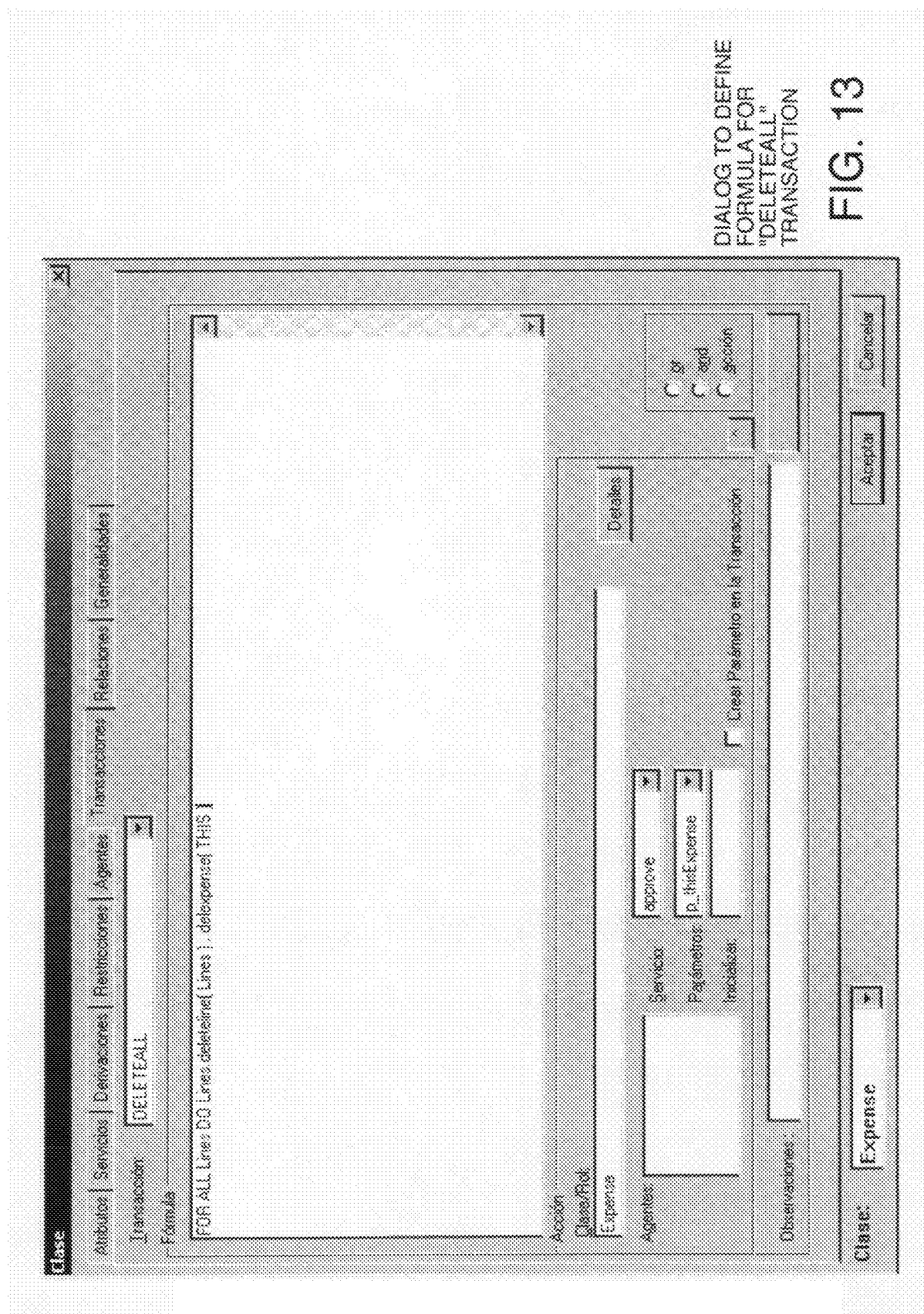
FIG. 13 is a screenshot of the dialog box used to create one formula in a local transaction carried out by a composed service (single services are called events, and composed services are called local transactions).

FIG. 13 is a screenshot of the dialog box used to create one formula in a local transaction carried out by a composed service (single services are called events, and composed services are called local transactions).

Figure 14:
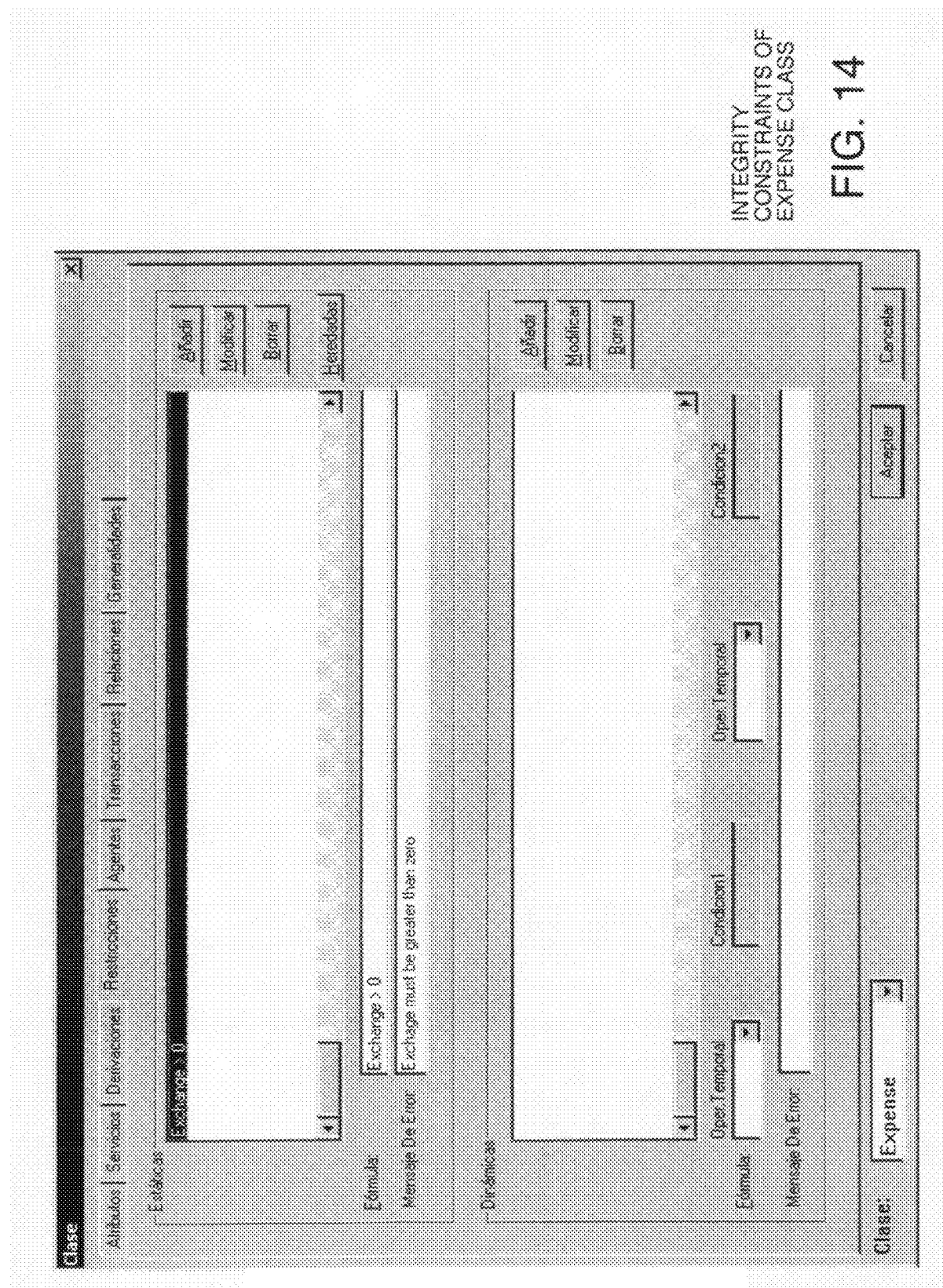
FIG. 14 a dialog box used by the modeler to enter the integrity constraint formula and error message text of "Expense" class.

FIG. 14 a dialog box used by the modeler to enter the integrity constraint formula and error message text of "Expense" class.

It's obvious, the value of the attribute "Exchange" always must be greater than zero.

Phase 4: Express evaluations. During this phase, one or more dialog boxes are presented to the SOSY modeler wherein he or she expresses evaluations of what will be the effect of all events for each variable attributes of each class.

This is the process of building the functional model portion of the Conceptual Model. The value change of an attribute when an event happens is known as "evaluation".

Figure 15:
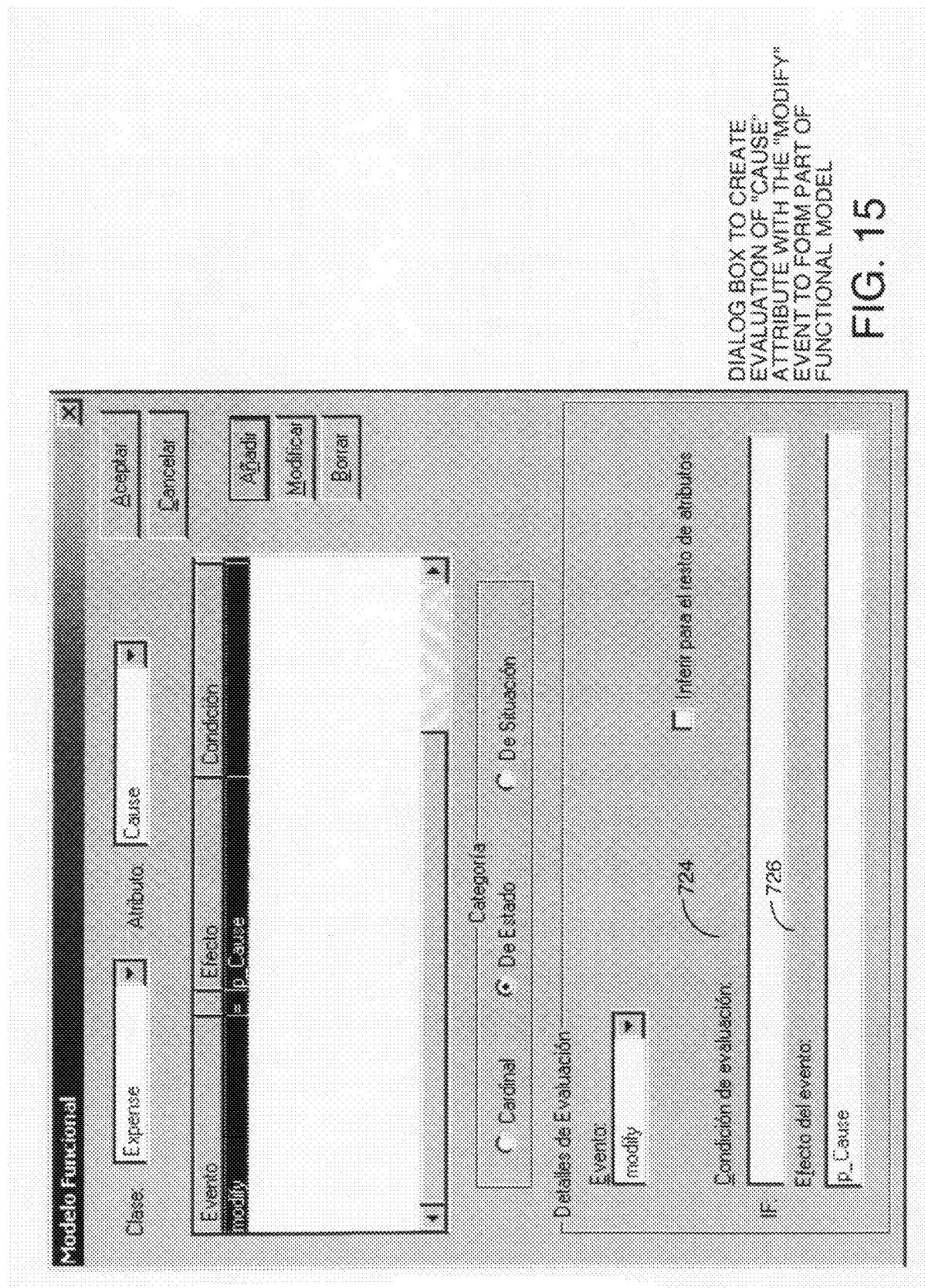
FIG. 15 is a dialog box to enter the functional model formulas that define evaluation of the attribute "cause" with the "modify" event (an event is a single service). The functional model relates services mathematically through well-formed formulas to the values of attributes these services act upon.

FIG. 15 is a dialog box to enter the functional model formulas that define evaluation of the attribute "cause" with the "modify" event (an event is a single service). The functional model relates services mathematically through well-formed formulas to the values of attributes these services act upon. Note that at box 724, the SOSY modeler has not filled in an evaluation formula that could be encoded in the final code to do a calculation to change the value of "cause" when the modify event occurs. Instead, as seen from box 726, the value of "cause" will be changed to whatever the value of the argument "p_cause" of the event "modify" when "modify" is executed.

Figure 16:
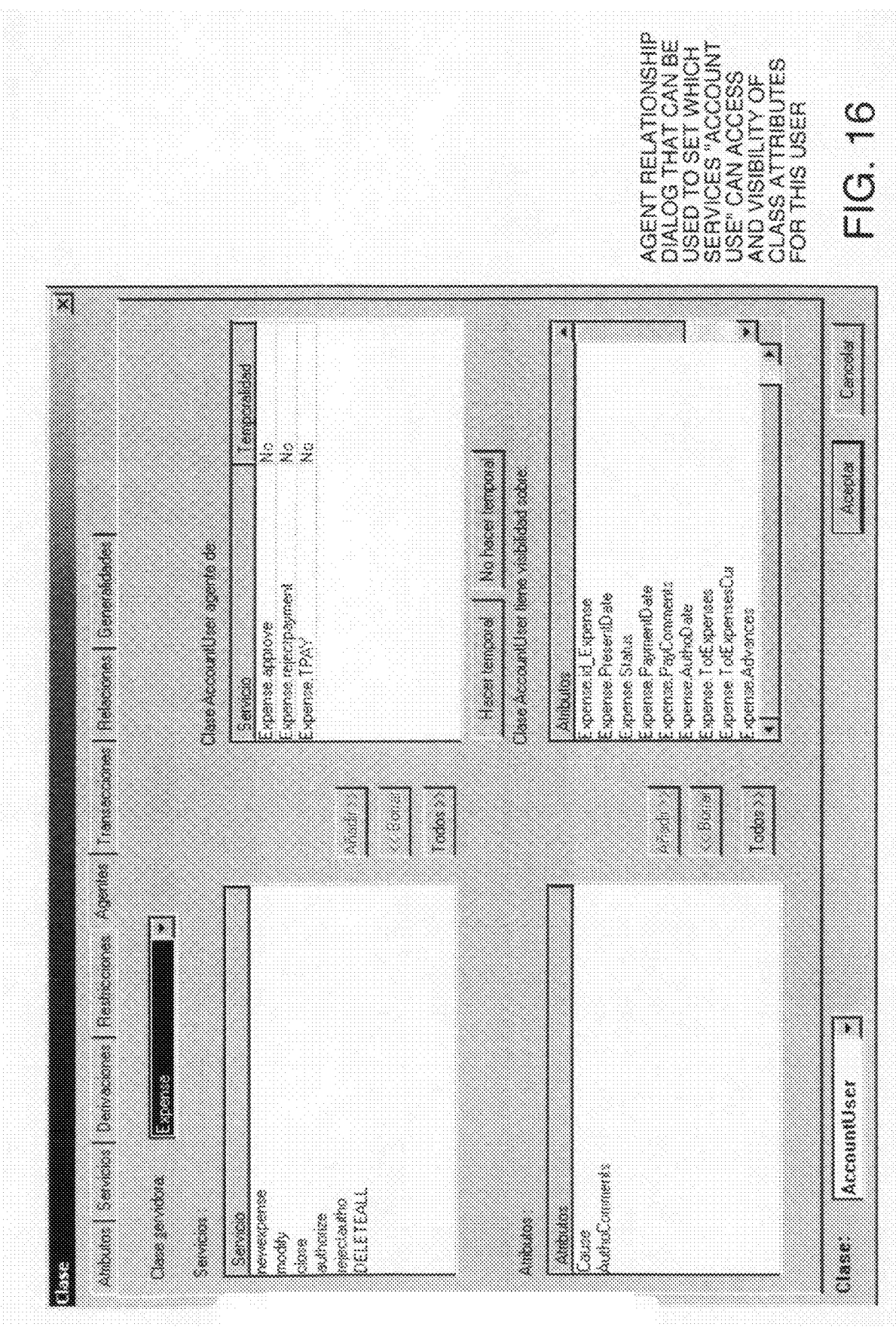
FIG. 16 is a dialog box which can be used by the SOSY modeller to establish the services the user "accountuser" can access and the visibility of class attributes for this user on the user interface.

Phase 5: Agent relationships. A big benefit of our Modeler is that the users of the system are part of it. Users are active objects (request services of other classes) and the different "profiles", i.e., users, are represented as agent classes. We must express which services of any class can be executed by every "profile". Also, we must express the visibility of class attributes for every "profile" so that the object system view can be presented properly by the user interface when the user logs in FIG. 16 is a dialog box which can be used by the SOSY modeller to establish the services the user "accountuser" can access and the visibility of class attributes for this user on the user interface.

Phase 6: State transition diagram. It's required for proper construction of the Conceptual Model to express the correct life cycle for every class of the model, indicating the correct order of execution for all the class services. Also, we can express conditions that must be satisfied in order to allow the execution of a service, which are called "preconditions".

Figure 17:
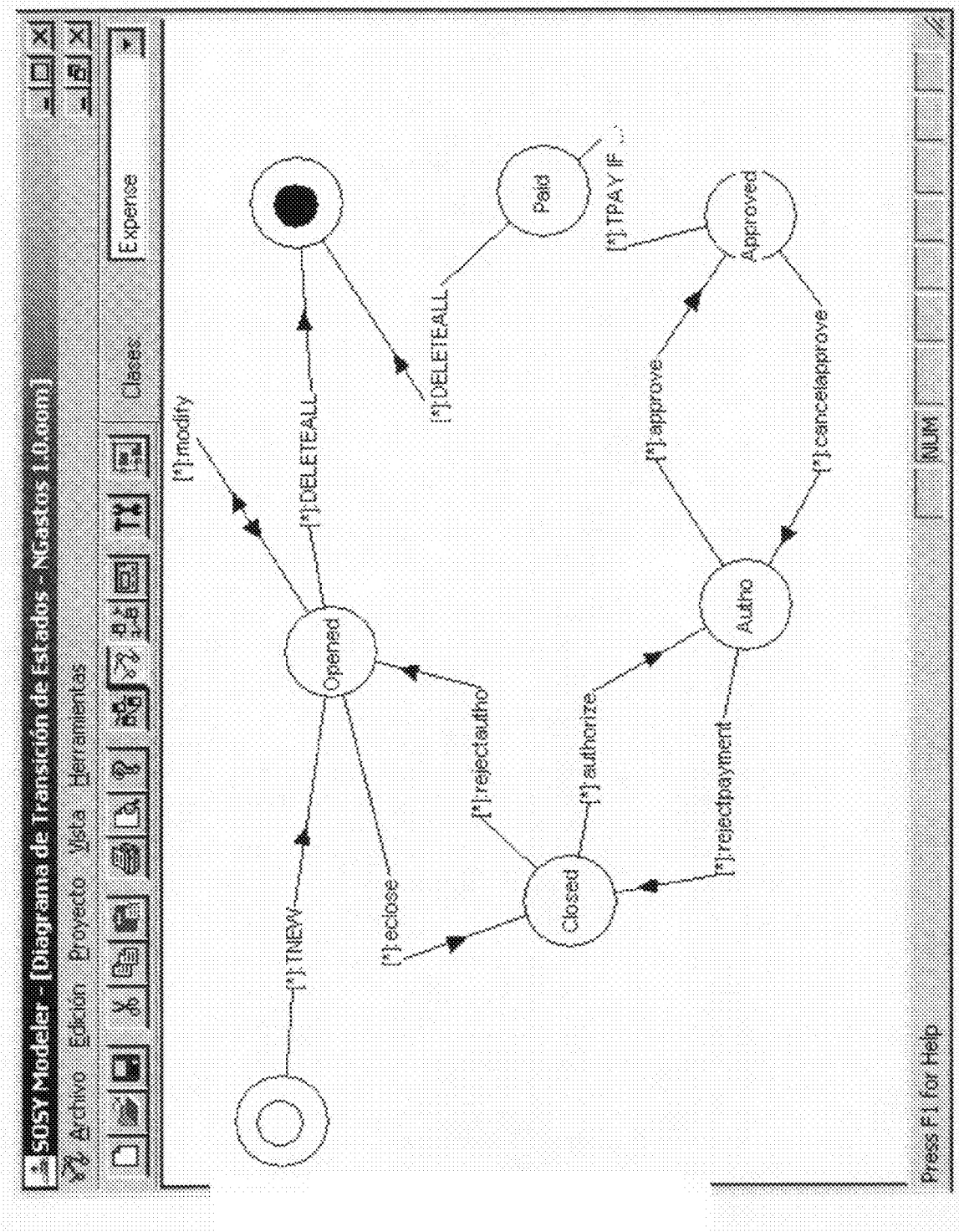
FIG. 17 is one of the two graphical user interface diagrams of the dynamic model on which the SOSY modeler has drawn a graphic illustrating the state transitions for the "expense" class.

FIG. 17 is one of the two graphical user interface diagrams of the dynamic model on which the SOSY modeler has drawn a graphic illustrating the state transitions for the "expense" class. Each state in the state transition diagram represents a valid state for the object and represents one of the "valid lives" and really is one of the unseen attributes of the expense class. An object can only enter one of the displayed states if the corresponding service has been thrown to transition to it from a previous state.

Figure 18:
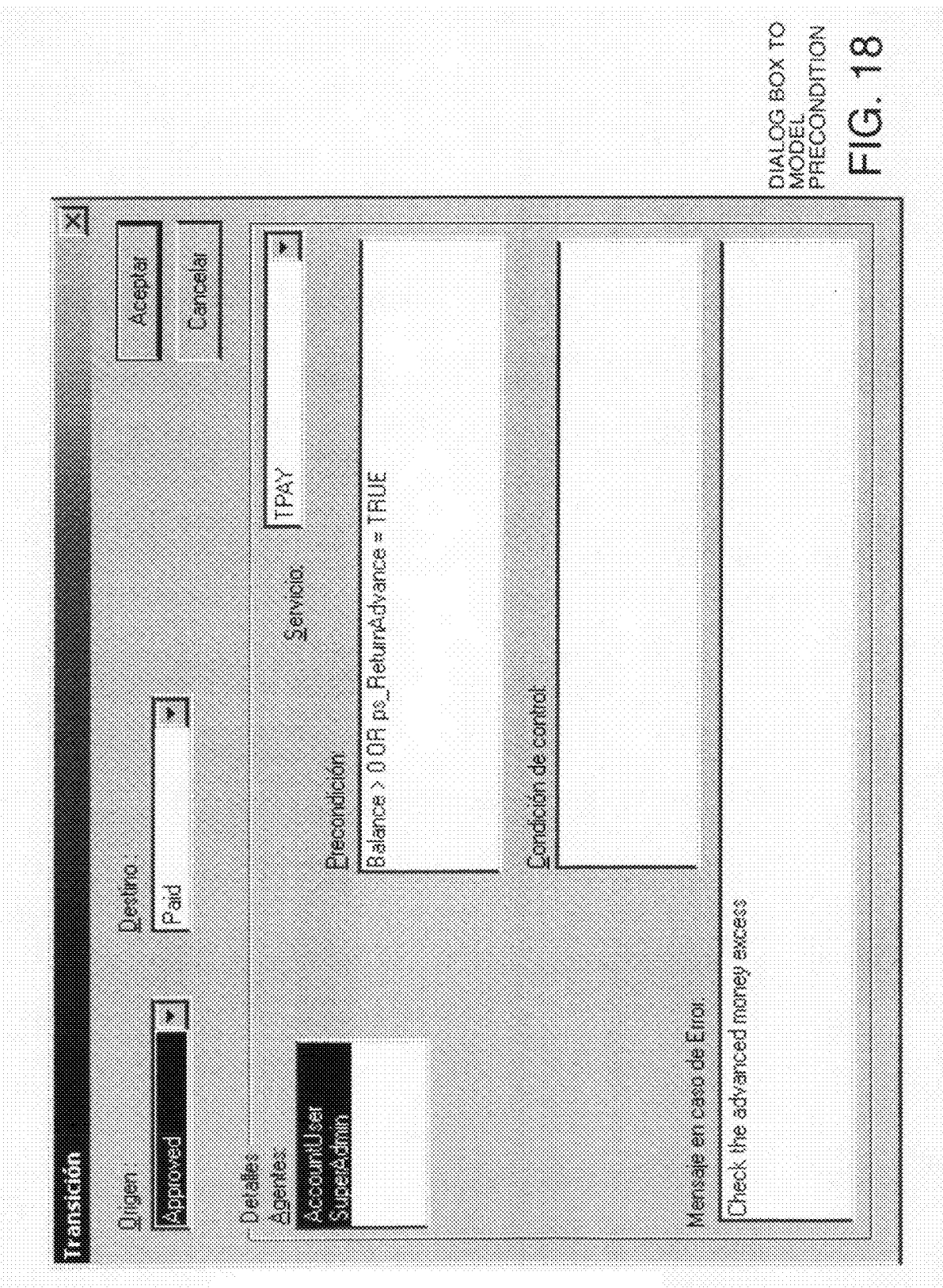
FIG. 18 is a dialog box used by the SOSY modeler to establish this precondition.

According to last paragraph of the Procedure in the system requirements for the expense report example, if the Advances are greater than total expenses, the system must request confirmation of the payment of expenses. It is expressed as a precondition in the "TPAY" transaction. FIG. 18 is a dialog box used by the SOSY modeler to establish this precondition.

Phase 7: Presentation Model. Finally, we can complete the Conceptual Model with the user interface requirements. We focus on Expense class. The following chart will mark by underscore the set of attributes to be displayed and will mark the searching criteria by setting them off in italics The system will manage the expense reporting of employees, expense approvals and payments.

Expenses will reflect both: pattern currency and its equivalent to other currency. Expense line will only allow input in pattern currency.

Employees may present an expense report when they have supported expenses on behalf of the company. Typically, the expenses are associated to a certain project or specific task.

At presenting the expense report, associated tickets will be attached and advances will be reflected. Advances must be discounted out from the expense report balance.

The expense report, once presented, must be authorized by a person responsible for payment of the expenses. The authorization process will allow rejection of the expenses if they do not appear justified.

Once authorized, the expense report will be approved for payment by a person responsible for paying such expenses. Once paid, the expense report will be marked in paid status.

The Procedure Will be as Follows:

Prior to any expense, the employee may request money in advance. This will not be reflected in the Expenses Management System.

The employee will provide all expenses and advances tickets to the system operator (which may be himself). It will include explanations for expenses when required.

Once the information has been introduced into the system, the employee will issue the expense report thereby closing the expenses report. Then it will be put into status pending to be approved.

A person responsible for payment of expenses will authorise the expenses if they appear to be legitimate and the expense report will be put in status pending to be payment approved. If not, the expense report will be rejected with a comment indicating why it has been rejected. The expenses report will be then be put back to status open to be modified.

A person responsible for making expense payments will then approve the payment. Once approved, the expense report will be put in locked status. Only a person responsible to make expense report payments will be able to unlock the expense reports in case of error.

Once the payment has been done, the Expenses Report is marked as paid indicating date and payment media. If the balance was debit, i.e., advances were bigger that expenses, a warning message will require confirmation of payment.

Detailed Information to be Captured

Expense:

Header and footer: General information of the Expense.

Employee: Code and Name.

Trip cause, visit to or general expense cause.

Project to charge expenses to.

Total advanced amount. Both currencies

Total expenses. Both currencies

Balance. Both currencies

Date of Expenses Report issuing.

Expenses approval date.

Payment date and media.

Payment comments, if necessary.

Rejection cause, if necessary.

Expense Line:

Each line details a certain expense.

Including:

Expense date.

Expense Type: (Car usage in Km, allowance, etc.) Some expense types will have a fixed price, some will perform a calculation, other will let operator to include the amount as figures in ticket.

Units. The meaning will depend on expense type. Some types will not allow operator to use this.

Prize to apply. Prize per unit in pattern currency. Depends on expense type.

Expense description.

Expense Line total. Both currencies

Employee:

Employee code. This must be unique in the system.

Name and First name

Site, phone numbers, email.

Querying and Reporting Facilities:

The results of any search in the application may be considered as a report so it must be possible to be printed as well as exported to Office tools like Word or Excel. It would be desirable to be ordered by any column while it is in the screen and exported or printed in that order.

The Expense Reports will be selected under the following criteria or a combination of them: by project, employee, issuing date, authorization date and payment date. Dates searching facilities will be better introduced as a period.

The Expense Report Will Show the Following Information:

Project

Employee Name

Status

Approval Date

Paid

Payment Date

Total Expenses

Balance

The Expense Report will be printed under specific format including the Expense lines.

Employees will allow to be searched by a combination of any data contained in Employee definition.

Figure 19:
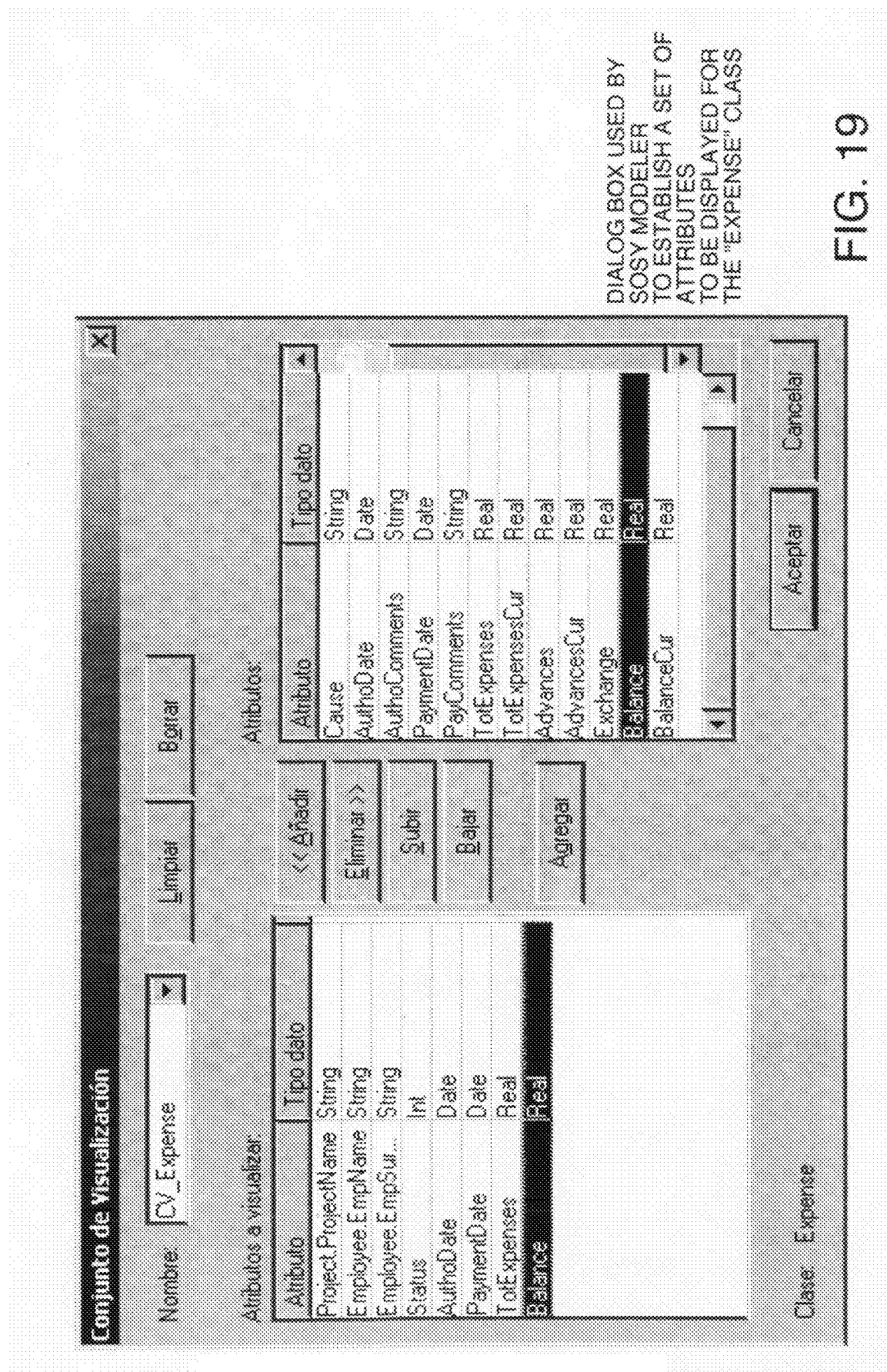
FIG. 19 is a dialog box used by the SOSY modeler to establish the set of attributes which will be displayed for the "expense" class.

FIG. 19 is a dialog box used by the SOSY modeler to establish the set of attributes which will be displayed for the "expense" class.

Figure 20:
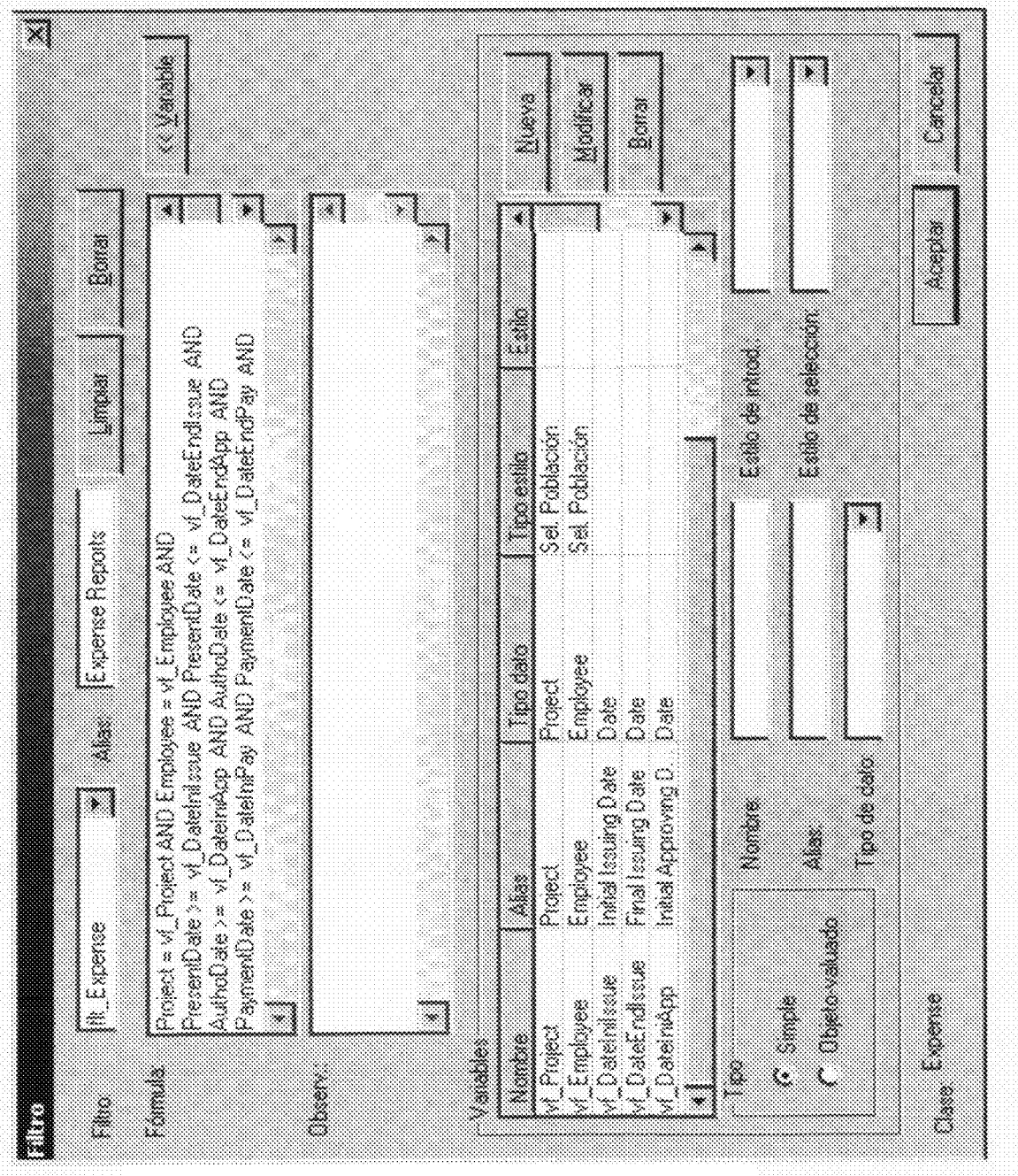
FIG. 20 shows the dialog box used by the SOSY modeler to establish the searching criteria for the expense class, and indicate the filter formula to use and which variables to request from the user.

FIG. 20 shows the dialog box used by the SOSY modeler to establish the searching criteria for the expense class, and indicate the filter formula to use and which variables to request from the user.

Translation Overview

Figure 6:
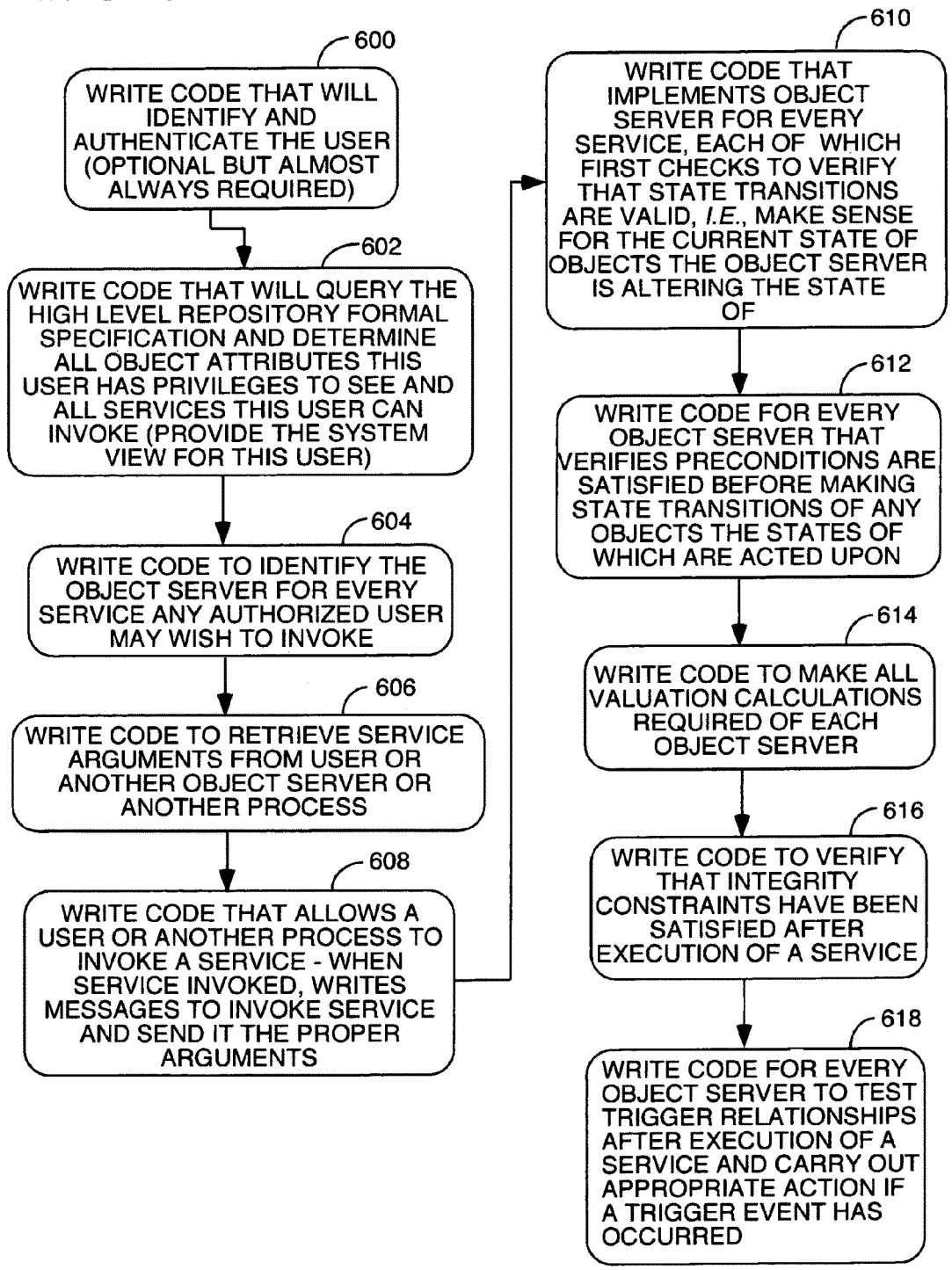
FIG. 6 is a flow diagram illustrating the high level view of the operation of translating a formal specification into a full application by following what it is referred to as "execution model".

The validated formal specification 215 is the source for an execution model that handles the implementation-dependent features associated with a particular machine representation. To implement the specified system, the way in which users interact with system objects is predefined. FIG. 6 is a flow diagram illustrating the high level view of the operation of translating a formal specification into working system logic computer code to what it is referred to as "execution model" by the system logic translator 232 in FIG. 2. FIG. 6 does not set out the details of any specific translator to translate the high level repository for any specific formal specification into any specific target language working Computer. Instead, FIG. 6 defines the steps or functions that all species in the subgenus of system logic translators would carry out in one way or another, maybe not in the same exact sequence. But at least these functions must be performed. The applicants believe that the translators alone may be novel in generating error-free output files from a validated formal language specification. The novelty of this system logic translator subgenus is this collection of functions working together to create a working computer program and not the details of how the functions are actually performed for a particular source formal language and a particular target language source code output, although such details are believed to be separately patentable for every formal language and target source code combination.

System Logic Translator Genus Defined

The process starts by logging the user into the system and identifying the user (step 600). Although this step might be optional in some embodiments, and thus should not be considered a defining characteristic of the subgenus, most applications require the user to be identified and authenticated so that privilege or access privileges can be implemented to code the system logic to block unauthorized users from performing certain functions.

An object system view is provided (step 602), determined by the set of object attributes and services that the user can see or activate. In other words, step 602 represents the process of writing code that will query the high level repository formal specification and determine all the objects and attributes thereof this user has privileges to see and all the services of those objects this user has privileges to invoke.

After the user is connected and has a clear object system view, he can then activate any available service in the user's worldview. Among these services, there will be observations (object queries), local services, or transactions served by other objects.

Any service activation requires two steps: build the message to send to the object server including the values for the arguments needed by the service, and then send the message to the appropriate object server. The object server is a piece of computer code that actually controls the computer to perform the service. In order to build the message, code must be written to identify the object server for every service any authorized user may wish to invoke (step 604). Steps 608 through 618 actually write the code of the object servers that will execute each available service. The existence of the object server is an implicit condition for executing any service, except for the service new.

Services need arguments to execute. These arguments may come from the data structure stored attribute values. Also, the user may need to introduces service arguments for the service being activated. In the library loan example, the service loan needs the arguments as to the identity of the borrower, the title of the book loaned, and the date of the loan. So to build the service activation message, step 606 writes code to retrieve the appropriate service arguments from the requestor (which may be the user or another service) for each service. Thus, the arguments will be supplied from another object server, another program or will be from the user, typically via a interprocess data transfer path from the user interface code written by the user interface translator. Note, in some embodiments, the system logic translator might be combined with the user interface translator, so step 606 represents the process of writing code to gather the arguments from the user directly or from another process. Step 606 also writes code to write the service invocation messages that are directed to the proper object server and which contain the proper arguments such that each service may be properly invoked when a request to do so is received.

Step 608 represents the process of writing code that allows a user or another process to invoke a service, and when the service is invoked, writes a message with the proper arguments needed by the service and sends it to the object server that carries out the service. Once the message is sent, the service execution is characterized by the occurrence of the following sequence of actions in the server object which are the actions that the code written by steps 610 through 618 must control the computer to perform in implementing the object server. In other words, steps 610 through 618 write object servers that have the following behaviors. First, the state transitions of every object which the object server can alter are checked so as to verify that a valid transition exists for the current object state in the formal specification for the selected. In other words, step 610 represents the step of writing object server code for every service which verifies state transitions can be validly made (make sense) for the current state of every object the object server is altering the state of before actually altering the state of the object.

Second, step 612 writes code for every object server which checks preconditions to ensure their satisfaction before acting upon an object to making a state transition thereof. In other words, the code written by step 612 makes sure the precondition associated with each service are satisfied before the service can be invoked. If either of these events is true (a state transition does not make sense, or a precondition has not been satisfied), the code written by steps 610 and 612 ignores the service invocation message, and the service will not be executed.

Next, step 614 writes codes that computes all the valuation calculations required of each object server. To ensure that the service execution leads the object to a valid state, the integrity constraints (step 616) are verified in the final state. In other words, step 616 writes code for every object server which verifies that any integrity constraints on results are satisfied, and takes some appropriate action if they are not such as flagging an error, etc. If the constraint does not hold, an exception will arise in the code written, and the code written will control the computer such that the previous change of state is ignored.

Step 618 writes code for each object server that will test for the occurrence of trigger events after an object's state has been changed and take appropriate action if a trigger event has occurred. In other words, the code written by step 618 will have the following behavior. After a valid change of state occurs, the set of condition-action rules (triggers) that represents the internal system activity are verified. If any of them hold (a trigger event is satisfied), the specified service in the condition-action rules will be triggered.

Accordingly, the steps illustrated in FIG. 6 guide the implementation of any program to assure the functional equivalence between the object system specification collected in the Conceptual Model and its implementation in an actual programming environment.

In one embodiment, several translators may be used to complement the CASE tool 210 to constitute an automatic software production system. In one implementation, for example, the translators produce an application in accordance with a three-tiered architecture. Particularly, three different translators arise, corresponding to each tier: a system logic translator 232, a user-interface translator 234, and a database generator 236. In addition, a fourth translator is used, documentation generator 238. These different translators are characterized by the output produced and, though potentially having the same input, each translator focuses on a particular subset of information in the above mentioned high level repository 215.

System Logic Translation: The Details

The system logic translator 232 automatically generates code for a third generation programming language from information in the high level repository. The output of the system logic translator 232 corresponds with the middle-tier in a three-tiered architecture.

In one embodiment, the system logic translator 232 produces source code that covers the following: (1) communications subsystem, (2) access to and communication with the persistence layer (the database or other file structure in which the values of all attributes of all objects are stored), (3) standard query services for reading the persistence layer contents, and (4) error handling produced by the persistence layer and client communications.

The communications subsystem is configured to: receive requests from a client, invoke internal methods, return replies to requestors that verify the requestor's existence and authorization to perform the requested service; verify the existence and validity of the requested server instance; create a copy of the requested server instance in memory accessing the persistence layer for persistent attributes or calculate the value of derived ones; validate any state transition for the requested service as specified in the state transition diagram 400 in the Conceptual Model; verify that the requested service's preconditions hold; perform all valuations related to the requested service as specified in the functional model; verify constraints for the new state achieved by the requested server instance; check trigger conditions to execute the corresponding actions; and make changes in the requested server instance persistent, i.e. state in the data structure stored in a memory.

In addition, code is generated for access to and communication with the persistence layer, service standard queries to read persistence layer contents, and handle errors produced by the persistence layer and communicate with the client.

In one embodiment, the first phase of code generation is the retrieval of information from the Conceptual Model 215 and storage of this information in code generation structures in memory. Three kinds of elements guide the retrieval of information: classes, global transactions, and global functions. Relevant information to be obtained from classes in the Conceptual Model include: name, constant attributes (name, type, requested upon creation, and initialization value formula), variable attributes (name, type, requested upon creation, initialization value formula, and null values admittance), derived attributes (name, type, and derivation formula), identification function, events (name, arguments: name and type, and precondition formula), transactions (name, type, arguments: name and type, precondition formula, and transaction formula), valuation formulae, state transitions (initial state, final state, service name, valid agents, and transition condition formula), static constraints formulae, dynamic constraints formulae, trigger conditions formulae, ancestor class (name), specialized classes (name, specialization condition formula, precondition redefinitions, and valuation redefinitions), aggregation relationships (related class, cardinalities, static or dynamic, and role names), and population selection patterns (filter: name and filter variables, order criteria).

Relevant information to be obtained from global interactions in the Conceptual Model include: name, arguments (name and type), and global interaction formula. Relevant information to be obtained from global functions in the Conceptual Model: include: name, return type, and arguments (name and type).

Generated code follows a component-based structure, based on the main unit of information that is found in the Conceptual Model, that is: the class. Each class in the Conceptual Model yields, in a first approach, several software components. For example, one component, referred to as a "server component" has an interface comprising a method for each service present in the signature of the corresponding class. Another component, whose interface comprises the methods necessary to query the population of the corresponding class, is called a "query component." A particular kind of executive component is the component relating to global interactions defined in the Conceptual Model, whose interface consists of a method per global interaction.

These components constitute the two access points the second or middle tier offered to the first or presentation tier. Server components receive requests from the presentation tier that relate to the execution of services, and query components receive requests from the presentation tier that relate with querying the persistence tier. Nevertheless these are not the only components generated.

Another generated component directly related to a class of the Conceptual Model is called the "Executive Component". This entity is responsible for resolving or executing each of the services in the signature of the corresponding class. This component receives requests from its corresponding server component or from other executive components.

Since a main purpose of the executive component is to resolve the services offered in the class signature, the interface presented by the executive component to the other components comprises a method per service. Each of these methods is structured according to the execution model.

In other words, the executive component is responsible for the following operations: verify the existence and validity for the requested server instance; create a copy of the requested server instance in memory accessing the persistence layer (by means of the above mentioned corresponding query component) to retrieve the values of constant and variable attributes; validate the state transition for the requested service and the present state of the requested server instance as specified in the corresponding state transition diagram in the Conceptual Model; verify the satisfaction of the requested service preconditions; modify the value of the instance variable attributes by performing all valuations affected by the service as specified in the functional model of the Conceptual Model, thus changing the state of the requested server instance; validate the new state achieved by the requested server instance by verifying its static and dynamic restrictions; check trigger conditions to determine which actions should be triggered if needed; communicate with the persistence layer for all persistent attributes of the requested server instance. Additionally, if the class is an agent of any service, another method is added to the interface whose purpose is that of validating the requestor's existence.

Another kind of executive component is a component related to global interactions defined in the Conceptual Model, whose interface consists of a method per global interaction.

If the class belongs to an inheritance hierarchy, all executive components of the same hierarchy are grouped into a single, special executive component. Nevertheless there would still be one server component per class in the hierarchy.

Another component to which a class in the Conceptual Model gives rise is a component called the "T component". This component is used to store a copy of the constant and variable attributes of an instance of the corresponding class, as well as the methods to calculate the value of its derived attributes. The corresponding query component implements a collection whose items are T components.

Another component to which a class in the Conceptual Model may give rise is a component called "P component". This component is used to store in memory the values needed to initialize the constant and variable attributes of the corresponding class when creating an instance of it, or just the values of the attributes that constitute the class identification mechanism. Such a component appears whenever the corresponding class is a multi-valued component of an aggregation relationship.

Another component to which a class in the Conceptual Model may give rise is a component called "PL component". This component implements a collection whose items are P components, as well as the methods needed to add and get items from the collection, and get the number of items in the collection. Such a component appears whenever the corresponding class is a multi-valued component of an aggregation relationship.

Another component to which a class in the Conceptual Model may give rise is a component called "C Components". This component is used to store in memory the values needed to initialize the constant and variable attributes of the corresponding class when creating an instance of it. Such a component appears whenever the corresponding class is a temporal or permanent, condition-based, specialization.

Additional components includes a CC component, an error component, a trigger component, a trigger list component, an instance list component, and condition, disjunction, and conjunction components.

The CC component appears whenever there is, at least one temporal or permanent, condition-based, specialization in the Conceptual Model. The CC component implements a collection whose items are C components, a pair of methods to add and get items to the collection (one pair per C component generated), and a method to get the number of items in the collection.

The error component always appears and is used to store information about the success or failure of a service execution. The trigger component stores information about a satisfied trigger condition so that the corresponding action can be later executed. The trigger list component implements a collection whose items are trigger components, as well as the methods to add an item to the collection, get any item from the collection, get the first item and get the number of items in the collection.

The instance list component implements a collection whose items are executive components playing in the execution of a given service. In addition to methods used to add an item to the collection, get an item, and get the number of items in the collection, this component implements a method to empty the collection and another one to look for an instance by its identification function.

The condition, disjunction and conjunction Components are always generated and support the construction of complex boolean expressions, used to query the persistence layer, structured as a conjunction of disjunctions. The condition component stores information about a simple boolean condition, that is: two operands and an operator (+, −, *, /, < >, <, <=, >=, > . . . ). The disjunction component implements a collection whose items are condition components (that is, a disjunction of conditions), as well as methods to add and get a condition from the collection and a method to get the number of conditions in the collection. The conjunction component implements a collection whose items are disjunction components (that is, a conjunction of disjunctions), as well as methods to add and get a disjunction from the collection and a method to get the number of disjunctions in the collection.

In addition, two modules are also generated: a global module for grouping attributes and methods shared through the generated code, and a global functions module that groups the code of all global functions defined in the Conceptual Model.

Translation Strategy and Architecture

In accordance with one embodiment, code generation is driven by the information retrieved from the high level repository 215. The translation process can be divided into four phases: validation of the Conceptual Model (performed by validator 220), translation of the corresponding data model into a relational database management system (performed by database generator 236), retrieval of information from the Conceptual Model and storage of this information in memory structures and finally, generation of files from the information stored in memory (e.g. reading the information in memory structures to generate code in the target programming language).

Validation of the Conceptual Model is mandatory in the preferred embodiment, while data model translation is optional, but both can be considered as prerequisites to the other two phases which are the ones strictly related to code generation. Translation structures are designed to store input information from the Conceptual Model and all have a method that uses this information to generate source code in the target programming language.

These translation structures include: a class to store information needed to generate server components (server class), a class to store information needed to generate server components for global interactions (global interactions server class), a class to store information needed to generate executive components (analysis class), a class to store information needed to generate executive components for global interactions (global interactions analysis class), a class to store information needed to generate executive components for inheritance hierarchies (inheritance hierarchy analysis class), a class to store information needed to generate query components (query class), a class to store information needed to generate T components (T class), a class to store information needed to generate C components (C class), a class to store information needed to generate CC component (CC class), a class to store information needed to generate P components (P class), a class to store information needed to generate PL components (PL class), a class to store information on the arguments for every service of every class in the Conceptual Model (arguments list class), a class to store information on the identification function of every class in the Conceptual Model (analysis class list class), classes to generate the methods needed to resolve a service in executive components (event class, shared event class, transaction class, interaction class), classes to generate the auxiliary methods needed to resolve a service in both executive components and executive components for inheritance hierarchies (precondition class, static constraints class, dynamic constraints class, . . . etc.). classes to generate methods needed in query and T components (T & Q method classes), a class to generate inheritance-specific methods (inheritance method class), and a class to monitor the generation process (code generation class).

The code generation class is responsible for retrieving all the information needed to generate code and for doing so in the appropriate order, for writing to files the generated code and organizing it into files properly according to the component-based structure. The code generation class maintains lists of the above mentioned generation structures in memory in which information retrieved from the Conceptual Model is to be stored and it later loops through these lists to write the appropriate files.

The information retrieval process basically comprises a series of loops through the classes in the Conceptual Model to gather all information needed, a loop trough global interactions and a loop through global functions in the Conceptual Model.

The last phase in the code generation process covers writing to files according to the component-based structure presented herein. This process comprises: looping through the lists of instances above described that maintain the information needed to generate components and their attributes and methods, and call each element's code generation method; generating global interactions executive component; generating global interactions server component; generating global functions module; and generating standard components.

For each global function in the Conceptual Model, a method is generated in this module that: has a global function name, has an argument. For each argument in that global function with the same name and whose type is translated into the corresponding one in the target programming language, and its return type is translated too.

User-Interface Translation

The user-interface translator 234 automatically generates source code for a third generation programming language from information in the high level repository. Its output corresponds with the presentation tier in a three-tiered architecture. Thus, the user-interface translator 234 provides as output the source code of a component that implements the user interface functionality. This component is automatically generated without human intervention. The user-interface translator 234 uses as input data a validated Conceptual Model 215 and offers as output data, source code in a third generation language that implements an equivalent functional prototype related to the Conceptual Model the component is derived from.

In one embodiment of the present invention, the user-interface translator 234 produces source code to perform the following: a communications subsystem able to send requests to a business component, and receive replies; a logon to system for user authentication; and a menu of available services for specific authenticated user. For each available service, frame, screen or data collection dialog of all service arguments, the user-interface translator 234 generates code that sets initial values for arguments, validates introduced data (type, range, object existence, etc.), and calling to server activation. In addition, the user-interface translator 234 generates code for standard query services that list all instances status in a class and error handling.

Additionally, code is generated for a wider and flexible user-interface operation. In a query service frame, form or screen, the following functionality will be available when a certain instance has been selected: navigation through relationships with related selected object. This navigation is used to browse among related data items following its related links. Additional functionality includes services activation for selected object; advanced query services including: filters (population selection), views (status selection), and sorting criteria; and context keeping for filling-in known services arguments. Context keeping is a user-facility. Context is data associated to the working user environment. This data is useful to provide default values for service arguments.

For its input, the user-interface translator 234 reads specification 215 of a Conceptual Model and stores this kind of information in intermediate structures in memory. The user-interface translator 234 is independent of the input medium in which the Conceptual Model is provided. In this way, the intermediate structures can be loaded from different data sources. The model is iterated in several passes to extract the relevant information in each phase of the translation process from the formal specification, including information about classes, aggregation relationships, inheritance relationships, agent relationships, global interactions, user defined functions, and interface patterns.

Translated applications are composed by forms that contain the user-interface offered to the final user. A form, in abstract sense, is the interaction unit with the final user. Forms are translated depending on capabilities of the target environment to match the requirements: e.g. windows dialogues for Windows environments, HTML pages in Web platforms, applets in Java, etc.

Figure 7:
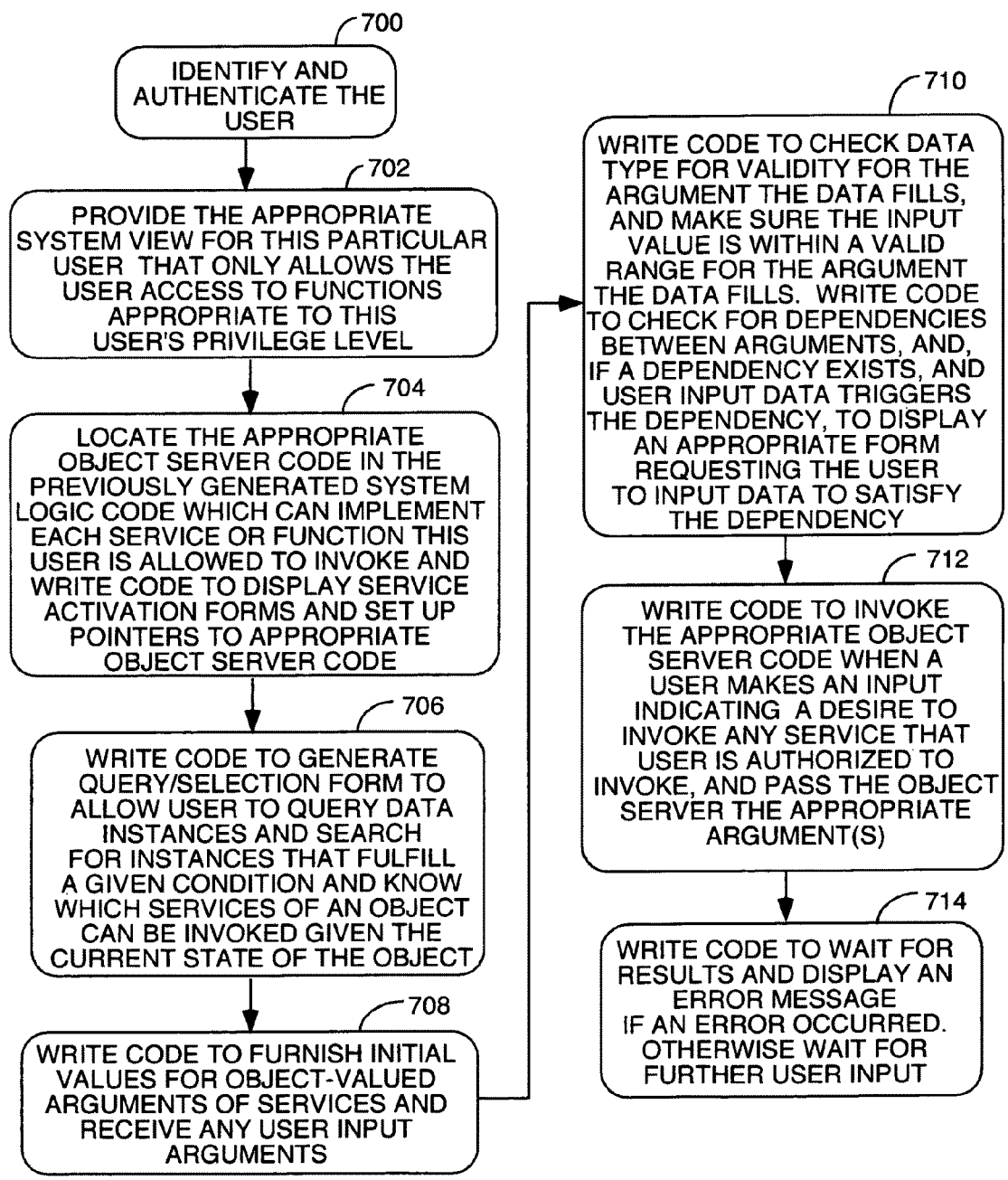
FIG. 7 is a flow diagram representing the sequence of functions that all translators in the subgenus of user interface translators will perform.

FIG. 7 is a flow diagram representing the sequence of functions that all translators in the subgenus of user interface translators will perform. The details of how each function is performed will vary from one target source code type to the next, but all species will share the characteristics of performing the functions of FIG. 7, possibly not in the same order.

Translated applications supply the user connection to the system. The user connection is resolved using an access form to identify and authenticate the user, block 700. In addition, the translated application provides a system user view, block 702. A user must be able to access services the user can launch, but should be presented with a system view that is appropriate to the user's privilege level. Block 702 represents the process of looking up the user's privilege level and determining which objects the user can have access and presenting a system view to the user which only allows the user to invoke functions that are appropriate to the user's privilege level. The main form is designed to accomplish this task.

For each service that can be executed by a user, the translated application locates the appropriate object server code in the system logic code previously generated, and generates an activation service form which points to the appropriate object server for each service the user can invoke, block 704.

For each class, the translated application generates a query/selection form. This form allows users to query data instances, search instances that fulfill a given condition, observe related instances and know which services can be launched for a given object in its current state, block 706. For each service, the translated application furnishes initialization values for object-valued arguments. Initial data is provided too by managing information obtained from the browse made by the user, and any user input arguments for services are checked to make sure they are valid data types for the arguments the data is intended to supply, and within valid ranges for the arguments the user input data is intended to fill.

Blocks 708 and 710. The process represented by block 710 also represents the process of writing code to check for dependencies between arguments. If this code finds that a dependency exists, and a user input triggers a dependency, it displays an appropriate form requesting the user to input data to satisfy the dependency and check that data for valid data type and within an acceptable range.

Block 712 represents the process of writing code to invoke the appropriate object server code when a user makes an input indicating a desire to invoke any service that the user is authorized to invoke, and to pass to that object server the appropriate arguments. Block 714 represents the process of writing code to wait for results and display an error message if an error occurred. If no error occurred, the code waits for further user input.

The user encounters different scenarios interacting with the application. These scenarios lead to defining different types of forms. In the next section, each kind of form will be described.

In the Conceptual Model 215, some classes are defined as agents of services classes (called agent classes). That is, if an object is a service agent it is allowed to request the service. Each agent object must be validated, i.e., authenticated before trying to request services. The Access Form authenticates by requesting selection of an agent class (selected from a list of valid agents classes), requesting an object identifier and requesting a password. The data collected is used to verify if there exists a valid agent object that is allowed to access the system. This is how users of the target program (each user is an agent class) are authenticated.

The Application Main Form contains a menu, where user can view the services he is allowed to execute. The source code required to implement each action requested by user is automatically generated.

For each accessible service for at least one agent, a Service Form is generated. These forms have an introduction field for each argument the user must provide. This argument's fields have attached code to validate data-types, sizes, value-ranges, nulls, etc. (block 710 process). Object-valued fields provide facilities to search the object browsing information and filter it. Code is generated to accomplish this task.

Each service argument can take its initial value in three different ways:

1. By Initial values. In the Conceptual Model, the designer can provide default values for attributes and arguments. If such value exists, code must be generated to supply the value (block 708).

2. By Context. Context information (for example, a list of recently observed objects) is useful to suggest values to object-valued arguments that have the same type as collected ones. A function is generated to search appropriate values in the recently visited objects list.

3. By Dependency Pattern. In the Conceptual Model, the system designer can define Dependency Patterns. The Status Recovery pattern is an implicit set of dependency patterns too. In both cases, the change on an argument can affect values in other arguments. So, the processing of block 710 is performed.

Data Validation (block 710) can occur just after data input, interactively warning the user and just before sending data to system-logic. Object-valued arguments validation requires checking object existence. To support validation, a function is generated for each service argument. The function is invoked before sending a request to system-logic.

The code written by one species of the user interface translator works in the following way. When the user requests service execution, the service arguments are validated by the code written by block 710. If the service arguments are valid, system logic is invoked to accomplish the service by code written by the process of block 712. The message built to invoke the system-logic uses the formal order to sort the arguments.

After executing the service, the user is informed whether the service succeeded or not (block 714). Accordingly, code to validate arguments and code to invoke the system-logic with necessary arguments in the formal order are generated. Furthermore, possible errors are returned to inform the user.

The Query/Selection Form permits the querying of objects (that can be restrained by filters) and the selection of an object. When an object is selected, the user can browse to other data items related to the object. In the same way, the user can launch a service of the selected object.

These query/selection forms include graphic items representing filters. A visual component is used to filter the population of a class. Filters may contain variables. In such cases, fields for the variables are requested to users in order to form the condition of the filter. For example: Find cars by color, by type and model.

These query/selection forms also include a visual component to show objects. Inside this component objects that fulfill the filter condition (or every class population if filters are not defined) appear. The attributes displayed in the component are fixed by a Display Set.

These query/selection forms also include a visual component to launch services. For example: given a car, the user can launch services in order to rent the car, return, or sell it. This task is achieved by a function that determines which service to launch of what object. The corresponding Service Form is invoked for each exposed service. These query/selection forms also include a component to initiate browsing. For example: given a car, the user can view the driver, the driver's sons, etc. When the user navigates (follows a link from an object) a new query/selection form is displayed. In the same way that the previous component, there exists code to invoke the next form to display when user browses objects. When a query/selection form is reached by navigation, the form receives information about the previous object in order to display only the data related to that initial object.

In the applications, visited objects and navigation paths followed by users are stored in some embodiments. This information is named Context Information. When the user browses data between query/selection forms, the path followed is stored. Finally, when the user tries to invoke a service and a service form is needed, the application can provide, as an extra input to the service form, this contextual information. Then, the Service Form uses this data to provide initial values for object-valuated arguments.

User-Interface Translator Architecture

Using the Conceptual Model 215 used as input, the user-interface translator 234 can retrieve information from memory structures, a relational database, using a query API or any other input source. An intermediate structure in memory is filled with the Conceptual Model data relevant for translating the user-interface component. Intermediate structure follows an architecture to the one defined in the Conceptual Model schema in which can be queried for classes, services, and attributes for a specific Conceptual Model.

When data is loaded in the intermediate structure, the real translation phase begins. Inside the source code files of the generated application, two types of files can be distinguished. One type of file is a set of files having fixed contents. These files correspond to structures or auxiliary functions widely used that are always produced in the same way. These files are generated by dumping byte streams directly from the translator to final files in order to create them. Other files strongly depend from the Conceptual Model that is being processed. Therefore, although these files have a well-defined structure (detailed in the previous section), they have variable parts depending on the processed model. The user-interface translator 234 iterates the Conceptual Model to extract the relevant data to generate these variable parts.

The translation process for the user-interface translator 234 has the following tasks for the preferred species as part of the genus processing symbolized by FIG. 7:

1. Generate the fixed files, e.g. headers, definitions, constants, and auxiliary functions to its respective files.

2. Generate auxiliary widgets (controls or Java Beans) depending on the application 3. For each class, generate a query/selection form, an instance selection component, a specialization component (if class is specialized from other class and requires extra initialization). For each service class, also generate a service form.

4. Generate an access form (identification).

5. Generate a main form containing the menu application (block 702).

6. Generate communication functions to reach system-logic server (block 704). These functions encapsulate the invocation of services available in the prototypes.

The Access Form generated as by the code written by block 700 is a little dialog box containing: a list of agent classes (from this list, the user chooses one), a field where the user provides OID for a valid object instance belonging to the previously selected class and a field for password. This form is mostly generated in a fixed way. The only varying section for each model is the mentioned agent classes list. By iterating over the model classes list and by checking which classes are agents such agent classes list can be obtained.

In order to provide access to the application's functionality (block 704), the services are arranged in an access-hierarchy to be converted to menu bars (Visual Basic client), HTTP pages (Web client) or any other structure that allows browsing. By default, the hierarchy is built by iterating the classes and services in the Conceptual Model. The hierarchy can be seen as an access tree to the application. For each class, a tree item is built labeled with class alias. For each built-in item, this mode has the following items as descendents: an item labeled as 'Query' to access a query form; an item for each service defined in the current class labeled with the service alias; and, in the case of inheritance relationship with other classes, an item is built for each direct subclass labeled with subclass alias. Recursively, the same algorithm is applied until the inheritance tree is fully explored.

A Service Form requires the following input data extracted from the Conceptual Model: Service to generate, service class, arguments list, interface patterns linked to arguments. For each service, a form is generated that contains a graphic part and a functional part. The graphic part includes a widget attached to each argument that needs input from the user and a pair of widgets to accept or cancel the service launch. The functional part includes code to implement the event-drivers for the previous widgets, to initialize the properties of these widgets with default values, to validate introduced values, and to invoke the service in the system-logic component.

A detailed explanation of how to generate a Service Form follows. First, two argument lists are obtained. The first one corresponds to the arguments defined in the service declaration (FL, Formal List). In this list, the arguments are sorted by its formal declaration order. The second one contains the same arguments sorted by the presentation order (PL, Presentation List). Both orders are specified in the Conceptual Model.

Iterating through the Formal List and for each argument: create a widget for each argument that has to be obtained from the user (block 708) and set relevant properties to arguments like: type, size, can be null, Introduction Pattern, Defined Selection Pattern or Population Selection Pattern Widgets are added for OK and Cancel commands, and graphic positions of widgets are arranged so they do not overlap. In one implementation, the form is divided in a logical grid of n columns by n rows and assign positions from left to right and from top to bottom to conveniently arrange the widgets. The logical positions are translated to physical position in the target language and rearrange action commands in the bottom-right corner of the form. Finally, the form is resized to adjust the size of data contained therein.

For output, the standard header of a form is dumped to a file. This step is dependent of the target language selected. Then, the graphic part of form is dumped to the file, including the definition of basic form properties, the definition of each widget, and the widgets' actions.

Finally, the source code attached to this form is translated and dumped. This process includes translating generic functions to manage events in the form, such as open and close events and produce code to assign and free resources. Also, functions to handle the Status Recovery Pattern and dependencies between widgets are translated. Depending on the Status Recovery Pattern attached to the service, and possible Dependency Patterns defined in the service, code for changing argument values must be generated and the code that triggers such dependencies. The validation code is translated too. There are validation methods to check the values gathered in the widgets are right. Finally, a function to invoke the appropriate object server of the system-logic services is generated. The function built contains: a reference to system-logic object where the service is going to be executed; the invocation to a method that implements the service in the system-logic; and the arguments necessary to such function, constructed from values supplied from the user through widgets (block 712).

In order to generate a query/selection form, the following Conceptual Model information is required: a class and its properties (alias), and the list of the Population Selection interface patterns defined for the class. Each pattern contains: a display set, a filter, and a sort criterion. In case there is no visualization set defined, the list of attributes belonging to the class is assumed. If a class lacks a Population Selection interface pattern, the following default values will be assumed: every attribute defined in the class is considered as part of the display set, and neither a filter (in this case the whole population of the class is returned) nor a sort criteria are attached.

Generating a query/selection form also requires information about the relationships of the class. For every class, a form is generated based on this information and contains a tabular representation of the display sets of the class, a set of grouped filters that allow to restrict search through the population, and a pop-up menu including navigability links to the classes related to the first one and available services to be launched over instances of the class.

The generated software component, which has been described before, provides the user-interface client functionality that includes all the required functionality for both validating and executing a prototype compliant to the Conceptual Model it has been derived from. The applications of the component are: prototyping, to validate the Conceptual Model before the user for capturing new requirements; testing to validate the Conceptual Model by the analysts to verify that the model faithfully reflects the requirements; and ultimate application production, once the process of requirements capture is completed, the generated component can be considered as a final version implementing a functionally complete and ergonomic user interface. The component can be edited to customize the application to users desires with very little effort.

Data Model Translation

In the preferred species, the database generator 236 automatically defines a data model in a Relational Database Management System (RDBMS) according to the validated specification in the high level repository 215. In other species, any data structure that at least stored the values of all object attributes in a manner that allows at least the system logic code and, preferably, the user interface code to retrieve them at will may be coded. The output of the database generator 236 corresponds with the persistence tier (database or shared data structure) in a multi-tiered architecture. In one embodiment this may be true, but it is not mandatory that the persistence tier in a multi-tiered architecture corresponds with a Relational Database Management System.

Figure 8:
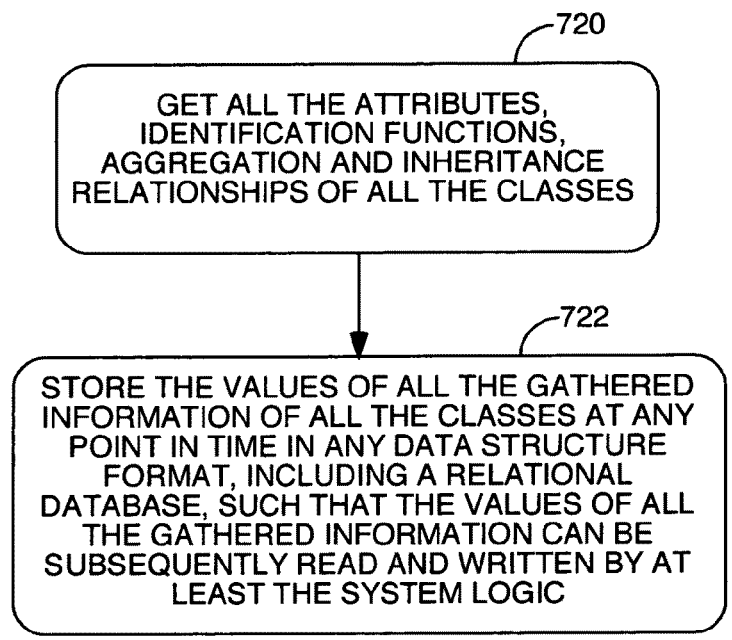
FIG. 8 is a flowchart of the functions that all species of the subgenus database translator 236 must perform.

Referring to FIG. 8, there is shown a flowchart of the functions that all species of the subgenus database translator 236 must perform. The details regarding how each function is performed will depend upon the formal language of the high level repository, the source code type of the system logic, the operating system in use and the data structure being created, but all species will perform the two basic functions of FIG. 8. Block 720 represents the process of getting the values of all the attributes of all the classes at the initial time. Block 722 represents storing the values of the attributes so obtained in any data structure format, which could include a relational database. The only thing that is important is that a data structure be created that stores the entire initial state of all attributes in a structure which can be used by the system logic to subsequently read and write the values of these attributes.

From the information in the high level repository about a given Conceptual Model, scripts are generated in order to create and delete tables, constraints (primary and foreign keys) and indexes. Scripts can optionally be executed in a Relational Database Management System to effectively create said data model.

From the point of view of relational databases, data is stored in tables with relationships between them. However, from the object oriented programming point of view, data is stored in object hierarchies.

Although the automatic software production system in accordance with one embodiment is based on an object oriented methodology, it is necessary to find a physical data storage system to permanently store data managed by generated applications. Relational databases are preferred, because they are the industry-standard way to store data and, consequently, use of tables instead of objects would be desirable. Nevertheless, many object-oriented applications, like those produced in accordance with an embodiment of the present invention, can be compatible with the Relational Model, since the static aspects of objects can be stored in tables following a translation process.

The generated data model comprises a set of tables and the corresponding relationships, as well as constraints on primary and foreign keys and indexes. The generated data model reflects system data with the attributes defined in the classes specification and other class instances properties like their state, and role if they are agents.

Information, gathered from the high level repository 215 and needed to produce the corresponding data model, focuses on classes and include the name, constant attributes (either emergent or inherited); variable attributes (either emergent or inherited); identification function; inherited identification function; aggregation relationships (either emergent or inherited); and agent information.

Preferably, the generated scripts follow a standard: ANSI SQL 92. This fact means that the generated data model can fit any database management system based on ANSI SQL 92, particularly most well known relational database management systems.

The process to obtain the data model follows these steps: For each elemental class of the Conceptual Model, a table in the selected relational database is created. For each constant or variable attribute in the class specification, a field in the table corresponding to the class is created. The field data type depends on Conceptual Model attribute data type translated into the target relational database. Derived attributes are not stored in the database since their value will be calculated upon request by special methods in the server code generated.

Primary keys are determined by attributes marked in the Conceptual Model as being identification attributes. Thus table fields corresponding to this attributes will constitute the primary key of the table. As a particular case, tables corresponding to specialized classes, in addition to fields representing emergent attributes, have fields that correspond to attributes that constitute the primary key of the table representing their ancestor class. If a specialized class does not have an identification function of its own, these fields, copied from the ancestor class, constitute the specialized table primary key. At the same time, they constitute the foreign key to the parent class table. On the other hand, if a specialized class has its own identification function, these fields only constitute a foreign key to the parent class table.

Aggregation case is more complicated, because aggregation has more dimensions. The aggregation relationship dimensions determine its cardinalities which in turn determine representation in the database: If the relationship is multivalued (maximum cardinality set to M) in both senses a new table is added in order to represent this aggregation relationship. This table has a field for each one that constitutes the primary key of related tables. The set of all these fields constitutes the primary key and, individually, fields coming from each related table's primary key, constitute foreign keys to each related table.

If the relationship is univalued (maximum cardinality set to 1) in one sense, the class related with only one instance of the other one copies the fields of the primary of the other one. These fields constitute a foreign key to the related class table.

If the relationship is univalued in both senses, any of the tables could have the foreign key to the other. The adopted option in this case is that the aggregate class has the reference to the component class. With respect to minimum cardinalities, if minimum cardinality is 0 then the corresponding field will take null values. Otherwise it will not. If identification dependence exists between two classes then fields of the primary key of the non-dependent class are copied to the table corresponding to the dependent class. They will be part of its primary key, and be a foreign key to the table of the non-depending class.

Indexes may be generated to optimize searches and reduce response time. For each foreign key, an index will be generated so foreign keys will also be search indexes.

So far the static aspects of an object have been covered, but some dynamic aspects need also be discussed. The occurrence of services characterize the evolution in an object's life for an object's state changes whenever a service happens since the value of its attributes characterize its state. The state transition diagram determines valid lives for an object. In order to monitor state transition, a new field will be added to each table corresponding to a class, to store the name of the state in the state transition diagram in which an object is at a given instant.

Generated applications must perform user authentication by requesting identification and password to agents logging on to the system. A new field will be added to tables corresponding to classes that are agents of any service in the system, to store the password of said agent.

Documentation Translation

The CASE tool 210 allows for additional information to be introduced at analysis time, which can be used to generate system's documentation. Accordingly, the documentation generator 238 automatically produces a set of documents including the formal specification, full Conceptual Model details documentation, user's help, and others, from information in the high level repository 215.

Figure 21:
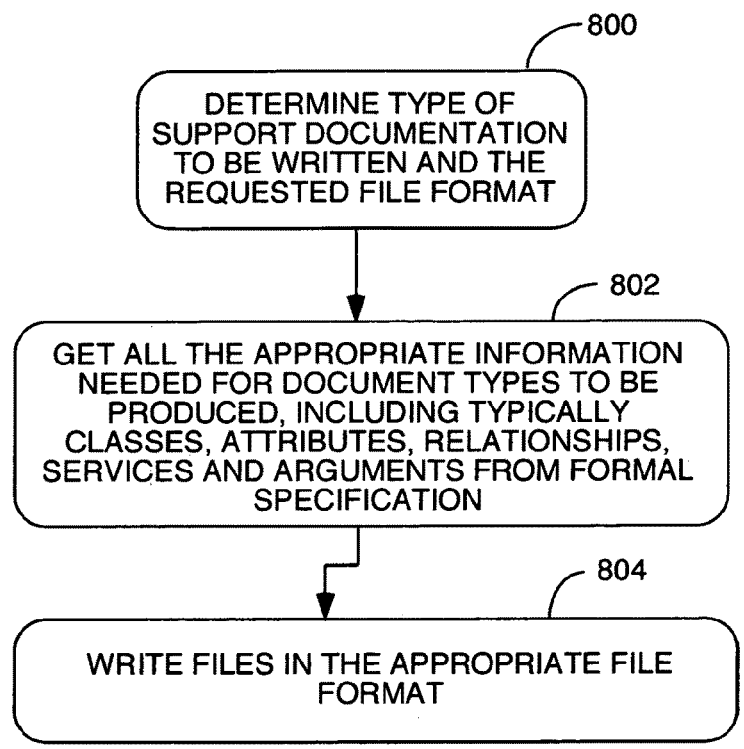
FIG. 21 is a flow diagram defining the characteristics that all species in the genus of user documentation translators will share.

FIG. 21 is a flowchart of the processing steps that every species in the subgenus documentation translators will have to perform. Step 800 represents the process of determining from configuration data or other user input which types of support documents are going to be generated. Step 802 represents the process of getting from the Formal Specification all the appropriate information needed for the requested documents. Typically the information gathered is classes, attributes, relationships, services, arguments, etc. Step 804 represents the process of writing the support documentation in files of the appropriate format.

Due to their different nature, there is a specific generation process for the formal system specification. The rest of produced documents are based in a generic data process. This process allows to obtain the same documents in different formats and define any new type of document.

CASE tools must provide multiple documents that can be automatically generated from Conceptual Models previously gathered. The documentation generator 238 answers the need for information requests and queries performed on a Conceptual Model. The documentation generator 238 allows generation of queries, specific manuscripts or well-formed documents in order to document properly a project.

In a preferred embodiment, complete generation of Conceptual Model is generated in an ASCII format with OASIS syntax. OASIS is a formal specification in an object-oriented language. The OASIS specification comprises the part of the Conceptual Model related to analysis of the problem. Other parts, like interface patterns, are not included in the OASIS specifications.

Document generator provides, by default, general documents, services documents, and help documents. The general documents include a natural language specification description. The services documents include a detailed description of classes and services. The help documents contain an on-line help for generated prototypes.

The Documentation Generator uses as target languages some recognized standard formats for documentation: ASCII, plain text, navigational HTML with multiple documents, navigational HTML with one document, LaTeX, and Rich Text Format (RTF).

This Documentation System is scalable and can be extended to add a new kind of document or target language. Adding a new target language allows all defined documents to be generated with this new language. In the same way, adding a new document type will be generated to any supported target language.

In order to produce an OASIS specification, a process iterates over the information structures and writes to a file the corresponding text strings in the OASIS language. In the inner process, the iteration over the structures can be detailed as: (1) write specification headers; (2) For all class selected to be described: write its OASIS template (attributes, events, derivations, restrictions, preconditions, triggers and process); (3) for all global transaction, write its declaration and OASIS definition; and (4) write the end spec.

A document is generated in an intermediate block language (IBL). In such language the document is a block of document type and contains n child blocks. Recursively, by continence relation and having fixed a block taxonomy, documents can be defined based on block's structures. A block is a structure that contains the following properties: name, category, block type, block text, and list of contained blocks.

The generation is supported by an algorithm that implements loops iterating over the Conceptual Model following the order fixed by the document. In these iterations, the document is built creating and linking the blocks that constitute the document.

When the block structure is built, the resultant structure, a tree of blocks, is processed by a translator to convert it to a document in the selected target language. This algorithm using recursive descent analysis is capable to convert the blocks to tags in the target language depending on the information stored in the block and contained blocks.

As example, a block of type MM_SECCION1 and containing the text "Title" will be translated to the next string HTML equivalent: <H1>Title</H1>

Generating Full Applications

Accordingly, an automatic software production tool is described that captures information requirements, also referred to as "business processes" from a triple perspective: static, dynamic and functional. This allows system designers and analysts to fully capture every aspect of the reality they model.

System Logic Translator is then responsible for gathering all this information, which would have been previously validated to assure correctness and completeness, and automatically produce code that implements every aspect of the modeled reality. This system logic code has the following features:

The system logic code is complete and correct. Since information gathered by the System Logic Translator has been previously validated, produced code can be assured to be both complete and correct thanks to the set of translation recipes provided. The set of translation recipes cover every aspect that can be modeled by an analyst, so everything that can be expressed and captured in a Conceptual Model can be translated into source code. Every translation recipe assures for correct translation thus resulting in error-free source code.

The system logic code is for a full application, not just a prototype. Generated code can be compiled (with the appropriate compiler depending on the target programming language) and executed "as-is" because it is fully translated from the Conceptual Model information input. Generated code is not a mere collection of method skeletons but complete methods. Furthermore, no useless code is produced and no line of code is generated more than once. In addition to this, even being the generated code well structured and readable, comments can be automatically generated as a means of internal code documentation thus improving readability.

The system logic code is robust and includes error checking and handling. Correctness and completeness allow for the production of robust code. According to the information in the Conceptual Model, errors fall into two categories: model or internal errors and external errors. Internal errors correspond to properties that must hold at a given instant according to the Conceptual Model (e.g.: a precondition that does not hold, an integrity constraint, violation of a maximum cardinality of an aggregation relationship, etc.) External errors correspond to causes alien to the Conceptual Model (e.g.: a system failure, a database failure, . . . etc.).

The generated code handles errors according to this classification as follows: For internal errors, the system logic translator identifies every point where an internal error might occur then produces error checking and handling code to notify the client about such an error's occurrence. Again, internal errors can be categorized and given a specifically defined treatment, such as customizable error messages and error codes. For external errors, the system logic translator identifies every point where an external error might occur then produces error checking and handling code to notify the client about such an error's occurrence. Since external errors cannot be categorized, they are treated in the same standard way.

Therefore, the automatic production of error checking and handling code for every possible situation can assure any translation of a Conceptual Model to be robust.

The system logic code handles transactional behavior. The generated code presents transactional behavior in the sense that the code provides clients a well-defined interface, which allows them to request services from the system. Those services are executed in a transactional way: every input argument of the service must be provided by the client, then system logic performs the corresponding operations and replies to the client. Services in a Conceptual Model can be in turn decomposed into actions. The generated code assures for all actions composing a service be successfully accomplished or none of them. In addition, changes to objects affected by the actions a service is divided into do not effectively take place until all these actions have successfully terminated. Transactional behavior also enhances integration with legacy systems.

The system logic code is independent from the user interface. The generated code provides a well-defined interface allowing for clients to request services. But this interface does not depend on the clients interacting with it. This allows for a heterogeneous set of clients interacting with the same system logic. Thus, clients for a specific system logic need only know the interface it will present to them. This feature also enhances integration with legacy systems and decomposition of huge information systems or Conceptual Models into smaller ones, which, thanks to their well-defined interfaces, can interact with each other.

The system logic code is independent from the persistence layer. The generated code is responsible for interacting with the persistence layer implementing what is regarded as "persistence services". These services are responsible for: adding, retrieving, updating, and deleting information in the persistence layer. These services are necessary for the system logic to perform its tasks but, in addition to this, system logic hides the persistence layer to clients by providing services to perform queries on the persistence layer. This implies that clients need not know the physical location of the persistence layer; need not know the structure of the persistence layer, because they are provided with services to perform queries on the persistence layer; need not be authorized users of the persistence layer because access to the persistence layer is entirely managed by the system logic; and need not even know that there is a persistence layer.

To sum up, the code automatically produced by the automatic software production system of one embodiment of the present invention corresponds to that of a true final software application, instead of that of just a prototype. To maintain this distinction, some of the differences between the generated system logic code from that of a prototype are explained.

(1) Completeness: A prototype does not fully cover functionality of an information system, nor is it intended for every possible flow of execution, while our automatically generated code, being a final application, totally covers the functionality captured in the corresponding Conceptual Model, as well as every possible flow of execution.

(2) Correctness: A prototype aims to verify user's needs and requirements and verify correctness of execution. The automatically generated code in accordance with an embodiment of the present invention, on the other hand, aims to verify user's needs and requirements, for it is correctly generated.

(3) Robustness: A prototype is not robust, because the prototype is not produced with error checking and handling code. Rather, this code is not produced, typically by hand, until the very last step of codification, where user's needs and requisites have proven to be satisfied and a final application can then be produced. A final application, such is the case of our automatically generated code, must come with all the code necessary to assure robustness. Since this is usually codified by hand, programmers often forget to add such code in many places where needed. This leads to high costs of maintenance and disrupts the balance between system logic code and error checking and handling code. The system logic translators described herein provides all the necessary (and just than the necessary) code to deal with error checking and handling.

(4) Scalability: Prototypes are not scalable because they tend to be discarded during the process of validating user's needs and requisites. Final applications can be designed to be scalable because they aim to last much longer than a prototype. Nevertheless scalability implies following certain guidelines during design phase. With embodiments of the invention, system analysts need not worry about scalability because such a task falls under the System Logic Translator 232 responsibilities. So, analysts focus on analysis matters knowing that the resulting code will be scalable. Furthermore, different Conceptual Models translated by the System Logic Translator can interact with each other through their well-defined interfaces.

Appendix A attached is a set of power point slides printed on paper which explain the operation of the system and give some specific examples of key operations.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A computer programmed with computer-readable instructions of one or more programs and a modeling program which, when executed, control said computer to carry out the following process:

using said computer controlled by said modeling program, displaying diagrams and textual interactive dialogs which a designer of a target computer program can use toner system requirements data to define elements of a conceptual model defining the class structure, attributes, services and other properties of a target computer program to be written automatically by a computer executing one or more translator programs, said conceptual model comprised of an object model which said designer constructs to provide class definitions for classes of objects said target computer program deals with, each class containing attributes, services, derivations, constraints, transaction formulas, triggers, display sets, filters, population selection patterns, a state transition diagram and formal interfaces, a dynamic model which said designer constructs using said state transition diagram and an object interaction diagram to specify the behavior of an object in response to services, triggers and global transactions, a functional model which said designer constructs using said textual interactive dialogs to enter formulas which define valuations which define the changes in states of objects in the system in response to event occurrence and a presentation model which said designer specifies by selection and articulation of user interface patterns from a pattern language including selection and articulation of said display sets, filters, and population selection patterns for each class, said conceptual model fully defining a system to be implemented by said target computer program including the user interface of said target computer program;

using said computer controlled by said modeling program, automatically converting each piece of said system requirements data, as it is entered, into its formal counterpart in a formal language so as to compose said formal specification in the background without said designer needing to know the details of the syntax of the formal language being used to write said formal specification, said formal specification defining said target computer program and its user interface completely;

controlling a computer with one or more computer programs to access said formal specification and use the rules of syntax of said formal language to validate said formal specification to ensure it is complete and correct.

2. In a computer having a processor coupled by a bus to a display, a main memory, a storage device, an input device, and a cursor control device, a process carried out by a modeler computer program which is executed by said computer, said modeler, being part of and a separate subsystem of an automatic software production tool, said modeler program controlling operation of said computer so as to provide a graphical modeling environment displaying diagrams and textual interactive dialogs for a designer to use to enter data which defines the requirements of an application program to be automatically created by said automatic software production system, said diagrams and textual interactive dialogs being structured to allow said designer to graphically create an Object Model, a Dynamic Model, a Functional Model and a Presentation Model as part of a conceptual model of said software program said designer is designing (hereafter referred to as the application program), said modeler program controlling said computer to display on said display to a designer of said software application diagrams and textual interactive dialogs which said designer can use to enter said requirements data using said input device and said display and said cursor control device, said requirements data entered in this way defining said Object, Dynamic, Functional and Presentation Models of said software program being designed, further comprising the steps of:

A) controlling said computer with said modeling program to automatically convert each piece of said requirements data entered by said designer into a formal language counterpart in a Formal Specification representing a formal language concept, said automatic conversion occurring as each piece of said requirements data is captured by mapping the element defined by the requirements data to its formal language counterpart, and wherein said automatic conversion of each piece of requirements data entered by said designer into its formal counterpart forming part of said Formal Specification is carried out automatically by said computer in background and hidden from said designer such that said designer can write said Formal Specification using only a graphical model notation, said designer not needing to have any knowledge of the rules of grammar of the formal language being used, said Formal Specification being automatically written by said computer under control of said modeler program in a formal language which has a set of rules of grammar comprised of rules of syntax and semantics that allow the syntax and semantics of all formulas to be checked for correctness and which allow checking for missing or invalid values for elements defined by requirements data in said Formal Specification;

and further comprising the steps:

controlling a computer to automatically validate said Formal Specification in a flexible manner in which predetermined elements of said Formal Specification are validated strictly and predetermined other elements are validated flexibly as the requirements data defining the element is entered by said designer but are validated strictly after all requirements data has been entered to generate a validated Formal Specification which is complete and correct, said modeler program controlling a computer to strictly validate requirements data entered to define a strictly validated element as it is entered by mapping the element defined by the requirements data to the rules of grammar of said formal language which control how such an element is expressed in said formal language, and displaying an error message and preventing said designer from leaving a diagram or textual interactive dialog box being used to enter said requirements data for said element until said requirements data entered defines all required properties of said element and provides a valid value for each property, and, strictly validating formulas requiring strict validation as the requirements data for said formula is entered by displaying an error message and preventing said designer from leaving a diagram or textual interactive dialog being used to enter requirements data defining said formula if said formula is not syntactically and semantically correct according to the rules of grammar for the type of formula being entered;

said modeler program controlling a computer to make the modeling process easier to use by flexibly validating predetermined elements of said Formal Specification as they are created from requirements data entered by the designer, said flexible validation carried out by validating an element of a Formal Specification generated from requirements data as it is entered, but, if said element is incomplete or has invalid values, allowing the designer to move on to enter requirements data defining other elements anyway, said modeler program controlling said computer to complete strict validation of said flexibly validated elements later to ensure they are complete and correct before translation of the Formal Specification to source code.

3. The apparatus of claim 1 wherein said computer-readable instructions of said one or more programs and said modeling program are structured to control said computer to perform said validation in a flexible manner such that predetermined elements of said conceptual model are validated strictly such that said designer cannot move on with the design until all requirements data needed to define the properties of the element has been entered and have been given a valid value by said designer, and predetermined other elements are validated flexibly such that a designer may move forward with the design before the element is completely and correctly specified in the requirements data but are validated completely at a later time before automatic code generation.

4. The apparatus of claim 1 wherein said computer-readable instructions are structured to control said computer to automatically validate said Formal specification in a flexible manner in which predetermined elements of said formal specification are validated strictly and predetermined other elements are validated flexibly as the requirements data defining the element is entered by said designer but are validated strictly after all requirements data has been entered to generate a validated Formal specification which is complete and correct, and wherein said computer-readable instructions control a computer to strictly validate requirements data entered to define a strictly validated element as it is entered by mapping the element defined by the requirements data to the rules of grammar of said formal language which control how such an element is expressed in said formal language, and displaying an error message and preventing said designer from leaving a diagram or textual interactive dialog box being used to enter said requirements data for said element until said requirements data entered defines all required properties of said element and provides a valid value for each property, and, strictly validating formulas requiring strict validation as the requirements data for said formula is entered by displaying an error message and preventing said designer from leaving a diagram or textual interactive dialog being used to enter requirements data defining said formula if said formula is not syntactically and semantically correct according to the rules of grammar for the type of formula being entered;

and wherein said computer-readable instructions control a computer to make the modeling process easier to use by flexibly validating predetermined elements of said formal specification as they are created from requirements data entered by the designer, said flexible validation carried out by validating an element of a formal specification generated from requirements data as it is entered, but, if said element is incomplete or has invalid values, allowing the designer to move on to enter requirements data defining other elements anyway, said modeler program controlling said computer to complete strict validation of said flexibly validated elements later to ensure they are complete and correct before translation of the formal specification to source code.

5. The process of claim 2 wherein said modeler controls said computer to display diagrams or textual interactive dialogs which allow said designer to create the following formulas:

Default Value Calculation of
　Class Attributes (Constant and Variable)
　Service and Transaction Arguments
Inheritance: Specialization condition
Static and Dynamic Integrity Constraints
Derivations and Valuations:
　Calculation formula (Derived or Variable attributes respectively)
　Conditions (optional)
Preconditions for actions (Services or Transactions)
Control Conditions for transitions in State Transitions Diagram
Triggering conditions
Local and Global Transactions formulas and wherein said modeler controls said computer to validate each said formula at the time it is introduced to said model and wherein said modeler controls said computer to check to make sure that every class has an identification function, every class has a creation event, every triggering formula is semantically correct and every name of an aggregation is unique in the conceptual model, and, if any of these conditions is not satisfied, controlling said computer to display an error message, and wherein said modeler controls said computer to display a warning message to said designer if any of the following do not hold: every class should have a destroy event; every derived attribute should have at least a derivation formula; every service should have an agent declared to execute it; and every argument declared in a service should be used.

6. The process of claim 2 wherein said modeler controls said computer to display diagrams and textual interactive dialogs which allow said designer to specify classes of objects in said application program wherein each object in a class has a state and a set of services where said state can only be changed by execution of said services so as to cause a changes in state of said object wherein the set of allowed states of each object in each class is defined by diagrams created by said designer which are part said Dynamic Model, said set of services being an interface for said object, and wherein each object in a class shares the same template which allows for an identification mechanism and a signature of the class including attributes and methods and a set of formulas of various kinds which define the properties of each class, said formulas for each class including:

integrity constraint formulas which define conditions that must be satisfied by objects in said class, valuation formulas as part of said Functional Model which define how the values of attributes are changed by events, where events are execution of services, derivations formulas which relate various attributes values to other attribute values, precondition formulas for actions which determine when a service or transaction can occur, and trigger formulas which define what happens when an event causes a change in state which satisfies a trigger condition;

display sets, filters and population selection patterns as part of said Presentation Model;

and, for each argument, user interface patterns in said Presentation Model related to the argument which can include introduction pattern, population selection pattern, defined selection pattern and dependency pattern;

local and global transactions formulas.

7. The process of claim 6 wherein said strict validation of step B1 is accomplished by:

controlling said computer with said modeler program to automatically access each element of said Formal Specification and check completeness by automatically verifying that each property in the set of properties predefined by said grammar for said Formal Specification both exists and has a valid value at the time of its creation;

controlling said computer with said modeler program to automatically strictly validate each formula for correctness by accessing each formula entered by said designer and automatically carrying out a process defined specifically for a formula of that type using a set of rules of grammar defined for a formula of that type to verify the syntax and semantics of said formula are correct.

8. The process of claim 6 wherein said modeler program also controls said computer to display the same said diagrams and textual interactive dialogs which were used to enter requirements data to create said conceptual model and allow said designer to use said diagrams and textual interactive dialogs to graphically edit said conceptual model and thereby automatically edit said Formal Specification by virtue of the changes in the conceptual model being converted into changes in said Formal Specification, and wherein said modeler program controls said computer to automatically re-validate all formulas in said Formal Specification each time said designer performs a change to said conceptual model which may invalidate one or more formulas, and, if any of the formulas affected by the change makes reference to a strictly validated property, said model controls said computer to automatically reject the change and display an error message to inform said designer of said error, and if none of the formulas affected by said change make reference to a property that is strictly validated, the change to said model is accepted and an action confirmation dialog is displayed before any action is taken, and if the change affects no formula, said conceptual model is modified according to said change.

9. The process of claim 6 wherein said modeler program controls said computer to display diagrams and textual interactive dialog boxes which allow said designer to create said conceptual model with the building blocks or elements listed in the table below and to validate each said element either strictly or flexibly as listed in said table:

| | |
|---|---|
| Class | |
|   Name | Strict |
|   ID function | Flexible |
|   Attributes (at least one) | Flexible |
|   Services (at least Create service) | Flexible |
|   Static and Dynamic Integrity Constraints (optional) | |
|     Their formula | Strict |
| Attribute | |
|   Name | Strict |
|   Type (Constant, Variable, Derived) | Strict |
|   Data-type (Real, integer, etc) | Strict |
|   Default Value | Strict |
|   Size (if proceeds) | Strict |
|   Request in Creation service | Strict |
|   Null value allowed | Strict |
|   Evaluations (variable attributes) | Flexible |
|   Derivation formula (derived attributes) | Flexible |
| Evaluation | |
|   One variable attribute of a class | Strict |
|   One service of the same class | Strict |
|   Condition (optional) | Strict |
|   Formula of evaluation | Strict |
| Derivation | |
|   Formula | Strict |
|   Condition (optional) | Strict |
| Service | |
|   Name | Strict |
|   Arguments | |
|     argument's name | Strict |
|     data-type | Strict |
|     default value (optional) | Strict |
|     null value | Strict |
|     size (if proceeds) | Strict |
|   For a transaction, its formula | Flexible |
| Preconditions of an action | |
|   Formula | Strict |
|   Agents affected by condition | Strict |
| Relationship: Aggregation | |
|   Related classes (component & composite) | Strict |
|   Relationship name | Strict |
|   Both directions Role names | Strict |
|   Cardinality | Strict |
|   Inclusive or referential | Strict |
|   Dynamic | Strict |
|   Clause "Group By" (Optional) | Strict |
|   Insertion and deletion events (if proceed) | Strict |
| Relationship: Inheritance | |
|   Related classes (parent & child) | Strict |
|   Temporal (versus permanent) | Strict |
|   Specialization condition or events | Strict |
| Relationship: Agent | |
|   Agent class and service allowed to activate | Strict |
| State Transition Diagram (STD) | |
|   All states of class (3 at least) | Flexible |
| State in STD | |
|   Name | Strict |
| Transition in STD | |
|   Estate of origin | Strict |
|   Estate of destination | Strict |
|   Service of class | Strict |
|     Control condition (optional) | Strict |
| Trigger | |
|   Condition | Strict |
|   Class or instance of destination | Strict |
|   Target (self, object, class) | Strict |
|   Activated service | Strict |
|   Service arguments' initialization (Optional) | |
|     Arguments' values | Strict |
| Global Interactions | |
|   Name | Strict |
|   Formula | Strict |
| User exit functions | |
|   Name | Strict |
|   Return data-type | Strict |
|   Arguments, (Optional) | |
|     Argument's name | Strict |
|     Argument's data-type | Strict. |

10. The process of claim 2 wherein said modeler controls said computer to provide user interface patterns which are part of a pattern language as elements of said conceptual model said designer can choose to define the desired user interface for said software program said designer is designing, the chosen set of user interface patterns comprising said Presentation Model which is part of said conceptual model.

11. The process of claim 10 wherein said modeler controls said computer to provide the following user interface patterns as part of said pattern language:
a service presentation pattern which defines how a service will request data from a user of said software program and which is based on and articulated by other lower level patterns that refer to more specific interface tasks including an introduction pattern which constrains the values that can be validly input by a user of said software program with edit-masks and range values, a defined selection pattern which specifies a set of valid values for an argument, a population selection pattern which handles display and selection of objects from a population of objects and which contains a filter, a display set and order criterion said filter being requirements data in the form of a filter expression to control which objects are displayed, objects satisfying the criterion set in said filter expression being displayed, said display set being requirements data entered by said designer in the form of an ordered set of attributes that are displayed to show the status of said the object owning said attributes, and said order criterion being requirements data entered by said designer defining the order in which the objects are displayed, in the form of an ordered set of tuples that contain an attribute and a specification of ascending or descending order, a dependency pattern which is a set of event-condition-action rules entered by said designer to define dependency rules between arguments in services, a status recovery pattern which is a pattern created implicitly to recover data from object attributes to initialize service arguments, supplementary information pattern which handles feedback to a user of said software program to assure the user chooses or inputs the correct object identifier for an existing object, and an argument grouping presentation pattern which controls how to group requested service arguments;
an instance presentation pattern which defines how properties of an object are presented to a user of said software program;
a class population presentation pattern which defines how the properties of multiple objects of one class are presented to a user of said software program; and
a master-detail presentation pattern which defines how to present an object of a class with other related objects that may complete the full detail of the object;
an action selection pattern which controls how services users of said software program can invoke are displayed.

12. The process of claim 10 further comprising the step of automatically generating a computer program from said Formal Specification after said Formal Specification has been validated, comprising the substeps of:
A) articulating instances of translation structures stored in said memory using requirements data information extracted from said validated Formal Specification, said translation structures comprising code generation memory structures in the form of instances of classes each of which has a method capable of writing source code using the requirements data stored in the translation structure, said translation structures comprising classes needed to store requirements data needed for incorporation into source code files or components in a target programming language for a computer program having structure and behavior as defined in said validated Formal Specification, and said translation structures including a code generation class having a method for retrieving all requirements data needed to generate said source code components and for doing so in the appropriate order;
B) executing one or more methods in said code generation class to call the code generation methods of said translation structures in an order needed to generate source code components having said requirements data incorporated therein, and generating a global interactions executive component, and generating a global interactions server component, and generating a global functions component, and generating standard components, and writing said source code components to files which comprise said computer program to be automatically written.

13. The process of claim 11 wherein said modeler controls said computer to display diagrams and textual interactive dialogs which are structured to allow said designer to enter requirements data defining classes, relationships between classes, global transactions, global functions and views, and wherein said diagrams and textual interactive dialogs are further structured to allow said designer to enter requirements data defining for each class:
attributes;
services;
derivations;
constraints;
transaction formulas;
triggers;
display sets;
filters;
class population presentation patterns;
a state transition diagram;
a name; and
an alias.

14. The process of claim 11 wherein said modeler controls said computer to validate patterns from said pattern language selected to be part of said Presentation Model by verifying that no essential information needed to articulate the pattern is missing, verifying that attributes used in said filters are visible from the definition class, verifying that attributes used in an order criterion are visible from the definition class, verifying that the formula defined in a filter by said designer is a well-formed formula having the correct syntax and uses only terms defined in said conceptual model, verifying that any action selection pattern only uses as final actions objects defined in said conceptual model, and that any dependency patterns are terminal and have confluence, and controlling said computer to display a warning if a pattern is defined but not used or an instance pattern is duplicated.

15. The process of claim 11 wherein said modeler controls said computer to automatically generate source code of said software program from said validated Formal Specification comprising:
A) controlling said computer with a translator program to extract requirements data stored in said validated Formal Specification and storing said extracted data in instances of translation structures stored in said memory of said computer so as to create a translation structure or articulated with appropriate requirements data for every element of said Formal Specification, said translation structures comprising classes which store said requirements data extracted from said validated Formal Specification and each having a code generation method to generate one or more source code components which are part of the source code of said software program, said code generation methods functioning to generate source code components which have been articulated with said requirements data stored in said translation structure;
B) controlling said computer with said translator program to write source code files of said software program according to a component based structure by looping through a list of said translation structures which have been created and which have had said requirements data from said validated Formal Specification stored therein, and calling each translation structure's code generation method in the order defined by a code generation class which is one of said translation structure which stores a list of the translation structures created during the process of extracting requirements data from said validated Formal Specification and executing a code generation method of said code generation class which calls the code generation methods of said translation structures in an order needed to generate source code components articulated with said requirements data, and said translator program controlling said computer to generate a global interactions executive source code component, and generate a global interactions server source code component, and generate a global functions source code component, and generate standard source code components that are not particular to said conceptual model, and writing said source code components to files which comprise said software program, said software program capable of controlling a computer to implement the computer program defined in said validated Formal Specification.

16. The process of claim 15 wherein said translation structures write source code which is structured such that, when compiled and executed by a computer, cause said computer to perform the following functions in accordance with an execution model:
A1) provide a dialog by which a user can log in and identify himself or herself;

A2) provide an object system view to the user who logged in which displays only the set of object attributes the logged in user can see and only the services the user who logged in can see or activate;

A3) display a dialog by which the user who logged in can provide information to identify the object server which is to carry out a service and introduce service arguments of the service being activated and to build a service activation message containing said arguments and send said service activation message to said object server which is to execute said service;

A4) control said object server to check any state transition which will be caused by execution of said service is a valid state transition as defined in said Formal Specification;

A5) control said object server to check for satisfaction of any preconditions specified in said Formal Specification, and if either a precondition is not satisfied or the state transition which would be caused by execution of said service is not valid, ignore said service activation message and provide feedback to the user in the form of an error message;

A6) control said object server to carry out the service if the state transition it will cause is valid and its preconditions are satisfied by making all valuation calculations required by said service and changing the values of attributes in accordance with formulas of said valuations and arguments of said service to change the state of the system implemented by said computer program;

A7) control said object server to check integrity constraints to ensure said change of state does not violate an integrity constraint, and, if an integrity constraint is violated, to change the state of said system back to what it was before execution of said service and provide feedback to the user in the form of an error message;

A8) control said object server to check condition-action rules specifying triggers to determine if any trigger conditions have been satisfied, and, if so, causing the service specified in said condition-action rule to be executed.

17. The process of claim 13 wherein said modeler controls said computer to display textual interactive dialogs which said designer can use to enter valuation formulas which define how the object owning said attribute changes its state in response to an event or events, and wherein said modeler controls said computer to provide textual interactive dialogs which said designer can use to select one or more user interface patterns as part of said Presentation Model that define how said software program interfaces with a user thereof to gather data for service arguments related to said attribute.

18. The process of claim 13 wherein said modeler controls said computer to display textual interactive dialogs which said designer can use to enter requirements data defining a formula which expresses the composition of services involved in services which are transactions, and further controls said computer to display textual interactive dialogs which said designer can use to select user interface patterns from said pattern language to be included as part of said Presentation Model and which, for each argument, can be: an introduction pattern; a population selection pattern, a defined selection pattern and a dependency pattern.

19. The process of claim 2 wherein said modeler controls said computer to generate a formal specification which will result in generation of source code for said application program which controls a computer executing said application program to display a tree structured menu of services a user of said application program can invoke or queries a user of said application program can make, and wherein the services in said tree structured menu are derived from the set of services specified in classes in said Object Model of said conceptual model and implement a pattern of how services are going to be offered to a user of said application program, said pattern defined in an action selection pattern specified by said designer as part of said conceptual model.

* * * * *